(12) United States Patent
Verheyden et al.

(10) Patent No.: US 9,481,129 B2
(45) Date of Patent: Nov. 1, 2016

(54) PORTABLE DEVICE FOR ATTACHING A CONNECTOR TO AN OPTICAL FIBER

(75) Inventors: Danny Willy August Verheyden, Gelrode (BE); David Donald Erdman, Hummelstown, PA (US); Michael Gurreri, York, PA (US); Randall Bobby Paul, Elizabethville, PA (US); Jan Watté, Grimbergen (BE); Robert Charles Flaig, Lancaster, PA (US); Alan Edward Plotts, Harrisburg, PA (US); Michael Aaron Kadar-Kallen, Harrisburg, PA (US); Shelly Anne Buchter, East Berlin, PA (US); Jan Vandenbroeck, Aarschot (BE); Patrick Billet, Dilbeek (BE); Stefano Beri, Brussels (BE); André Johannes Maria Hilderink, Haaksbergen (NL); Hernes Jacobs, Rossum (NL); Petrus Theodorus Rutgers, Hengelo (NL); Petrus Theodorus Krechting, Enschede (NL); Martijn Johannes Wolbers, Hengelo (NL); Walter Mattheus, Wijgmaal (BE); Cristian-Radu Radulescu, Leige (BE); Paul Vits, Tielt-Winge (BE); Karel Johannes Van Assenbergh, Twist (DE); Pieter Cornelis Johan De Jager, Wierden (NL); Henk Jan Theodoor Van Der Pol, Hengelo (NL)

(73) Assignees: COMMSCOPE TECHNOLOGIES LLC; COMMSCOPE CONNECTIVITY BELGIUM BVBA (BE)

(*) Notice: Subject to any disclaimer, the term of this patent is extended or adjusted under 35 U.S.C. 154(b) by 248 days.

(21) Appl. No.: 14/000,345

(22) PCT Filed: Feb. 7, 2012

(86) PCT No.: PCT/US2012/024189
§ 371 (c)(1),
(2), (4) Date: Jan. 24, 2014

(87) PCT Pub. No.: WO2012/112344
PCT Pub. Date: Aug. 23, 2012

(65) Prior Publication Data
US 2014/0124140 A1    May 8, 2014

Related U.S. Application Data

(60) Provisional application No. 61/443,942, filed on Feb. 17, 2011, provisional application No. 61/443,933, filed on Feb. 17, 2011, provisional application No. 61/544,880, filed on Oct. 7, 2011.

(30) Foreign Application Priority Data

| Jul. 18, 2011 | (EP) | ................................. | 11174376 |
| Jan. 20, 2012 | (EP) | ................................. | 12151987 |
| Jan. 20, 2012 | (EP) | ................................. | 12151988 |

(51) Int. Cl.
| G02B 6/00 | (2006.01) |
| B29C 65/02 | (2006.01) |
| G02B 6/38 | (2006.01) |
| B29C 65/72 | (2006.01) |
| B29C 65/00 | (2006.01) |

(52) U.S. Cl.
CPC .............. *B29C 65/02* (2013.01); *B29C 65/72* (2013.01); *B29C 66/90* (2013.01); *G02B 6/3833* (2013.01); *Y10T 156/12* (2015.01); *Y10T 156/17* (2015.01)

(58) Field of Classification Search
CPC ....... B29C 65/02; B29C 65/72; B29C 65/90; B29C 6/3833; Y10T 156/12; Y10T 156/17; G02B 6/3833
USPC ................................................ 385/134–137
See application file for complete search history.

(56) References Cited

U.S. PATENT DOCUMENTS

| 2,027,962 | A | 1/1936 | Currie |
| 3,086,242 | A | 4/1963 | Cook et al. |
| 3,597,372 | A | 8/1971 | Cook |
| 4,490,007 | A | 12/1984 | Murata |

| | | | |
|---|---|---|---|
| 5,347,698 A | 9/1994 | Kinoshita et al. | |
| 5,394,606 A | 3/1995 | Kinoshita et al. | |
| 6,122,936 A * | 9/2000 | Csipkes | G02B 6/2551 65/485 |
| 6,457,873 B1 | 10/2002 | Heier et al. | |
| 6,562,164 B1 | 5/2003 | Faulkner et al. | |
| 6,733,184 B2 * | 5/2004 | Nguyen | B08B 1/00 385/134 |
| 6,963,687 B2 | 11/2005 | Vergeest et al. | |
| 7,280,733 B2 * | 10/2007 | Larson | G02B 6/3801 385/134 |
| 8,092,100 B2 * | 1/2012 | Song | G02B 6/245 385/134 |
| 8,480,314 B2 * | 7/2013 | Saito | G02B 6/3862 385/95 |
| 8,509,587 B2 * | 8/2013 | Song | G02B 6/245 385/134 |
| 8,824,849 B2 * | 9/2014 | Pons | G02B 6/3887 385/134 |
| 8,967,025 B2 * | 3/2015 | Ishihara | G02B 6/25 83/156 |
| 2002/0064354 A1 * | 5/2002 | Ware | G02B 6/245 385/95 |
| 2002/0064355 A1 * | 5/2002 | Ware | G02B 6/245 385/95 |
| 2003/0007774 A1 | 1/2003 | Christopher et al. | |
| 2003/0009869 A1 * | 1/2003 | Strandberg | G02B 6/3812 29/407.01 |
| 2004/0120678 A1 | 6/2004 | Hwang et al. | |
| 2007/0104445 A1 * | 5/2007 | Larson | G02B 6/3801 385/134 |
| 2008/0196450 A1 * | 8/2008 | Hogari | G02B 6/25 65/452 |
| 2008/0282522 A1 * | 11/2008 | Song | G02B 6/245 29/33.52 |
| 2010/0158463 A1 | 6/2010 | Kossat | |
| 2012/0057837 A1 | 3/2012 | Heidler et al. | |

FOREIGN PATENT DOCUMENTS

| | | |
|---|---|---|
| CN | 2503503 Y | 7/2002 |
| CN | 2533485 Y | 1/2003 |
| DE | 197 36 077 A1 | 3/1999 |
| DE | 20 2008 016 860 U1 | 2/2009 |
| DE | 20 2009 007 026 U1 | 7/2009 |
| EP | 0 729 047 | 8/1996 |
| EP | 2 423 719 A1 | 2/2012 |
| JP | 5-210015 | 8/1993 |
| JP | 9 026512 A | 1/1997 |
| WO | WO 98/14810 | 4/1998 |
| WO | WO 02/44778 A1 | 6/2002 |
| WO | WO 2006/112675 A1 | 10/2006 |
| WO | WO 2009/011675 | 10/2006 |

OTHER PUBLICATIONS

International Search Report for International Application No. PCT/US2012/024189 mailed Jul. 3, 2012 (6 pages).
3M VF-45 Fiber Optic Connector Quick Install Kit Instructions. (Jan. 2004) 32 pages.
3M Volition VF-45 Interconnect an Emerging Standard for High-Speed Fiber to the Desktop. 18 pages. (admitted prior art).
MOLEX—Termination Procedure for Optoclip Connection Elements. 86790-0002 Rev. A. (1995) 10 pages.
Ohtsuka et al. "Non-fixed Fiber-Portion-Compressed Type Multi-fiber PC Optical Connector."
Optical Connectors: Optoclip II Series for multimode fibers connector OC II. (1997) 4 pages.
Optical Connectors: Optoclip II Series for singlemode fibers connector OC II. (1997) 4 pages.
Relais Electronics Deutsch—Activite Fibre Optique: Procedure de mise en oeuvre et de cablage de l'Optoclip II Monomode. (1995) 14 pages.
Suhner Fiberoptic Optoclip II Bare Fibre Adapter. Huber& Suhner AG. www.hubersuhner.com. (2000) 2 pages.
Suhner Fiberoptic Power Point. 23 pages.(admitted prior art).
AFL Telecommunications: "Specification Sheet "Cleaning Supplies FPF1 Fiber Prep Fluid"", retrieved from the Internet; URL:www.afltele.com/resourcecenter/specifications/cleaningsupplies/pdfs/FPF1-00-20001F.pdf, 1 page (Oct. 3, 2008).
English Translation of part of Japanese Patent No. 5-210015 from foreign associate, 1 page (Aug. 20, 1993).
European Search Opinion for Application No. 10174303.7.
European Search Report for Application No. 10174303.7 (dated completed May 16, 2011).
Montarou, C. et al., "Residual stress profiles in optical fibers determined by the two-waveplate-compenssator method," *Optics Communications*, vol. 265, pp. 29-32 (2006).

* cited by examiner

*Primary Examiner* — Ryan Lepisto
*Assistant Examiner* — Guy Anderson
(74) *Attorney, Agent, or Firm* — Merchant & Gould P.C.

(57) ABSTRACT

A portable device for attaching a connector to an optical fiber, the optical fiber having an end, the device comprising means for receiving the optical fiber at the end of the optical fiber; and a connector station for autonomously attaching the connector to the optical fiber.

32 Claims, 69 Drawing Sheets

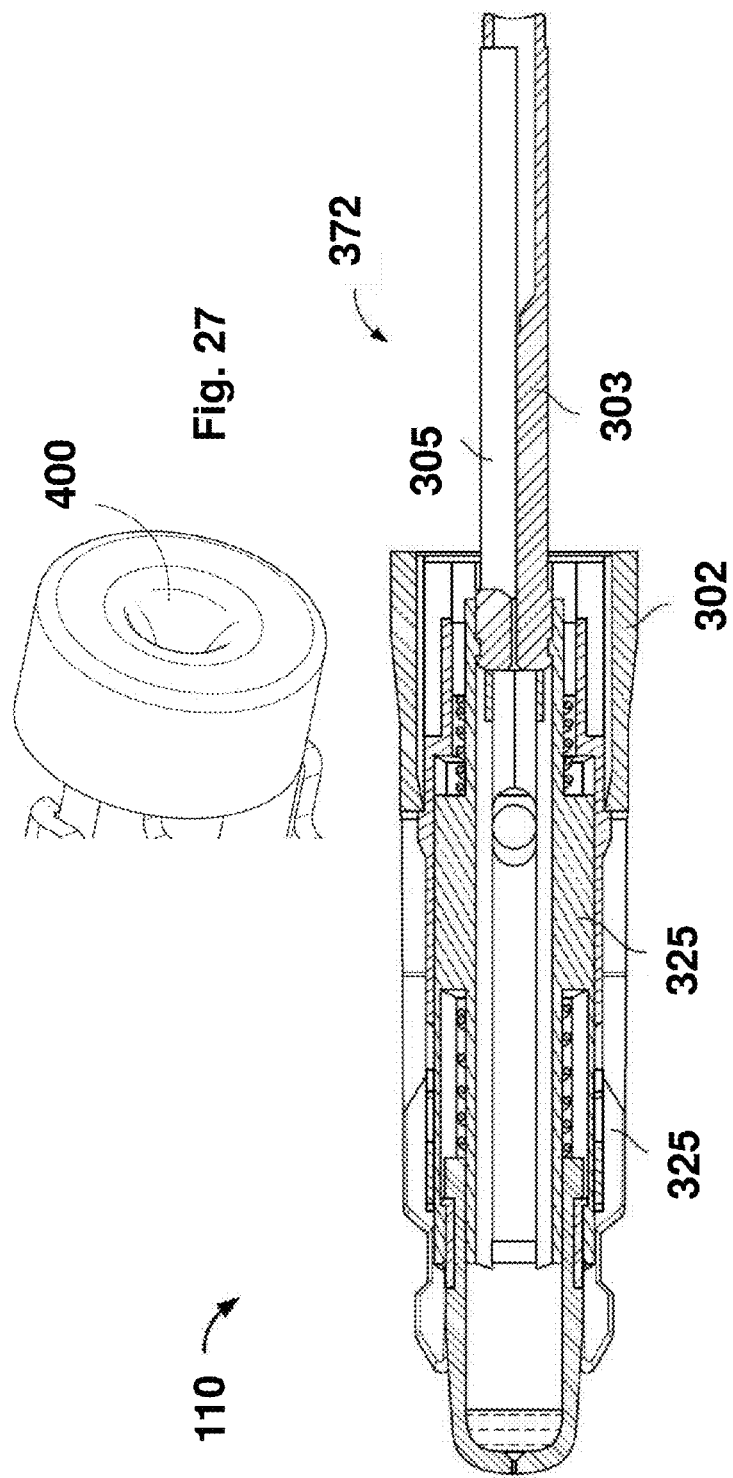

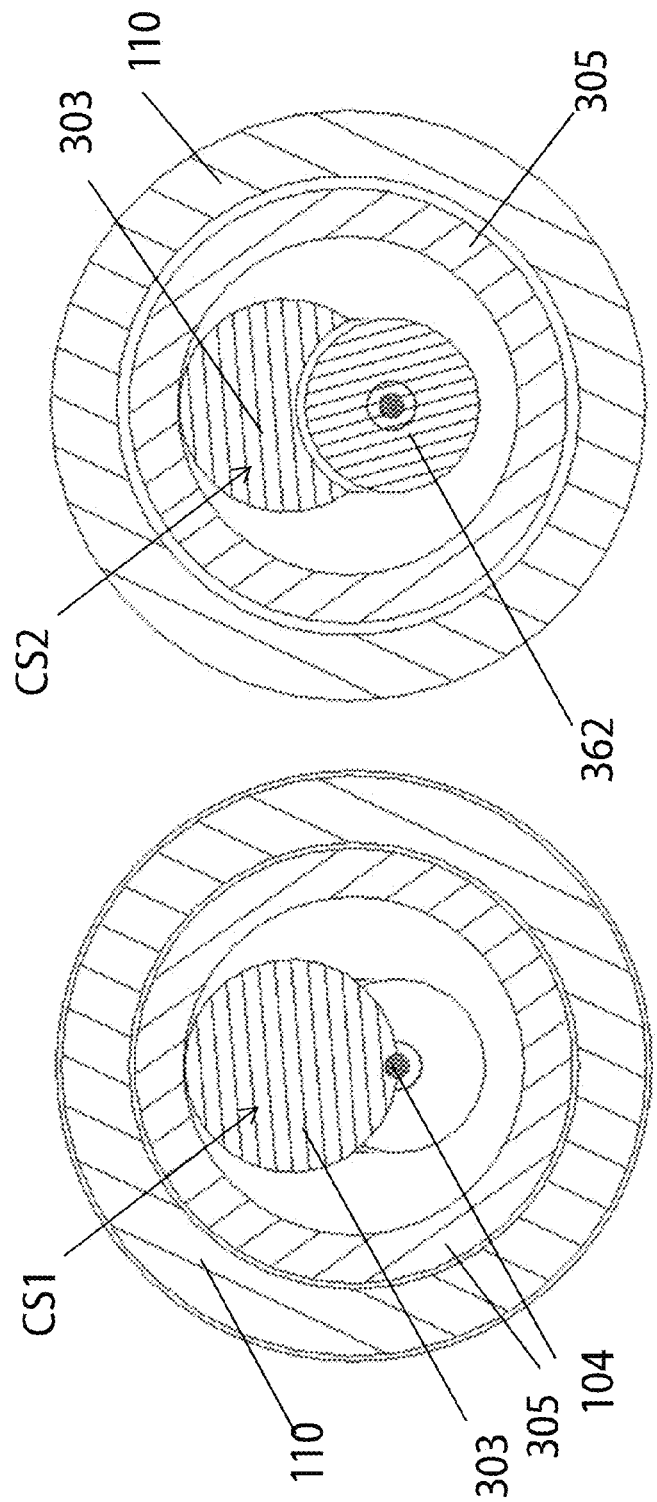

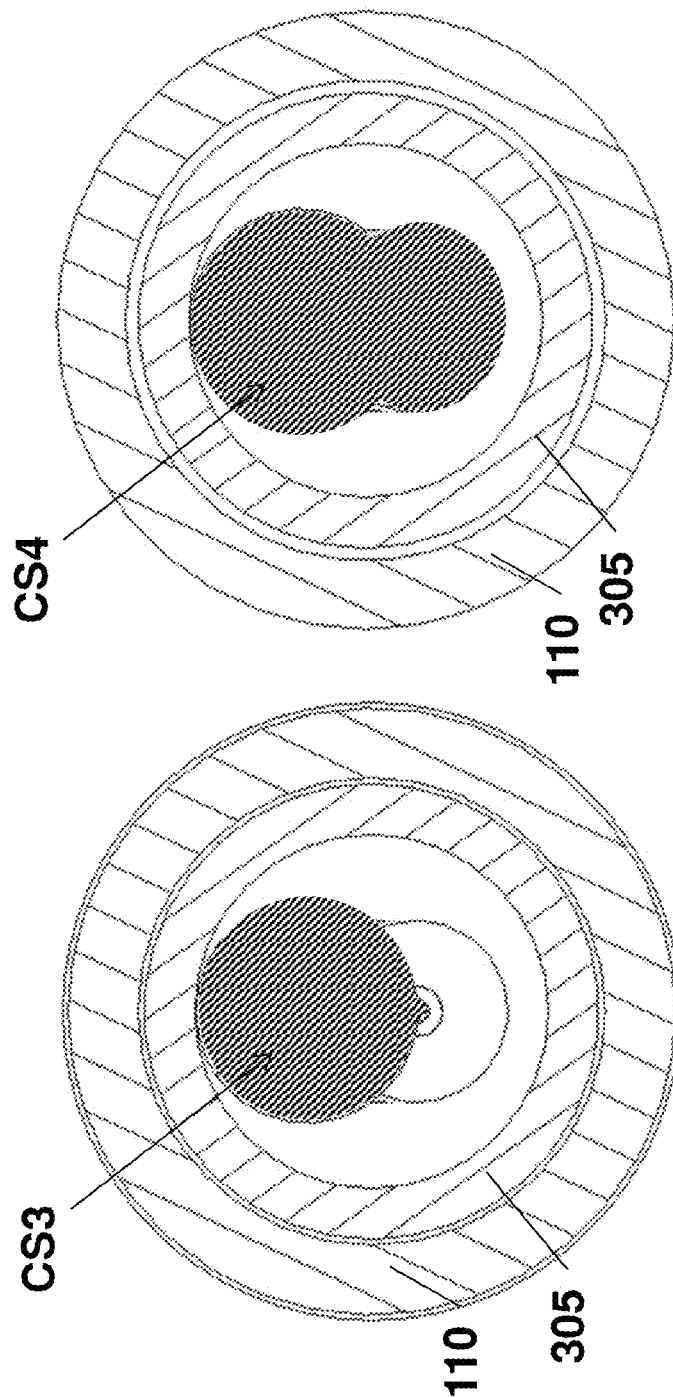

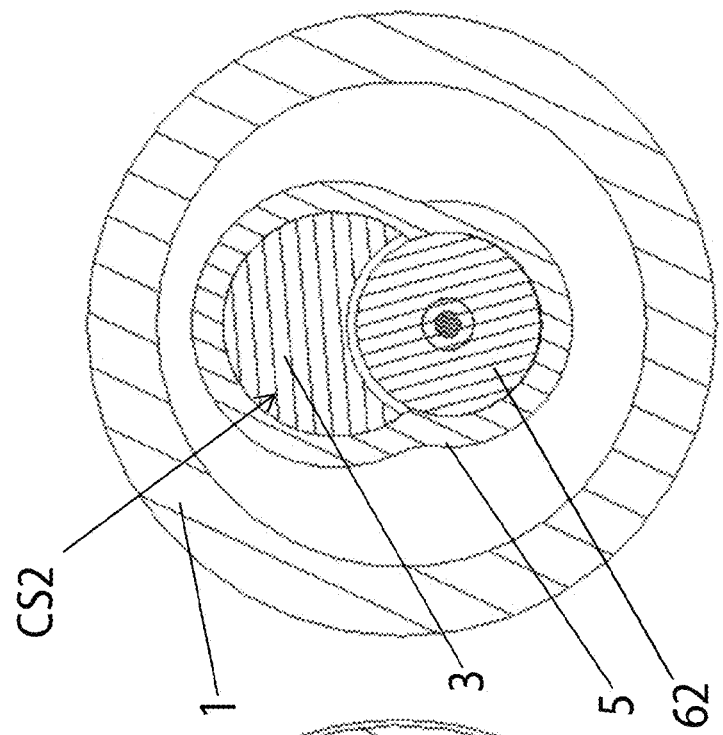
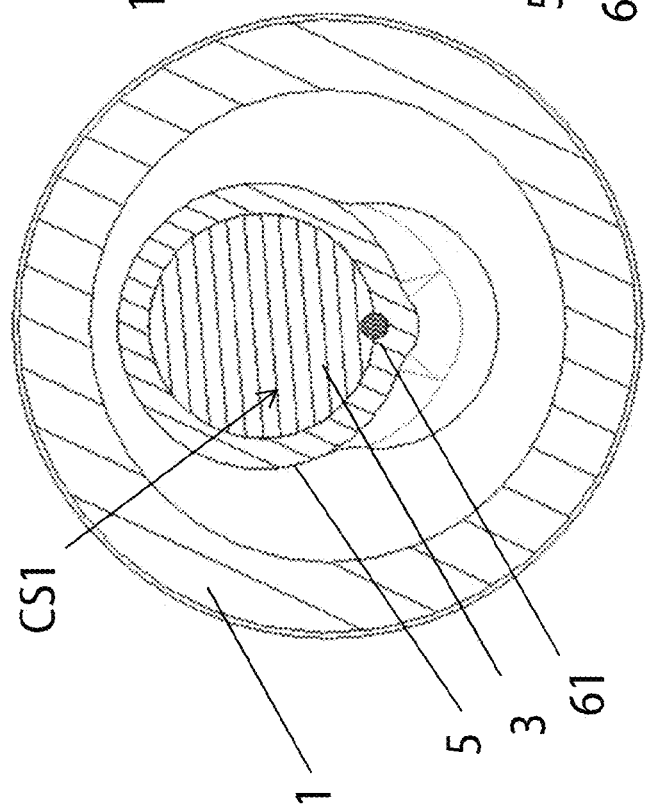

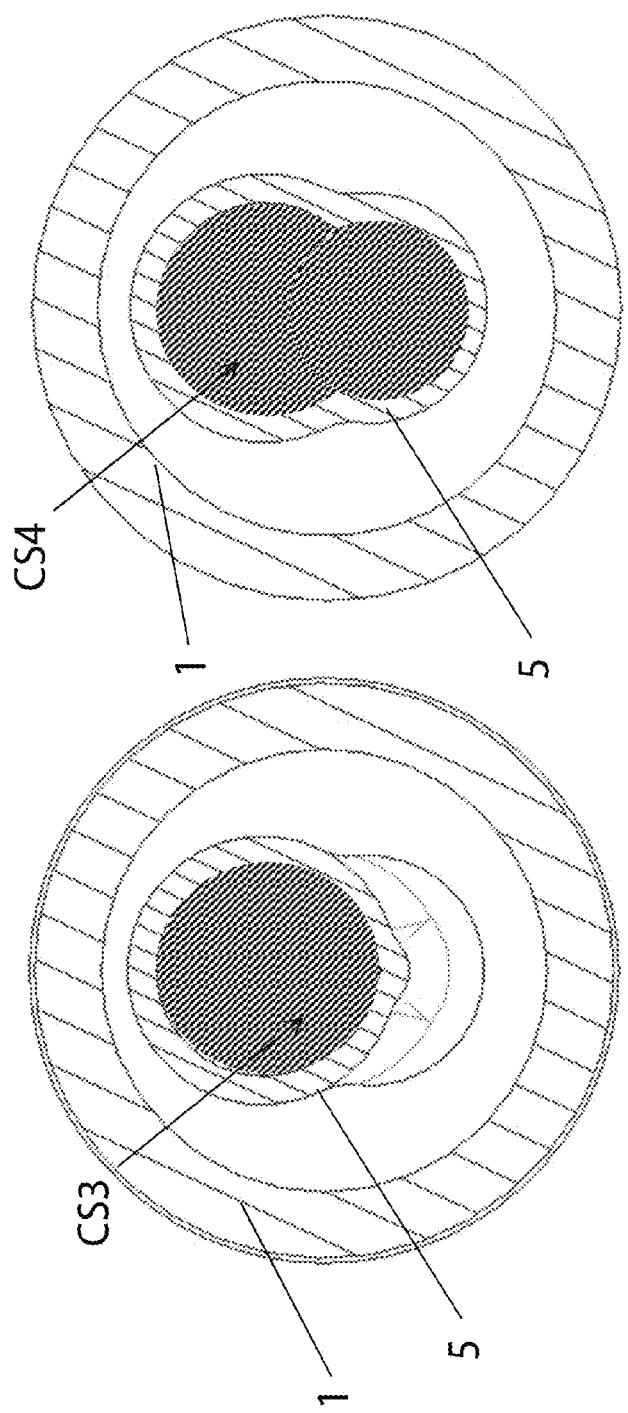

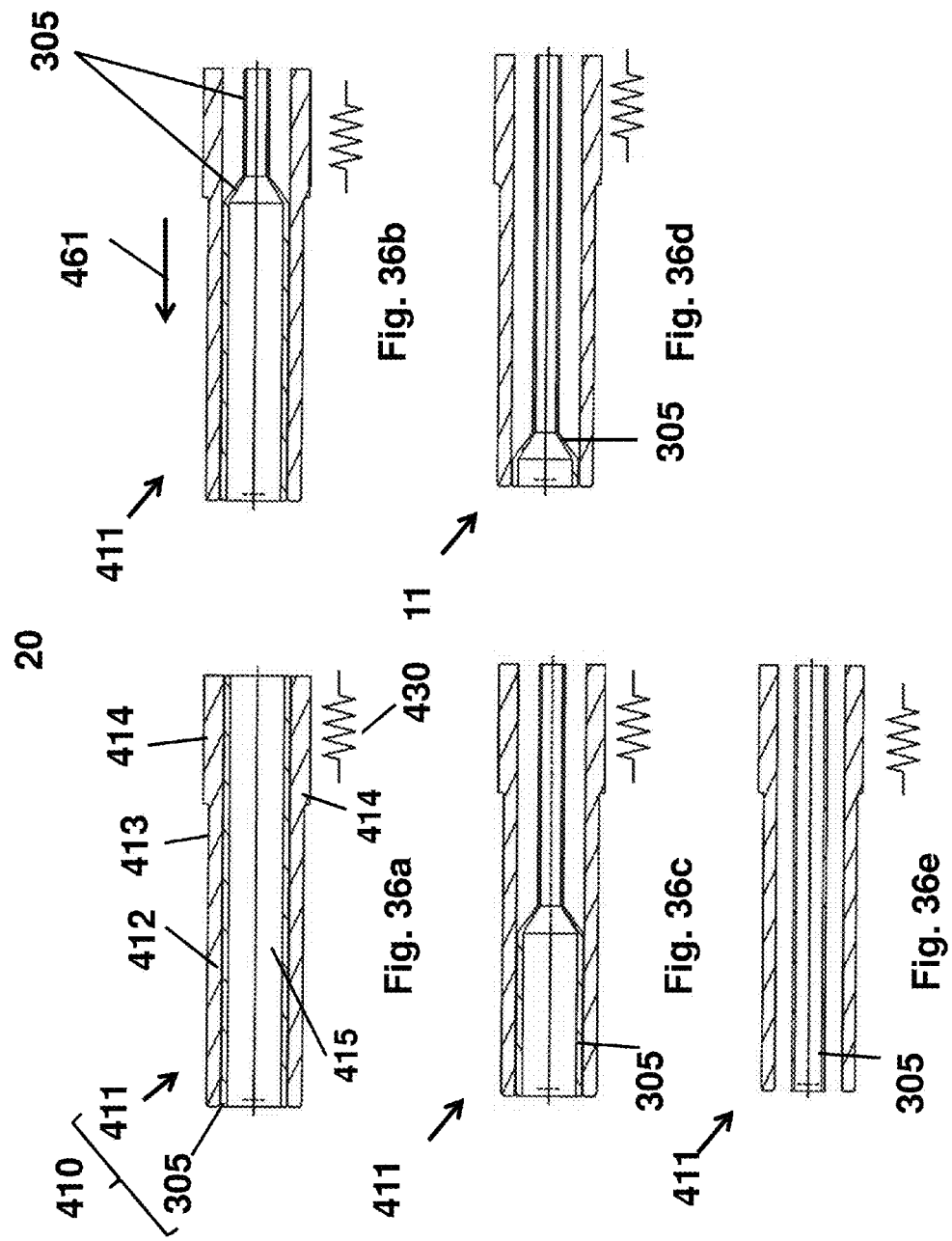

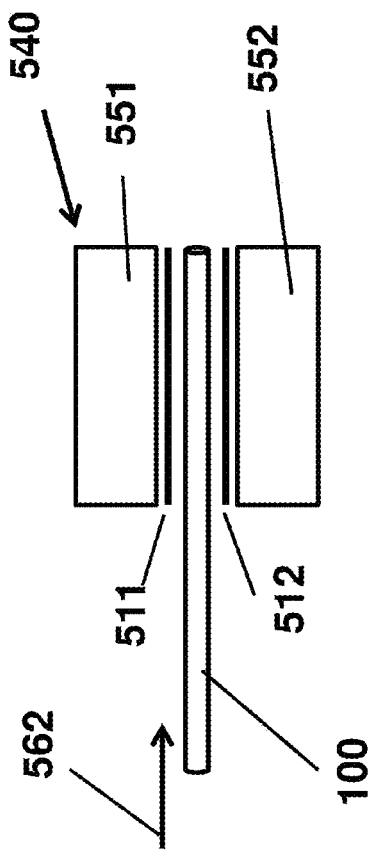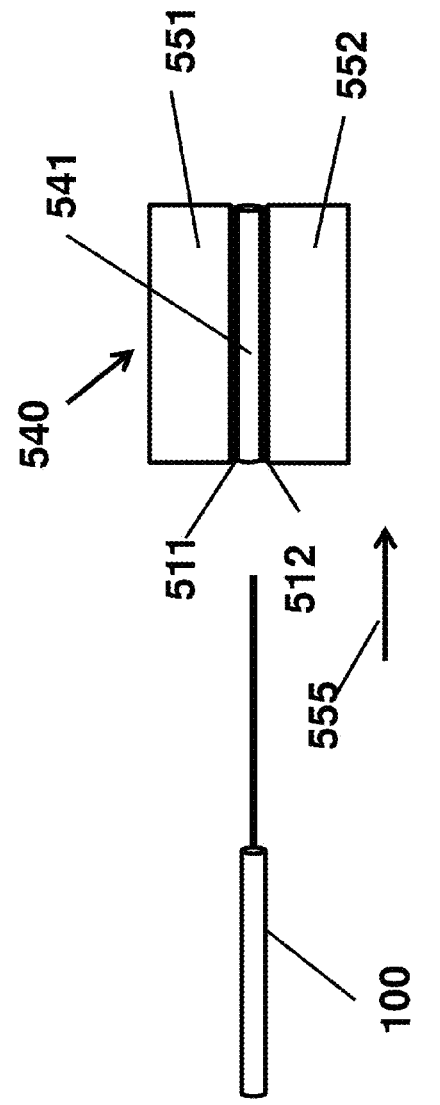
Fig. 40a
Fig. 40b

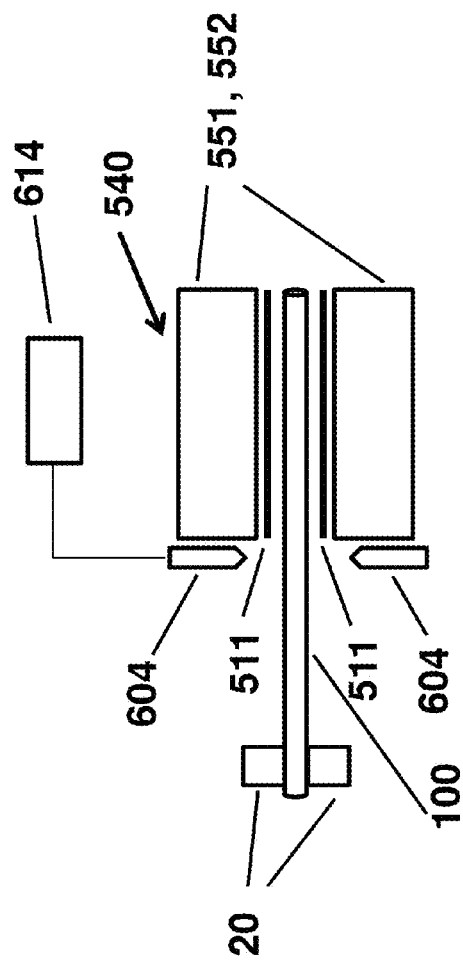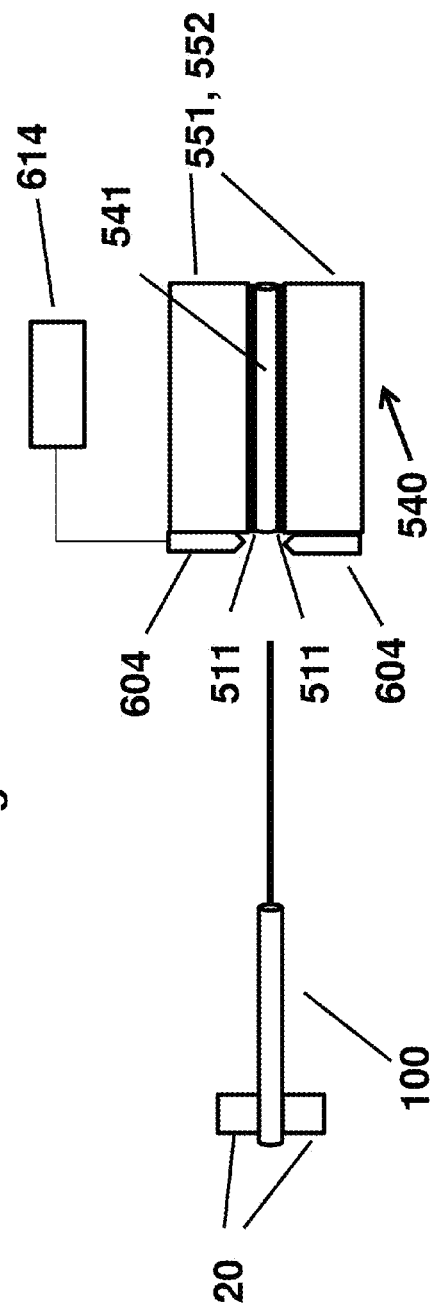

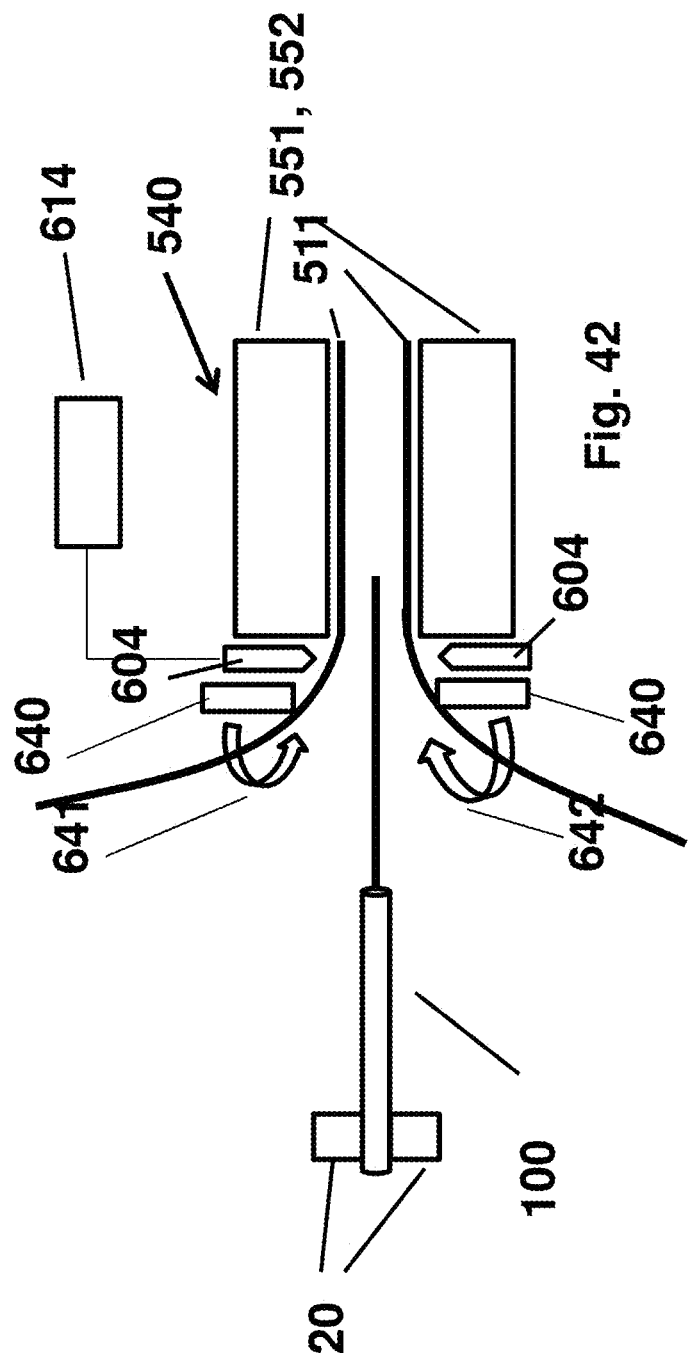

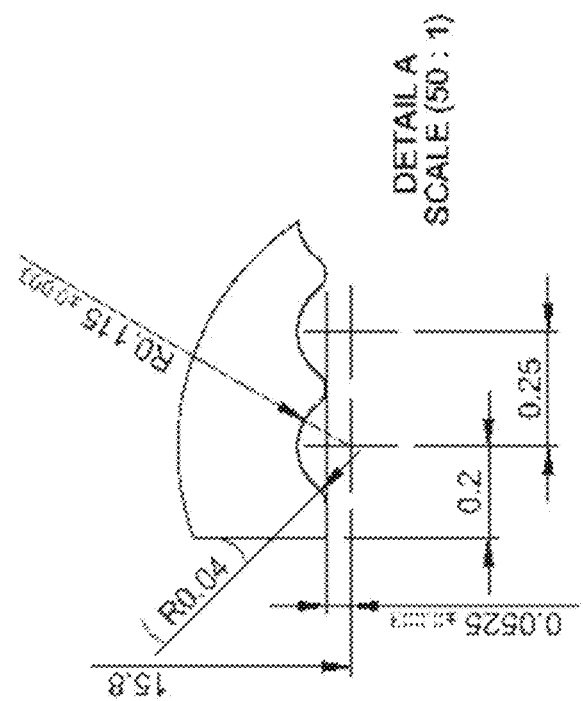
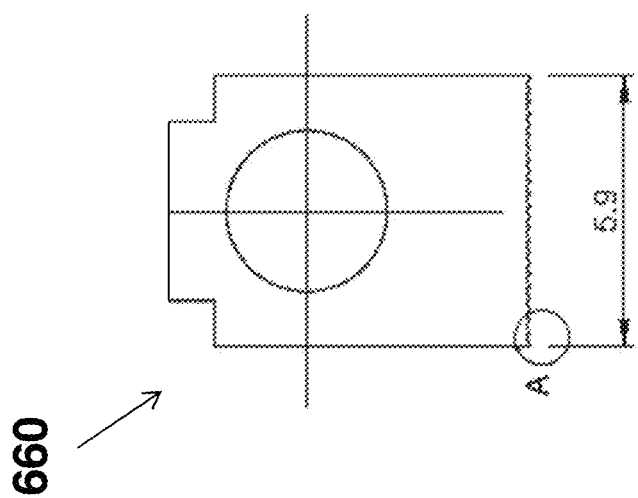
Fig. 43b
Fig. 43a

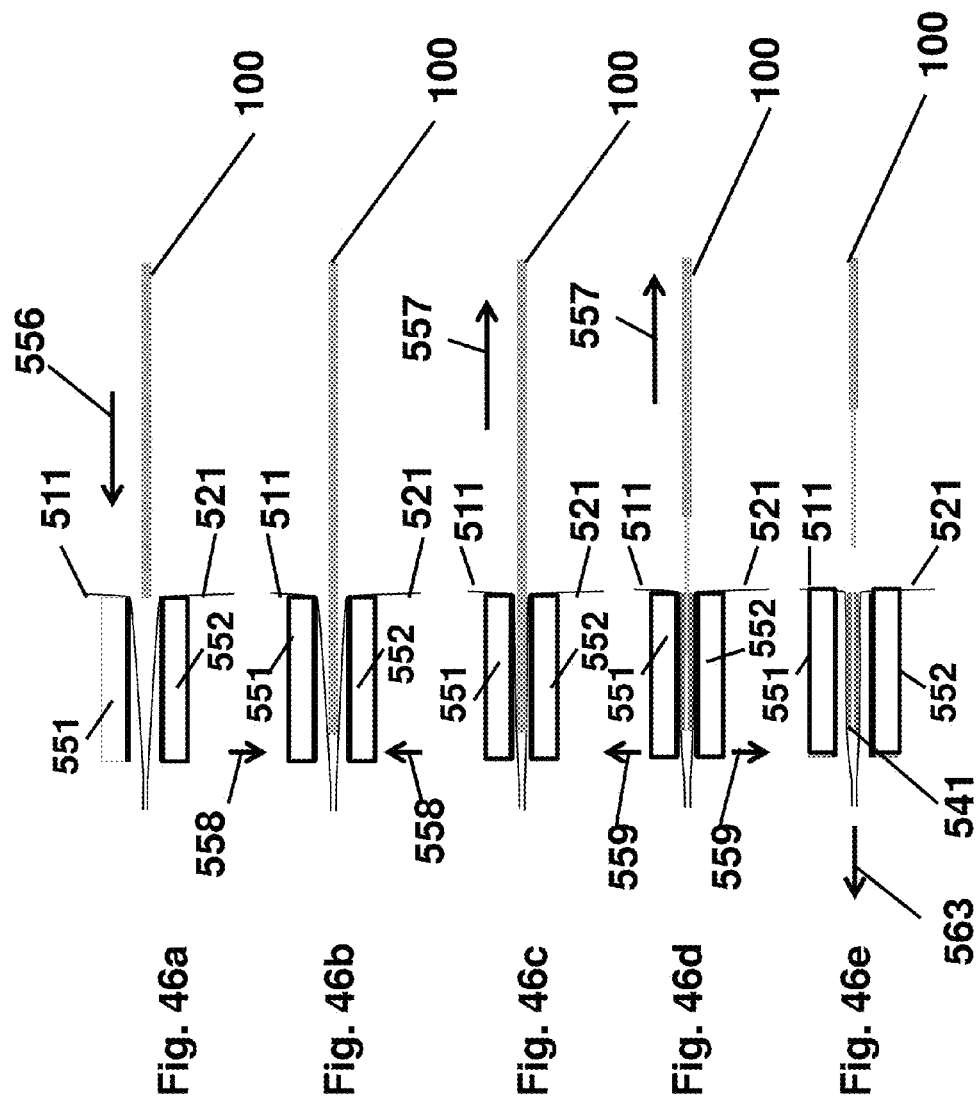

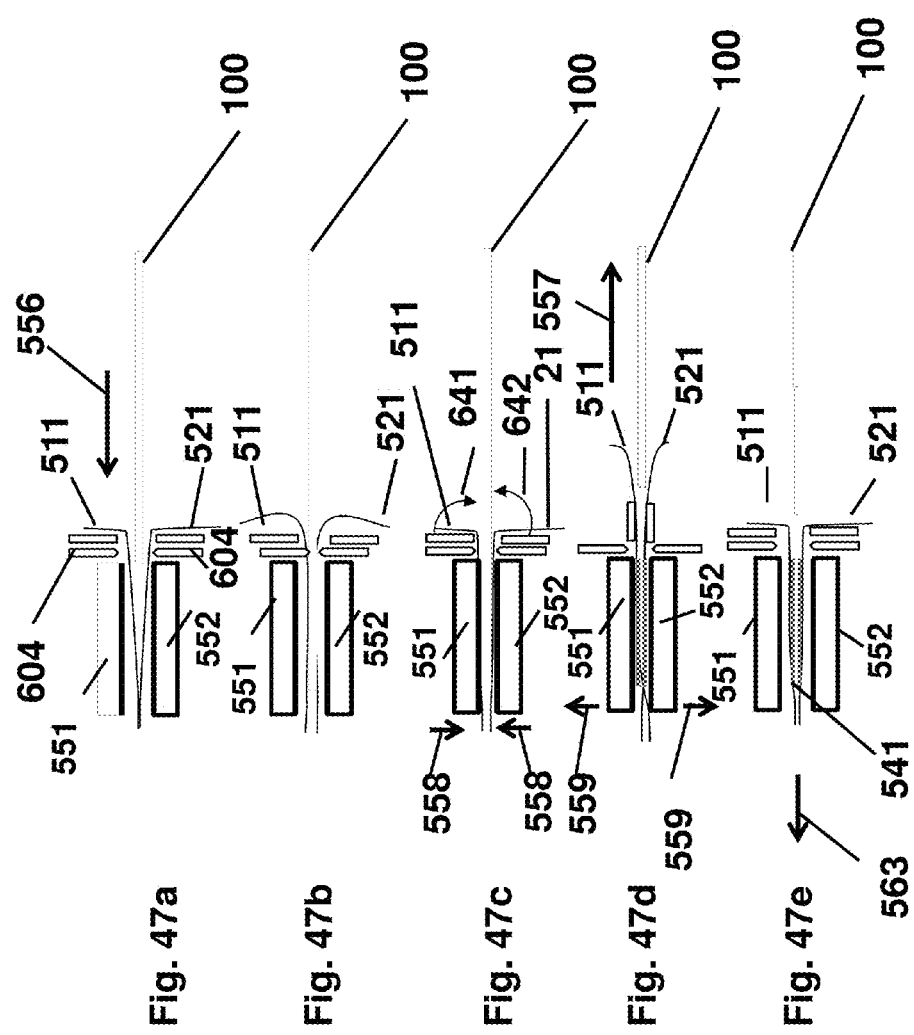

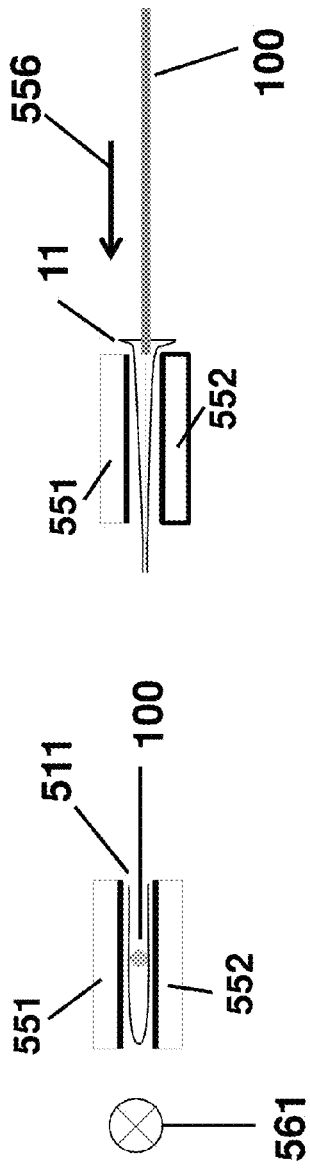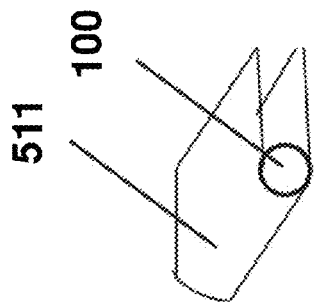
Fig. 49b
Fig. 49c
Fig. 49a

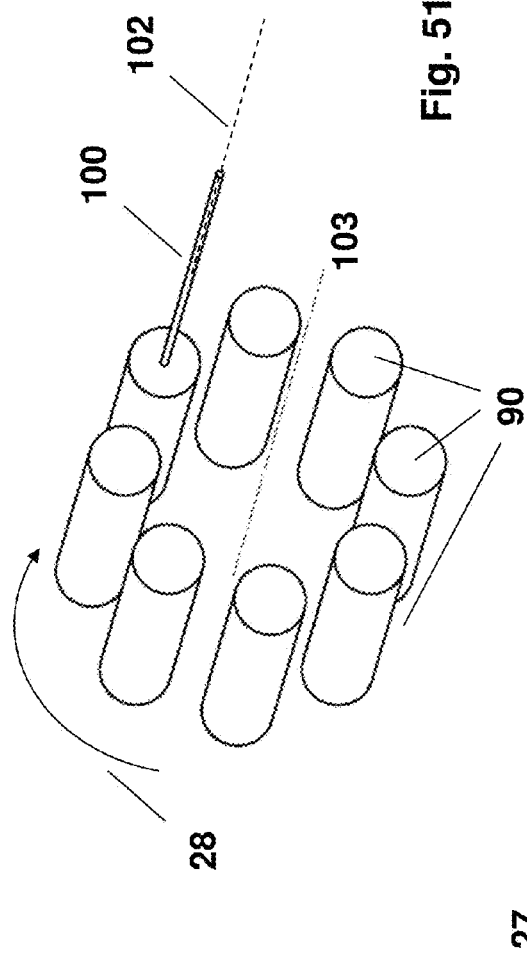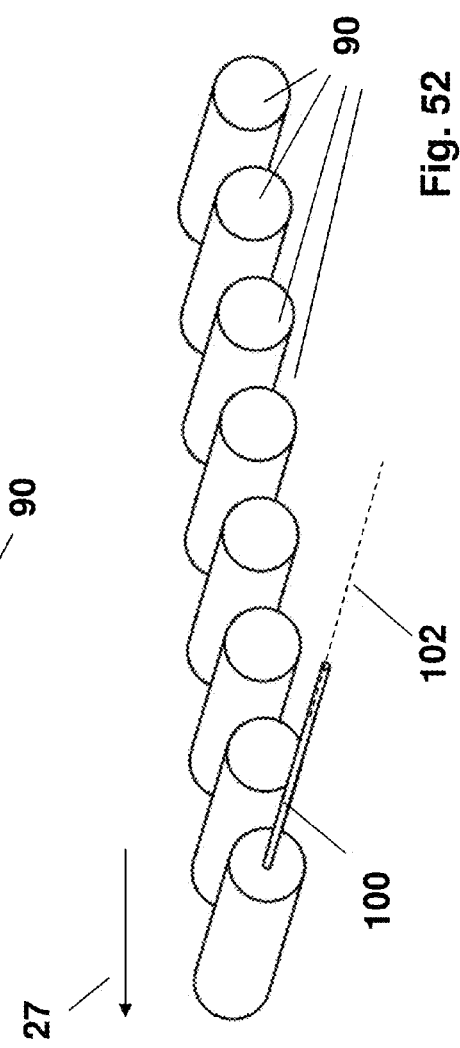

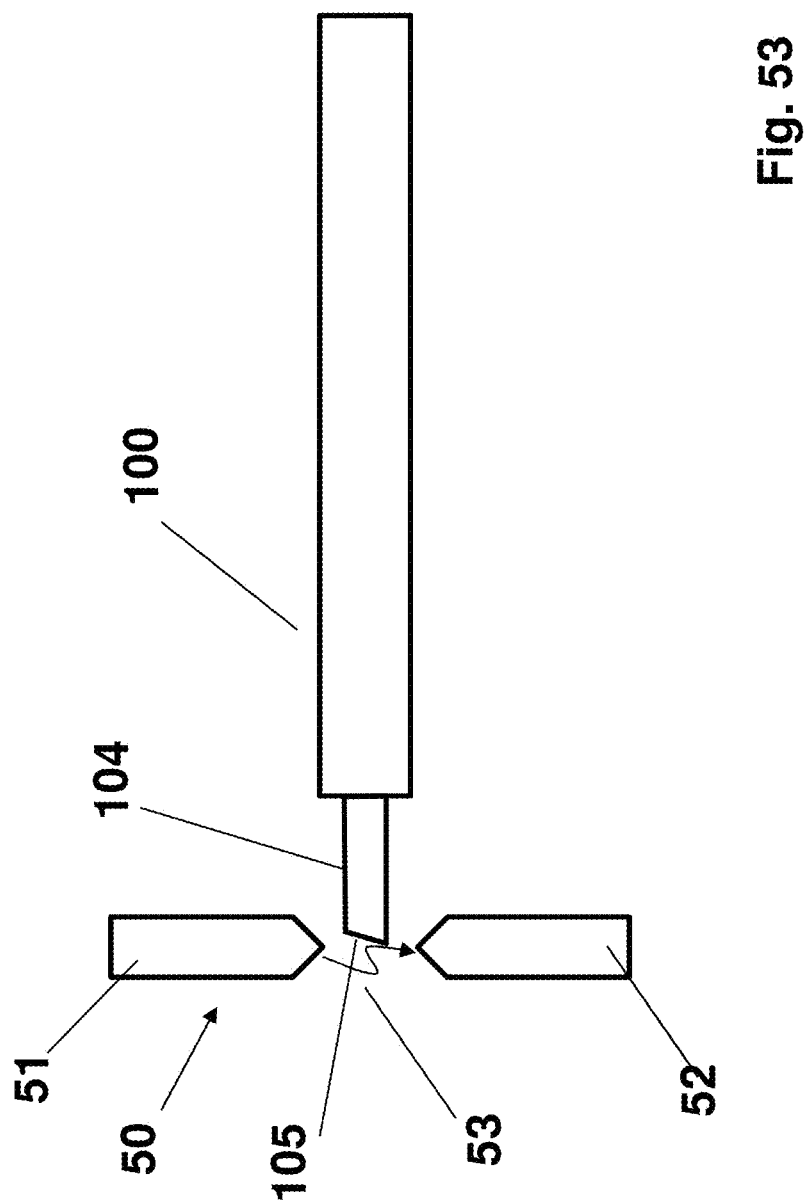

no brittle fracture indication edges are undamaged

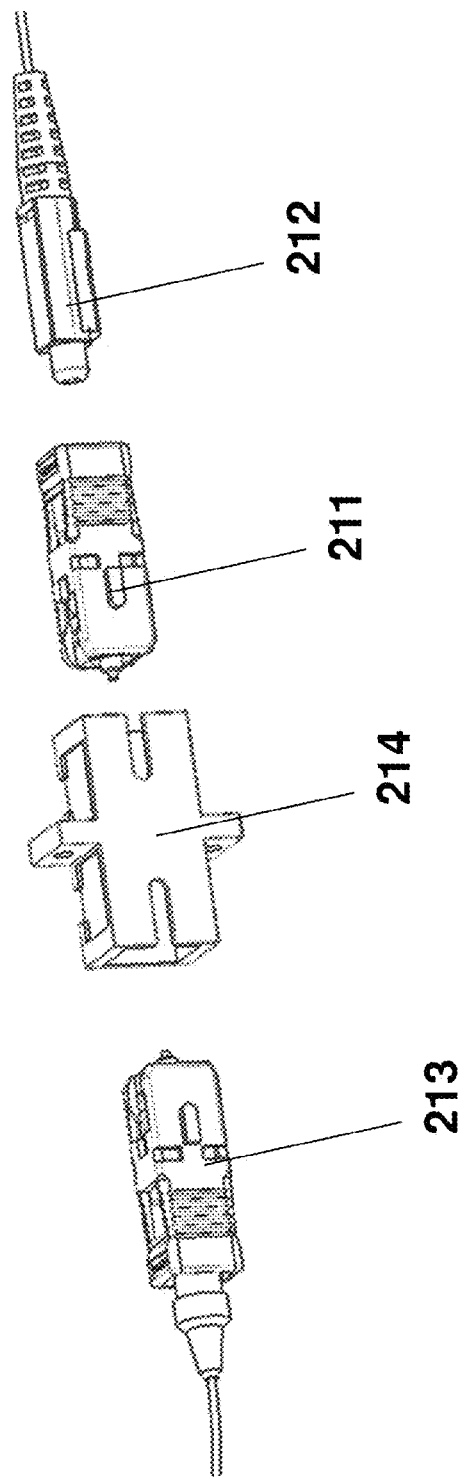

PORTABLE DEVICE FOR ATTACHING A CONNECTOR TO AN OPTICAL FIBER

This application is being filed on 19 Aug. 2013, as a US National Stage Application of PCT/US2012/024189, filed 7 Feb. 2012 in the name of Tyco Electronics Raychem BVBA, a Belgian national corporation, and Tyco Electronics Corporation, a U.S. national corporation, applicants for the designation of all countries except the U.S., and, Danny Willy August Verheyden, a citizen of Belgium, David Donald Erdman, a citizen of the U.S., Michael Gurreri, a citizen of the U.S., Randall Bobby Paul, a citizen of the U.S., Jan Watte, a citizen of Belgium, Robert Charles Flaig, a citizen of the U.S., Alan Edward Plotts, a citizen of the U.S., Michael Aaron Kadar-Kallen, a citizen of the U.S., Shelly Anne Buchter, a citizen of the U.S., Jan Vandenbroeck, a citizen of Belgium, Patrick Billet, a citizen of Belgium, Stefano Beni, a citizen of Italy, Andre Johannes Maria Hilderink, a citizen of the Netherlands, Hernes Jacobs, a citizen of the Netherlands, Petrus Theodorus Rutgers, a citizen of the Netherlands, Petrus Theodorus Krechting, a citizen of the Netherlands, Martijn Johannes Wolbers, a citizen of the Netherlands, Walter Mattheus, a citizen of Belgium, Cristian Radu Radulescu, a citizen of Romania, Paul Vits, a citizen of Belgium, Karel Johannes Van Assenbergh, a citizen of the Netherlands, Pieter Cornelis Johan De Jager, a citizen of the Netherlands, and Henk Jan Theodoor Van Der Pol, a citizen of the Netherlands, applicants for the designation of the U.S. only, and claims priority to U.S. Patent Application Ser. No. 61/443,933 filed on 17 Feb. 2011, U.S. Patent Application Ser. No. 61/443,942 filed on 17 Feb. 2011, European Patent Application Serial No. 11174376.1 filed on 18 Jul. 2011, U.S. Patent Application Ser. No. 61/544,880 filed 7 Oct. 2011, European Patent Application Serial No. 12151987.0 filed on 20 Jan. 2012, and European Patent Application Serial No. 12151988.8 filed on 20 Jan. 2012, the disclosures of which are incorporated herein by reference in their entirety. To the extent appropriate, a claim of priority is made to each of the above disclosed applications.

The present invention relates to the processing of optical fibers and, more particularly, to a portable device for attaching a connector to an optical fiber, and to means for automatically processing the optical fiber as well as individual processing devices and methods for optical fibers.

BACKGROUND TO THE INVENTION

Optical fiber processing devices can be used on level ground but also under difficult conditions, such as on ladders, on telegraph poles, on roofs.

When an optical fiber is processed, by for instance stripping, cleaning, cleaving, different devices appropriate for the chosen processing step have to be used. As a result when applying one of the mentioned processes, a stripping device, a cleaning device and a cleaving device must be stored separately and carried in often difficult surroundings. For example, when conducting work on a ladder, the worker conducts the desired processing using a related device and, thereafter, he/she must pull out another device after having placed the previous device in its initial position. Thus the worker must operate with the weight of several devices as a burden. Furthermore, for every processing operation, the worker must be skilled in the art in order to process the delicate optical fiber correctly.

Moreover, conventional optical fiber cutting devices have no specific integrated construction for collecting the debris which can arise as a result of processing an optical fiber, such as cut buffer material, coating, small and larger glass parts (depending on the glass break position). Therefore, optical fiber debris is directly discarded at a construction site, thus resulting in environmental pollution.

Patent application WO2006/112675 discloses a portable device for processing an optical fiber by means of several processing units, such as a stripping unit, an optical fiber cutting unit, a welding unit for welding junction portions of two optical fibers. Stripping, cutting, cleaning and welding can all be performed using a single apparatus.

A need still exists for a convenient and easy to use portable device for processing an optical fiber.

SUMMARY OF THE INVENTION

It is an object of the present invention to provide a method and a portable device for autonomously attaching a connector to an optical fiber as well as individual processing devices and methods for optical fibers.

This object is met with the methods and means according to the independent claims of the present invention. The dependent claims relate to preferred embodiments.

The invention provides in one embodiment a portable device for attaching a connector to an optical fiber, the optical fiber having an end, the device comprising means for receiving the optical fiber at the end of the optical fiber; and a station for autonomously attaching the connector to the optical fiber.

Another embodiment of the present invention provides a method for attaching a connector to an optical fiber by means of a portable tool, the method comprising receiving the optical fiber by the portable tool at an end of the optical fiber; coupling a station of the portable tool to the end of the optical fiber for attaching the connector to the optical fiber; and autonomously attaching the connector to the optical fiber at the station.

An important advantage of a device in accordance with the invention is that it can be used by an unskilled operator, whereas operations on optical fibers usually require high skill. Another advantage is that the device is convenient and very easy to use.

In some embodiments of a device in accordance with the invention, a connector is attached to an optical fiber.

In some embodiments of the invention, one or more preparation steps are performed to prepare an optical fiber for attachment of a connector.

In embodiments of the invention, an optical fiber is prepared for attachment of a connector and subsequently the connector is attached.

An advantage of the invention is the high degree of automation of the device.

The present disclosure includes various aspects which can be integrated in one toll or can be separate devices relating to fiber optic connectors, fiber optic connector processing systems, and fiber optic connector processing methods. It will be appreciated that such aspects are ideally suited for application with a portable device for pre-processing and attaching a fiber optic connector to an optical fiber. However, it will also be appreciated that the various connectors, systems and methods disclosed herein can further be used alone or in various combinations outside of their applicability to such a portable device. Thus, the connectors, systems and methods disclosed herein have broad applications to any type of optical fiber and connector processing operation and certainly are not limited for use with a portable connector installation device.

The present disclosure also relates to a device including a housing defining a fiber insertion opening for receiving an optical fiber. The device can include a mechanism within the housing for securing a connector body on the optical fiber when the optical fiber is inserted in the fiber insertion opening. In certain embodiments, the device can also include one or more stations within the housing for pre-processing an optical fiber prior to securing the connector body onto the optical fiber. One example station includes an arc treatment station. Another example station includes a stripping station. A further example station includes a cleaving station. Another example station includes a testing station. A further example station includes a connector body holding and heating station. In certain embodiments a connector cartridge holding a plurality of connector bodies can be mounted within the housing. In certain embodiments, the connector cartridge can function as a carousel for consecutively positioning connector bodies at a dispensing location where the connector bodies are individually loaded from the connector cartridge to the connector body and heating station. In certain embodiments, at least some of the stations are carried by a carriage that is moveable back and forth (i.e., the carrier reciprocates) in an orientation along an insertion axis of the optical fiber. In certain embodiments, a fiber clamp is mounted to the carriage and is movable along the insertion axis of the optical fiber. In certain embodiments, the clamp is used to pull a predetermined length of optical fiber into the housing along the insertion axis. In certain embodiments, a first clamp is provided on the carrier, a second fiber clamp is axially fixed relative to the housing, and a third fiber clamp is positioned between the first and second fiber clamps. In certain embodiments, the carrier can pivot about a pivot axis parallel to the fiber insertion axis. In certain embodiments, the carrier includes a rotating head that can be indexed about an axis of rotation that is generally transverse with respect to the fiber insertion axis. In certain embodiments, the arc treatment station, the test station and the connector holder and heating station can be mounted on the rotating head and the rotating head functions as a carousel for positioning the stations in alignment with the fiber insertion axis. In any of the above embodiments, a waste collection system can be provide within the housing for collecting debris such as stripped coatings and cleaving debris. Any of the above features can be provided individually or in any combination with one another.

The present disclosure also relates to a device including a housing defining a fiber insertion opening for receiving an optical fiber. The device can include a mechanism within the housing for stripping an optical fiber and for arc treating an unspliced end of the optical fiber.

In one embodiment in accordance with the invention, an optical fiber is received by the device, all required operations to prepare the fiber are performed, and subsequently the optical fiber is attached; this whole process is completely automatic, i.e. an optical fiber is input to the device, and the output of the device is the optical fiber with attached connector, and this without any manual action from e.g. the operator. This process may take about 40 seconds.

In another embodiment in accordance with the invention, the operations in the different stations of the device are performed autonomously, but, between operations, there is an action from e.g. the operator. The operator may e.g. push a button to start a next operation, for instance after checking a status of a previous operation on a display. Thus, the operations are still performed autonomously, but the complete process is not fully automatic.

In yet another embodiment of the invention, not all preparation steps are performed in the device but one or more pre-treatment and/or post-treatment steps are performed outside of the device. An example of such a pre-treatment step is the removal of an outer, reinforced coating (such as e.g. a Kevlar coating) from the optical fiber. An example of a post-treatment step not performed in the device is the attachment of a boot to the connector: the boot may be slid by the operator over the optical fiber before the fiber is prepared and the connector may be attached by the tool, and afterwards the boot is attached to the connector by the operator. In another embodiment, the boot may be attached automatically by the device.

Another advantage of the device in accordance with the invention is its high reliability: optical fibers are prepared and a connector is attached with a very high degree of reliability, and this combined with a very high degree of automation.

Still another advantage of some embodiments of a device in accordance with the invention is that optical fibers having different diameters can be processed.

An advantage of some embodiments of a device in accordance with the invention is that different types of optical fibers can be processed, including tight and semi-tight types.

Another advantage is that some embodiments of a device in accordance with the invention require just 30 cm of free length of optical fiber to prepare the fiber and attach a connector. For prior art mechanical splicing, 1.5 to 2 m of fiber is required.

A device according to the present invention is portable. It is preferred that the device is hand-held. In some embodiments in accordance with the invention, the device can be mounted on a tripod. In some embodiments, the device can be put on a table. In some embodiments, it can be put in a firm box, e.g. to protect the device using transport. In one embodiment, a device in accordance with the invention has an approximately cylindrical shape, with a diameter of about 8 cm and a length of about 30 cm.

Different processing steps may be performed in a device in accordance with the invention, to prepare an optical fiber for attaching a connector, and to attach the connector. These processing steps that will be discussed in detail further below may include:

Stripping
Cleaning
Tensile test
Cleaving
Heat treatment, such as arc treatment
Inspection
Place connector and attach connector Not all these processing steps are necessarily included. The order in which the steps are performed may vary. Other steps may be included. The connector may comprise several parts (e.g. the "engine", or inner part, and the "outer housing") that may be placed in different substeps.

The present invention provides a method, for instance a heat treatment such as arc treatment, for mechanically connecting optical fibers wherein the optical fibers have a high mating endurance, i.e. a high endurance to a large number of connection and disconnection operations, which are also called "matings" and "dematings" in this document. It is another advantage of embodiments of the present invention to provide optical connectors that have a high mating endurance. The optical connectors may be ferrule-less connectors. It has been found that the mating endurance of mechanically cleaved optical fibers is improved appreciably when exposing the bare ends of the optical fibers, i.e. the cladding and the core of the optical fibers from which the coatings are removed, to a specific heat treatment. According to embodiments of the present invention the specific heat treatment may be a specific arc treatment. According to embodiments of the present invention, optical fibers that were mechanically cleaved and subsequently heat treated in accordance with the invention may be connected and disconnected a large number of times, e.g. up to fifty times and more. This allows for a new ferrule-less connector that is very well suited to be used in the FTTx segment (such as FTTH, "Fiber To The Home"). In this segment, a very easy field installation is an advantage.

Ferrule-less connectivity is known. However, earlier attempts to introduce ferrule-less connectors in the so-called outside plant (i.e. the network facilities outside of the central office) were not successful.

The successful development of a low-loss easy-to-install ferrule-less connector according to embodiments of the present invention provides a significant advantage.

One of the main advantages provided by embodiments of the present invention is a connector having durability after a sequence of matings and dematings. In embodiments in accordance with the invention, the connection an have low insertion loss and high return loss after up to fifty mating-demating cycles.

The invention provides in an embodiment an optical fiber connector for mechanical connection to another optical fiber connector, the optical fiber connector comprising an optical fiber having a bare end, the bare end having an end face and comprising a core and a cladding surrounding the core, wherein the cladding has a radius of curvature at the end face in the range from 0.4 mm to 4 mm. The radius of curvature of said cladding may be obtained by a heat treatment of said end face. The core may have a radius of curvature at said end face in the range from 0.14 mm to 4 mm. The radius of curvature of the core may be smaller than the radius of curvature of the cladding.

An embodiment of the invention provides an optical fiber connector wherein the core protrudes from the cladding with a protrusion height in the range from 10 to 200 nm, preferably in the range from 10 to 150 nm, more preferably in the range from 30 to 60 nm. The protrusion of the core from the cladding may be obtained by a heat treatment of said end face.

In one embodiment of an optical fiber connector according to the invention, said optical fiber has an axis and said end face makes an angle with respect to a plane perpendicular to said axis, wherein said angle is in the range from 5° to 50°, preferably in the range from 5° to 15°.

The invention further provides in an embodiment of the invention an optical fiber connector combination comprising a first optical fiber connector according to the invention, a second optical fiber connector according to the invention, and an adapter for connecting said first and said second optical fiber connector.

In another embodiment of the invention, an optical fiber connector combination is provided comprising a first optical fiber connector according to the invention and a second optical fiber connector according to the invention, wherein said first optical fiber connector is a male connector and said second optical fiber connector is a female connector.

An embodiment of the present invention provides an optical fiber connector for mechanical connection to another optical fiber connector, said optical fiber connector comprising an optical fiber having a bare end, said bare end having an end face and comprising a core and a cladding surrounding the core, wherein said core has a radius of curvature at said end face in the range from 0.14 mm to 4 mm. Said radius of curvature of said core may be obtained by a heat treatment of said end face. Said cladding may have a radius of curvature at said end face in the range from 0.4 mm to 4 mm. Said radius of curvature of said core may be smaller than said radius of curvature of said cladding.

The invention provides in an embodiment an optical fiber connector wherein said cladding has a radius of curvature at said end face in the range from 0.4 mm to 4 mm. The core may have a radius of curvature at said end face in the range from 0.14 mm to 4 mm. The radius of curvature of said core may be smaller than said radius of curvature of said cladding.

In one embodiment the present invention provides a method for mechanically connecting a first and a second optical fiber connector, the first optical fiber connector comprising a first optical fiber having a first bare end and comprising a core and a cladding surrounding the core, the method comprising the steps of mechanically cleaving said first bare end, thus obtaining a first end face of said first bare end; and heat treating said first end face. In an embodiment, the method further comprises heat treating said first end face such that said cladding has a radius of curvature at said first end face in the range from 0.14 mm to 4 mm after said heat treating. Said second optical fiber connector may be a ferruled optical fiber connector, the method further comprising connecting said first optical fiber connector to said second optical fiber connector via a converter. Said second optical fiber connector may comprise a second optical fiber having a second bare end, the method further comprising the steps of mechanically cleaving said second bare end, thus obtaining a second end face of said second bare end; and heat treating said second end face. The method may further comprise heat treating said second end face such that said cladding has a radius of curvature at said second end face in the range from 0.14 mm to 4 mm after said heat treating. The method may further comprise connecting said first optical fiber connector to said second optical fiber connector and subsequently disconnecting said first optical fiber connector from said second optical fiber connector, wherein said connecting and subsequently disconnecting is performed a plurality of times, e.g. at least ten times, or at least fifty times.

In one embodiment, the invention provides a method comprising connecting said first optical fiber connector to said second optical fiber connector via an adapter. Said adapter may comprise an index matching material, the method further comprising connecting said first optical fiber connector to said second optical fiber connector via said index matching material.

Then invention provides in an embodiment a method wherein said first optical fiber connector is a male connector and said second optical fiber connector is a female connector.

In one embodiment, the invention provides a method comprising applying said electric arc treating during a time period in the range from 120 ms to 280 ms, preferably during a time period in the range from 150 ms to 250 ms. Said electric arc treating may be applied using a cathode and an anode having a separation distance and wherein said separation distance is in the range from 1.5 mm to 4 mm.

The invention provides in an embodiment a method wherein said mechanical cleaving is an angled cleaving. Said angled cleaving may be a cleaving under an angle in the range from 5° to 50°, preferably in the range from 5° to 15°.

The invention provides in one embodiment a method for mechanically connecting a first and a second optical fiber connector, the first optical fiber connector comprising an optical fiber having a bare end, the method comprising the steps of mechanically cleaving the bare end, thus obtaining an end face of the bare end and heat treating the end face.

In the embodiments disclosed above, the heat treatment may be an electric arc treatment.

The invention further provides in an embodiment an optical fiber connector comprising an optical fiber having a bare end, the bare end having an end face, the end face having a rounded edge. The insertion loss of a connection of two said optical fiber connectors is smaller than 0.25 dB. This embodiment of an optical fiber connector is obtained by an embodiment of a method in accordance with the invention.

Embodiments of the invention may have one or more of the following advantages, as discussed in more detail further below. The connection is relatively inexpensive. The connection has low insertion loss and high return loss. A large number of connections and disconnections is possible without significant deterioration of the quality of the optical connection. The power required for the heat treatment of the end face is relatively low, so that the method can be used as one of the fiber end treatment steps in a portable, even in a hand-held tool for preparing an optical fiber end for attaching a connector, possibly including attaching the connector by the tool.

When comparing embodiments according to the invention to the prior art laser cutting and simultaneous polishing method disclosed above, embodiments of the present invention use mechanically cleaving and only use heat treatment for treating the end face, not for cutting. The heat treatment of the end face can thus be done using lower power levels. The edges of the end face are rounded by the heat treatment. The lower power level allows to obtain rounded edges having a smaller radius of curvature. Insertion losses are also lower when using a heat treatment in accordance with the invention, when compared to the laser cutting and polishing method. Without being hindered by theory, we believe that a smaller radius of curvature will result in a smaller insertion loss.

The heat treatment applied to the end face can be laser heating as a result of laser irradiation, or a plasma arc treatment, or an electric arc treatment, or another heat treatment as known in the art.

The irradiation can be applied under different angles and positions as well, for instance frontally illuminating the fiber end face or illuminating the fiber end from the side. The laser can be operated in pulsed mode or in continuous mode; a laser can be classified as operating in either continuous or pulsed mode depending on whether the power output is essentially continuous over time or whether its output takes the form of pulses of light on an appropriate time scale.

In a preferred embodiment of the present invention an electric arc treatment is used as heat treatment for the optical fiber end face. An electric arc treatment has low power consumption.

Optical fibers having heat treated end faces according to the invention show very good connection and disconnection characteristics. Inserting a bare end of an optical fiber in an optical fiber aligning element, making a connection to another optical fiber, and subsequently retracting the optical fiber end, can be repeated tens of times (e.g. fifty times and more), without significant influence on the quality of the optical fiber connection.

In some embodiments of the invention, the mechanical cleaving of the optical fiber end is a perpendicular cleave, i.e. the cleaved end face is perpendicular to the axis of the bare optical fiber.

In other embodiments of the invention, the mechanical cleaving is an angled cleaving. In this case the cleaved end face makes an angle larger than 0° with the plane perpendicular to the fiber axis. As a result, the fiber is no longer rotationally symmetric, and has slightly different lengths along a direction parallel to the axis of the optical fiber. In one embodiment, the angle is in the range from 5° to 50°. In another embodiment, the angle is in the range from 5° to 15°, and preferably in the range from 6° to 10°, e.g. at 8°. As disclosed already above, an index matching material, for instance an index matching gel, can be used in a mechanical fiber connection to improve the coupling of light from one fiber end to the other one. The bare ends of the optical fibers usually contact each other only over a limited area of their end faces. The index matching gel can fill up the possible "gaps" between the end faces and thus reduce Fresnel reflections and increase the efficiency of the optical connection.

Embodiments of the invention include a method for connecting a first and a second optical fiber connector, each connector having a bare end, the bare ends being mechanically cleaved and having heat treated end faces.

The invention further includes a method for connecting such first and second connectors via an adapter. The adapter may comprise an index matching material.

The invention also includes a method for connecting such first and second connectors, wherein the first connector is a male (inserting) connector and the second one is a female (receiving) type optical fiber connector.

Yet another embodiment of the invention comprises a method for connecting a first optical fiber connector having a bare end, the bare end being mechanically cleaved and having a heat treated end face in accordance with the invention, to a ferruled optical fiber via a converter. The converter may comprise a special transition element that includes a short piece of optical fiber with a ferrule at one end while being ferrule-less at the other end. The first optical fiber is then connected to the ferrule-less end of the transition element in the converter, and the ferruled optical fiber is connected to the ferrule in the converter. The ferrule-less end of the transition element may be mechanically cleaved and have a heat treated end face in accordance with the invention.

According to another aspect of the invention, an optical fiber connector attached to an optical fiber is provided, whereby the optical fiber connector comprises an outer housing e.g. a connector body; an inner part e.g. a fiber attachment element inserted in said connector body; and a thermoformable material attaching the optical fiber to said fiber attachment element, wherein said thermoformable material has a processing temperature; and wherein said connector body is made from one or more materials having a weakening temperature below said processing temperature.

According to another aspect of the invention, a device is provided for attaching an optical fiber to an optical fiber connector, wherein the optical fiber connector comprises a fiber attachment element and a connector body, the device comprising means for receiving the optical fiber connector and the optical fiber; means for attaching the optical fiber to the fiber attachment element; and moving means for moving the fiber attachment element from an attachment position to a functional position, wherein the attachment position is for said attaching the optical fiber to the fiber attachment element, wherein the attachment position is provided outside of the connector body and wherein the functional position is provided inside the connector body.

Further, the moving means may be adapted for moving the fiber attachment element from a preliminary position to the attachment position, wherein the preliminary position is provided inside the connector body.

In some embodiments in accordance with the invention, an optical fiber connector comprises a connector body and a fiber attachment element, to which an optical fiber is to be attached. In embodiments of methods in accordance with the invention, the fiber attachment element can have at least two positions with respect to the connector body. One of these positions is the functional position, wherein the optical fiber connector is adapted for being connected to another optical device, such as another optical connector, or to any other optical device as known in the art, e.g. a light emitting device such as a LED, a converter to connect the optical connector to another type of connector, etc. In the functional position, the optical fiber is attached to the fiber attachment element, and the connector body shields the fiber attachment element, and the attached optical fiber, from the outside environment, i.e. from contamination. Besides the functional position, the fiber attachment element may have an attachment position, different from the functional position, with respect to the connector body, and a preliminary position, which is preferably different from the functional position but which in some embodiments may coincide with the functional position. In the preliminary position, the fiber attachment element is shielded by the connector body from the outside environment, i.e. from contamination; the optical fiber is not yet attached to the fiber attachment element in this position.

In the attachment position, the fiber attachment element is located outside of the connector body. This means that preferably a portion of the fiber attachment element is still coupled to the connector body, more preferably that this portion is still in the connector body, while another portion of the fiber attachment element, to which portion the optical fiber is to be attached, is outside of the connector body. To attach the optical fiber to the connector, the fiber attachment element may then be moved from the preliminary position to the attachment position, where the optical fiber is attached. After the attachment, the fiber attachment element is then moved again inside the connector body, to the functional position which, as discussed above, may be different from the preliminary position. The fiber attachment element may be locked in the connector body in the functional position, so that it cannot be removed from the connector body; e.g. a snap fastener or another system as known in the art may be used to lock it. Further, the connector may comprise a "soft locking" system that locks the fiber attachment element so that it does not move (e.g. by gravity) out of the connector body in the preliminary position. The locking system is "soft", which means that by exerting a small force the fiber attachment module may be moved out of the connector body. Further, the connector body may comprise a stop to retain the fiber attachment element when moving it to the attachment position.

Embodiments of the connector in accordance with the invention have numerous advantages. The fiber attachment element is most of the time shielded from the outside environment, i.e. from contamination, by the connector body. If the optical fiber is attached to the connector by using a thermoformable material such as a heat shrink tube, only materials of the fiber attachment element have to be able to withstand a high temperature, such as e.g. 120° C., that is required for the attachment, and different types of materials may be used for the connector body.

To attach the optical fiber to the fiber attachment element, several methods may be used. A preferred method is to apply a thermoformable material, e.g. a heat shrink material such as a heat shrink tape or, preferably, a heat shrink tube. Another preferred method is to apply a hot melt material, and to apply a heat shrink material such as a heat shrink tube over the applied hot melt material. Mechanical crimping, using an adhesive, possibly a UV hardening adhesive, or other suitable attachment methods as known in the art may also be used.

The connector is preferably pre-assembled in a connector cartridge, so that the fiber attachment element is located in the connector body, preferably in the preliminary position.

Another advantage of embodiments of the invention is that the attachment can easily be automated, e.g. in a portable device, even in a hand-held device.

Embodiments of the invention may be used to attach an optical fiber to a fiber connector for ferrule-less systems, or for ferruled optical fiber systems. An advantage of using a heat shrink tube is that it may provide strain relief by bridging the gap between the coating diameter, of e.g. 1000 µm, and the cladding diameter, of e.g. 125 µm, if the transition from coated fiber to bare fiber occurs within the fiber attachment element, which will usually be the case.

Embodiments of the herein disclosed device and methods for attaching an optical fiber in an optical fiber connector can be any of reliable, convenient, contamination avoiding and inexpensive. Moreover, IPA or other alcohols need not be used to clean the fiber prior to heat activation. In some embodiments of the present invention, the position of the bare optical fiber, i.e. of the core and the cladding (see below under the "definitions" for the meaning of the core and of the cladding), is fixed with respect to the connector; this is called fiber fixation. "Fiber fixation" is not the same as "fiber termination"; in fiber termination the optical fiber is simply attached to the connector, e.g. by attaching the outside of the coating to the connector housing; in that case, the glass part of the optical fiber, i.e. the cladding and the core, can still move, and is not fixed, with respect to the connector.

Embodiments disclosed herein can utilize a dimensionally recoverable element to assist in optical fiber retention. A dimensionally recoverable element is an element of which the dimensional configuration may be made to change substantially when subjected to heat treatment. Usually these elements recover towards an original shape from which they have previously been deformed, but the term "recoverable" as used herein, also includes an element which adopts a new configuration even if it has not been previously deformed. In embodiments of the present invention heat recoverable elements recover towards an original shape in an encapsulating and retaining form, in particular in an optical fiber retaining form.

An advantage of some embodiments of the invention is that fiber grow out is prevented. Fiber grow out is caused by the shrinking behavior of polymer jackets, i.e. the outer coating of optical fibers. Due to temperature differences (requirements for optical fibers are stability between −40° C. and 70° C.) fiber polymer jackets may shrink back, causing the core and the cladding, and usually also the inner coating (which may be an acrylic layer), to grow out of the polymer jacket.

In certain embodiments, the heat-recoverable element is a sleeve (e.g., a tube) that can include a longitudinal seam or can be seamless. In certain embodiments, the sleeve has a dual wall construction including an outer, heat recoverable annular layer, and an inner annular adhesive layer. In certain embodiments, the inner annular adhesive layer includes a hot-melt adhesive layer.

Preferably, the adhesive provides for primary retention of the optical fiber within a connector. The heat recoverable sheath functions to contain the adhesive and to cause the adhesive to flow into void areas between the fiber attachment element and the optical fiber to ensure that effective adhesive contact is made with the bare glass portion of the optical fiber, the coated portion of the optical fiber and the fiber attachment element. A relatively large amount of adhesive is used. For example, the process uses a heat shrink tube having an outer wall (i.e., layer) of heat recoverable material and in inner wall (i.e., layer) of adhesive in combination with a separate sleeve of adhesive that fits inside the inner wall to provide more adhesive for filling voids. Alternatively, the inner wall can be made thicker to provide the additional volume of adhesive.

In one embodiment, the sleeve is initially expanded from a normal, dimensionally stable diameter to a dimensionally heat unstable diameter that is larger than the normal diameter. The sleeve is shape-set to the dimensionally heat unstable diameter. This typically occurs in a factory/manufacturing setting. The dimensionally heat unstable diameter is sized to allow the sleeve to be inserted over two components desired to be coupled together. After insertion over the two components, the sleeve is heated thereby causing the sleeve to shrink back toward the normal diameter such that the sleeve radially compresses against the two components to secure the two components together. The adhesive layer is preferably heat activated during heating of the sleeve. In certain embodiments, the sleeve can be used to secure a coated optical fiber to a substrate such as an attachment member adapted to be secured within a connector body. In certain embodiments, the adhesive within the sleeve can bond directly to the substrate and the coated optical fiber, and the coated optical fiber can have a diameter of less than 300 microns. In certain embodiments, a bare glass portion of the coated fiber extends outwardly axially beyond an end of the sleeve. In certain embodiments, the sleeve can be used to anchor/axially fix a coating portion of an optical fiber to a bare glass portion of the optical fiber. In certain embodiments, the adhesive within the sleeve can bond directly to the coating portion and the bare glass portion of the optical fiber, and the bare glass portion of the optical fiber can extend outwardly axially beyond an end of the sleeve. The coating portion can have a diameter less than 300 microns.

An advantageous effect of the present invention is that even if there would be contamination present between the fiber and the heat-recoverable element, such as dust and dirt particles, the attachment of the fiber to the fiber attachment element would still be sufficient resulting in good optical properties. In addition, the present invention prevents modal noise caused by microbends, which are quite often a problem for mechanical crimping systems.

Another aspect of the invention involves a method for attaching an optical fiber in an optical fiber connector. In an embodiment, the optical fiber connector comprises a fiber attachment element, a thermoformable material such as a heat-recoverable element surrounding said fiber attachment element and a connector body surrounding said thermoformable material, and the method comprises the steps of inserting the optical fiber into the optical fiber connector; and activating the thermoformable material, thus attaching the optical fiber to the fiber attachment element.

Activating the thermoformable material may be done e.g. by heating it. The thermoformable material may be a heat shrink material. The heat shrink material may be a heat shrink tube. It may be a heat shrink tape.

In one embodiment of a method to attach the optical fiber to the fiber attachment element, a thermoformable material such as a heat-recoverable element is used, e.g. a heat shrink material such as a heat shrink tape or, preferably, a heat shrink sleeve or a heat shrink tube. Another preferred method is to use a hot melt material as well as a heat shrink material such as a heat shrink tube. The hot melt material may be on the inner surface of the heat shrink sleeve or tube, and/or as a separate liner of the heat shrink sleeve or tube.

A further aspect of the invention provides fiber optic connectors comprising a connector body having an interface end; and an optical fiber that is affixed within the connector body by at least one component retained by adhesive, the optical fiber having an unsupported end portion that is accessible at the interface end of the connector body, wherein the fiber optic connector is ferrule-less. Preferably the unsupported end portion is a bare glass portion.

In some embodiments the optical fiber is adhesively affixed to an attachment element that is connected to the connector body. In other embodiments the optical fiber includes a first portion including a primary coating and a second portion not including a primary coating, wherein the unsupported end portion of the optical fiber is formed by the second portion, and wherein the first and second portions are adhesively affixed to the attachment element by an adhesive. Preferably the second portion of the optical fiber includes a signal conveyance structure including a core and a cladding, wherein the first portion of the optical fiber includes the signal conveyance structure covered by the primary and secondary coating, and wherein the adhesive limits axial movement between the signal conveyance structure and the secondary coating.

In alternative embodiments a sleeve covers the adhesive, and preferably the sleeve is a heat recoverable sleeve, and wherein the adhesive is heat activated.

In some embodiments the fiber optic connector has a first configuration wherein the unsupported end portion is enclosed within the connector body to protect an end face of the unsupported end portion from contamination, and a second configuration wherein the end face of the unsupported end portion can be accessed at the interface end of the connector body to allow for optical connection to another optical fiber.

Preferably an adhesive affixes the optical fiber within the connector body, and a sleeve surrounds the adhesive and the optical fiber. More specifically the sleeve can be a heat recoverable sleeve, and the adhesive is preferably heat activated. In some embodiments, the sleeve surrounds an attachment element that is adhesively bonded to the optical fiber.

The present invention also provides a device and method for micro-assembling, using a heat recoverable material, such as a heat shrink sleeve. The heat recoverable material may e.g. be used to assemble an optical fiber and an element in an optical fiber connector.

Embodiments of the herein disclosed devices and methods for assembling can be any of reliable, convenient, contamination avoiding and inexpensive. In some embodiments, a heat recoverable material is used for assembling elements. Assembly may be done using a heat recoverable material. Heat may then be applied to the heat recoverable material is such a way, as discussed below, that entrapped air is avoided.

It is an aspect of the present invention to provide a device for assembly of parts and for transferring heat to a heat recoverable material, the device comprising a first pre-installed or pre-assembled element and adapted to receive a second element to be assembled, further comprising heat distributing means for transferring heat to said heat recoverable material, wherein said heat distributing means has a cavity for receiving the heat recoverable material and a heat conducting portion surrounding said heat recoverable material, whereby the device is adapted to shrink the heat recoverable material onto the second element and, wherein said heat distributing means comprises a localized heating portion with a predefined physical relationship between the localized heating portion and the heat recoverable material.

The first pre-installed or pre-assembled element (adapted to receive a second element to be assembled) can be, for example a micro-assembled arrangement of components, e.g. a connector barrel, a connector housing, a fiber attachment element, whereby the first pre-installed or pre-assembled element is preferably adapted to include the heat recoverable material attached in such a way that heat recovery of the heat recoverable material attaches the pre-installed or pre-assembled element to the second element. In particular the pre-installed or pre-assembled element and the second element can optionally relate to a ferruless optical fiber connection.

The present invention also provides a fiber optic connector comprising:
 a connector body having an interface end; and
 an optical fiber that is affixed within the connector body by a heat recovered material,
 wherein the fiber optic connector is ferrule-less, further comprising heat distributing means for transferring heat to a heat recoverable material, wherein said heat distributing means has a cavity receiving the heat recovered material and a heat conducting portion surrounding said heat recovered material.

An advantage of some embodiments of the invention is that fiber grow out is prevented. Fiber grow out is caused by the shrinking behavior of polymer jackets, i.e. the outer coating of optical fibers. Due to temperature differences (requirements for optical fibers are stability between −40° C. and 70° C.) fiber polymer jackets may shrink back, causing the core and the cladding, and usually also the inner coating (which may be an acrylic layer), to grow out of the polymer jacket. In certain embodiments, the heat-recoverable element is a sleeve (e.g., a tube) that can include a longitudinal seam or can be seamless. In certain embodiments, the sleeve has a dual wall construction including an outer, heat recoverable annular layer, and an inner annular adhesive layer. In certain embodiments, the inner annular adhesive layer includes a hot-melt adhesive layer.

Preferably, the adhesive provides for primary retention of the optical fiber within a connector. The heat recoverable sheath functions to contain the adhesive and to cause the adhesive to flow into void areas between the fiber attachment element and the optical fiber to ensure that effective adhesive contact is made with the bare glass portion of the optical fiber, the coated portion of the optical fiber and the fiber attachment element. A relatively large amount of adhesive is used. For example, the process uses a heat shrink tube having an outer wall (i.e., layer) of heat recoverable material and in inner wall (i.e., layer) of adhesive in combination with a separate sleeve of adhesive that fits inside the inner wall to provide more adhesive for filling voids. Alternatively, the inner wall can be made thicker to provide the additional volume of adhesive.

In one embodiment, the sleeve is initially expanded from a normal, dimensionally stable diameter to a dimensionally heat unstable diameter that is larger than the normal diameter. The sleeve is shape-set to the dimensionally heat unstable diameter. This typically occurs in a factory/manufacturing setting. The dimensionally heat unstable diameter is sized to allow the sleeve to be inserted over two components desired to be coupled together. After insertion over the two components, the sleeve is heated thereby causing the sleeve to shrink back toward the normal diameter such that the sleeve radially compresses against the two components to secure the two components together. The adhesive layer is preferably heat activated during heating of the sleeve. In certain embodiments, the sleeve can be used to secure a coated optical fiber to a substrate such as an attachment member adapted to be secured within a connector body. In certain embodiments, the adhesive within the sleeve can bond directly to the substrate and the coated optical fiber, and the coated optical fiber can have a diameter of less than 300 microns. In certain embodiments, a bare glass portion of the coated fiber extends outwardly axially beyond an end of the sleeve. In certain embodiments, the sleeve can be used to anchor/axially fix a coating portion of an optical fiber to a bare glass portion of the optical fiber. In certain embodiments, the adhesive within the sleeve can bond directly to the coating portion and the bare glass portion of the optical fiber, and the bare glass portion of the optical fiber can extend outwardly axially beyond an end of the sleeve. The coating portion can have a diameter less than 300 microns.

In some embodiments, an optical fiber connector is provided wherein a heat recoverable material, such as a heat shrink sleeve, preferably a heat shrink tube, is used inside the optical fiber connector. The heat recoverable material may be used to assemble an optical fiber and a fiber attachment element inside the optical fiber connector. The purpose of the attachment may be to fix the position of the optical fiber with respect to the connector housing. That the fiber attachment element, and the heat recoverable material, are inside the optical fiber connector means that another part of the optical fiber connector, e.g. a connector body, surrounds the fiber attachment element. To heat the heat recoverable material, inside the optical fiber connector, and to make a reliable attachment, without air entrapped in the heat recoverable material, a heat distributor may be used, that has a heat conducting portion surrounding the heat recoverable material. The optical fiber connector may comprise the fiber attachment element; it may comprise the heat recoverable material. The heat conducting portion may have a localized heating portion to which heat from a heat source is applied. The connector body may have a location, e.g. an opening that allows the heat source to heat the localized heating portion. The heat source may supply heat by radiation (e.g. by infrared radiation) and/or by convection. Preferably a heater, e.g. an electrical resistance heater, is used. The heat conducting portion may also be electrically conducting such that by passing a current from a power source through the heat conducting portion, heat is generated in the heat conducting portion. To assemble the parts, an optical fiber is inserted in the connector, into the heat shrink tube. The heat shrink tube surrounds the optical fiber and the fiber attachment element. Heat is supplied to the localized heating portion by a heater; preferably the heater makes physical contact with the localized heating portion of the heat conducting portion. The heat, supplied to the localized heating portion, is distributed by conduction along the heat conducting portion, which may be a tubular metal part. The heat is transferred from the heat conducting portion to the heat recoverable material which shrinks, starting at the localized heating portion, where the heat is supplied, and then further along the heat conducting portion, so that the optical fiber is attached to the fiber attachment element. The heat recoverable material starts to shrink at a known location, adjacent to the localized heating portion, so that air inside the heat recoverable material is pushed out towards the end or ends of the heat recoverable material. A heat front propagates in the heat conducting portion, and a shrink front propagates in the heat recoverable material. The dimensions and the thermal properties of the heat conducting portion, and the dimensions and the physical properties of the heat recoverable material, are preferably such that the propagation of the heat front in the heat conducting portion follows the propagation of the shrink front in the heat recoverable material. Air will then not be entrapped during the shrinking process.

An additional advantage of some embodiments is that a pre-assembly or pre-installment of the parts and of the heat recoverable material may be made under controlled conditions, e.g. in factory conditions, thus avoiding contamination. In the field, the optical fiber may then be inserted in the optical fiber connector, and all that has to be done to perform the micro-assembly is to supply heat to the heat recoverable material.

Moreover, the parts that are assembled may be very small (heat shrink tubes with an external diameter, before shrinking, of about 1 mm are known). As discussed above, in some embodiments heat supply is very easy and convenient, because heat may be supplied to a localized heating portion, e.g. by physical contact with a heater. A further advantage is that materials may be used in the connector that do not resist to the high temperatures that are required to process the heat recoverable material, since the heat is applied locally, to the localized heating portion, and is guided to the inside of the optical fiber connector by the heat distributor. Heat may be distributed and transferred to the heat recoverable material in a controlled way.

An end of the heat recoverable material may be positioned at the localized heating portion of the heat distributor; the center of the heat recoverable material may be positioned at the localized heating portion; a portion of the heat recoverable material between an end and its center may be positioned at the localized heating portion.

The heat conducting portion of the heat distributor may have a cavity for the heat recoverable material. In a preferred embodiment, the heat conducting portion has a cylindrical shape. The heat conducting portion may have a tubular shape. It may also have a conical shape. In general, it is preferred that the shape of the heat conducting portion is such as to allow heat transfer to a heat shrink tube in the cavity over the whole circumference of the heat shrink tube and over its complete length; a heat conducting portion that has a cylindrical shape, or a conical shape, or a tubular shape, fulfills these requirements.

The heat recoverable material is preferably a heat shrink sleeve (that does not necessarily have the same diameter over its length. The heat recoverable material may be a heat shrink tube.

Embodiments of a device in accordance with the invention may be used in optical fiber connectors. Another application is a SMOUV sleeve (SMOUV is a Trade Mark of TE Connectivity). SMOUV sleeves may be used for fiber-optic fusion splices; they may be applied around the fused area, to protect the fused area and the zones adjacent to the fused area. A SMOUV sleeve comprises a heat-shrinkable tube and a rod for reinforcing the splice.

In some embodiments, the device may further comprise a pre-alignment element for pre-aligning the optical fiber that is to be inserted. The pre-alignment element may include a conical opening, into which the bare end of the optical fiber is inserted before reaching the alignment portion.

Embodiments of the present invention provide an alternative device and method for evacuating debris from an optical fiber e.g. when the debris is generated by an operation on the optical fiber, such as a stripping operation, a cleaning operation, a cleaving operation. Embodiments of the herein disclosed devices and methods for evacuating debris from an optical fiber are reliable and convenient. Further, the disclosed device or method is particularly suitable to be integrated into an automated tool. Preferably, the debris is caught and evacuated in such a way that the device and its internal mechanisms are not soiled by the debris, or that soiling is substantially reduced, which is especially advantageous in an automated tool.

The invention provides in one embodiment a device for evacuating debris from an optical fiber, the device comprising a guiding element for guiding a tape wherein said device is adapted to fold the tape, to cover the fiber and to trap the debris in the tape, thus forming a one-tape sandwich. The debris is thus evacuated, in the sandwich, in a reliable and convenient way. In an alternative embodiment, the device can further comprises a second disposable tape and a second guiding means, wherein the device is adapted to move the first and second tape to cover th fiber and to trap the debris between the first and second tape in the form of a two-tape sandwich. According to one aspect of the invention, the device comprises a tape cartridge, comprising, besides one or two guiding elements respectively one or two tapes. Preferably, the tape cartridge can easily be exchanged and the tape is disposable. The tape is designed for cheapness and short-term convenience and preferably intended for single use. According to another aspect of the invention, the device includes, besides the guiding elements, an element to receive a tape cartridge. According to yet another aspect of the invention, the device functions without a tape cartridge; the tapes may e.g. be mounted in the device as tape rollers.

In these embodiments, the debris is trapped by at least one tape, and then immediately caught between two mating sides of one tape or by two tapes, that form a sandwich, so that the debris is trapped safely between the tape or tapes in the sandwich and cannot soil the device. The guiding element(s) that guide the tape(s) can be part of a tape cartridge, or they can be part of a device that is adapted to receive a tape cartridge, or they can be part of a device that functions without a tape cartridge, or some guiding elements can be part of a device that is adapted to receive a tape cartridge while other guiding elements are part of the tape cartridge itself.

In some embodiments, the device for evacuating debris from the optical fiber includes a driving element for driving a tape. The driving element may be adapted for evacuating the tape. Guiding element(s) for the tape may be provided in the device and/or in a tape cartridge configured to co-operate with the device. The driving element and/or the guiding element(s) may be adapted for driving the tape, and the guiding elements for guiding and folding the tape, for trapping the debris between two mating sides of the tape, and for sandwiching the sides of the tape upon trapping the debris.

In other embodiments, the device for evacuating debris from the optical fiber includes a first driving element for driving a first tape and a second driving element for driving a second tape. The first and the second driving element may be adapted for evacuating the first and the second tape. Guiding elements for the first and for the second tape may be provided in the device and/or in a tape cartridge configured to co-operate with the device. The driving elements and/or the guiding elements may be adapted for driving the first and the second tape, and the guiding elements for guiding the first and the second tape, for trapping the debris between the first and the second tape, and for sandwiching the first and the second tape upon trapping the debris.

The device for evacuating debris from the optical fiber may include one or more systems to perform an operation that generates debris from the optical fiber. The device may include a system for performing debris generating operation such as a stripping operation, and/or a system for performing a cleaning operation, and/or a system for performing a cleaving operation.

In some embodiments, the device for evacuating debris from the optical fiber includes at least one heater for heating the optical fiber, and a driving element for driving a tape for contacting the optical fiber such that the tape protects the heater from contacting the optical fiber, wherein the driving element is adapted for evacuating the tape and the debris collected by the tape.

The invention also provides alternative devices and/or methods for inserting an optical fiber in equipment for optical fiber processing, whereby the equipment is adapted to perform an operation on the optical fiber, such as a stripping operation, a cleaning operation, or a cleaving operation.

An advantage of embodiments of the present invention can be that the optical fiber is guided in a protected manner into the equipment for optical fiber processing by using a tape, whereby the optical fiber is sandwiched between the tape with the movement of the tape. Another advantage of embodiments of the present invention can be that the optical fiber can be pre-aligned before processing. As a result one or more deficiencies and problems associated with the prior art devices and methods are eliminated or reduced by the devices and methods disclosed herein.

Embodiments of the herein disclosed devices and methods for inserting an optical fiber in equipment for optical fiber processing are reliable and convenient. Further, the disclosed device or method is particularly suitable to be integrated into an automated tool. Preferably, the optical fiber is inserted in such a way that the equipment and its internal mechanisms can apply the operations described in a correct way as a result of a guiding operation applied on the optical fiber by using tape, which is especially advantageous in an automated tool.

The invention provides in one embodiment a device for inserting an optical fiber, wherein the optical fiber has a fiber axis, in an equipment for optical fiber processing, the device comprising guiding means, whereby the device is adapted to move a tape, wherein said guiding means are adapted to draw the tape to feed the optical fiber with the tape and to sandwich the optical fiber in the tape with the movement of the tape. The optical fiber is thus guided and pre-aligned, by a drawing motion, using the tape in the form of a tape sandwich, in a reliable and convenient way. Preferably the drawing motion is provided by a difference between the movement velocity of the tape and an insertion velocity of the fiber. More specifically the movement speed of the tape is higher than the insertion speed of the fiber which typically is between 5 to 20 mm/s more specifically 10 mm/s. In preferred embodiments the movement speed of the tape is 5-10% higher than the insertion velocity of the optical fiber.

Advantageously as a result of the above described drawing motion the tape guides the optical fiber and the optical fiber is automatically aligned, e.g. straightened. As a result, when performing an optical fiber processing operation the optical fiber is in a correct position. This straightening will improve the quality of the operation performed resulting in optical fiber with a better performance.

In an alternative embodiment, the device can further comprise a second guiding means and whereby the device is adapted to move a second tape, wherein said first and second guiding means are adapted to draw the tape to feed the optical fiber between the first and second tapes and to sandwich the optical fiber between the first and second tapes with the movement of the first and second tapes. According to one aspect of the invention, the device comprises a tape cartridge comprising, besides one or two guiding elements respectively one or two tapes. Preferably, the tape cartridge can easily be exchanged and the tape is disposable. The tape is designed for cheapness and short-term convenience and preferably intended for single use. According to another aspect of the invention, the device includes, besides the guiding elements, an element to receive a tape cartridge. According to yet another aspect of the invention, the device functions without a tape cartridge; the tapes may e.g. be mounted in the device as tape rollers.

In some embodiments, the device for inserting an optical fiber includes a driving element for driving a tape. The driving element may be adapted for evacuating the tape. Guiding element(s) for the tape may be provided in the device and/or in a tape cartridge configured to co-operate with the device. The driving element and/or the guiding element(s) may be adapted for driving the tape, and the guiding elements for guiding and folding the tape.

The device for inserting an optical fiber may include one or more systems to perform an operation that generates debris from the optical fiber. The device may include a system for performing debris generating operation such as a stripping operation, and/or a system for performing a cleaning operation, and/or a system for performing a cleaving operation.

The invention additionally provides a processing device for removing a coating from a coated optical fiber, the coated optical fiber having a cladding, a core and an axis, the cladding surrounding the core and the coating surrounding the cladding, the device comprising means for heating the coated optical fiber while clamping the coated optical fiber, driving means for driving protective means to cover the coated optical fiber and be adapted for being inserted between the coated optical fiber and the means for heating, and moving means for performing a relative movement, in an axial direction of the optical fiber axis, of the means for heating with respect to the cladding while the means for heating are clamping the coated optical fiber and while the protective means, which covers the coated optical fiber, is inserted between the coated optical fiber and the means for heating, thus removing the coating from the coated optical fiber.

In another aspect the invention provides a processing device for removing a coating from a coated optical fiber, the coated optical fiber having a cladding, a core and an axis, the cladding surrounding the core and the coating surrounding the cladding, the device comprising means for heating the coated optical fiber while clamping the coated optical fiber, driving means for driving protective means to cover the coated optical fiber and be adapted for being inserted between the coated optical fiber and the means for heating, and moving means for performing a relative movement, in a perpendicular direction of the optical fiber axis, of the means for heating with respect to the cladding while the means for heating are clamping the coated optical fiber while the protective means, which covers the coated optical fiber, is inserted between the coated optical fiber and the means for heating, thus removing the coating from the coated optical fiber.

The fiber tensile strength, can be an important parameter to consider when removing a coating from a coated optical fiber, because the higher a tensile strength of the stripped fiber, the stronger the fiber is and hence the better quality of the resulting fiber. Another parameter which can thus be of importance is the speed of the relative movement of the fiber as it is being moved while stripping. With respect to fiber strength preferably the relative movement has a speed in the range of 10 to 20 mm/s. This relatively high speed can have a beneficial influence in the surface generated glass defects.

Preferably the device further comprises means for inserting an incision in the coating of the optical fiber. The means for making an incision in the coating of the optical fiber can for instance be a knife with a profiled blade or a heated protruding element or a profiled heated blade.

In embodiments, the driving means for driving the protective means to cover the coated optical fiber further can be adapted for being inserted between the coated optical fiber and the heating means and/or the means for making an incision in the optical fiber. Preferably both the heating means and the means for making an incision in the optical fiber are protected from the coated optical fiber. In other embodiments the means for making an incision in the coating of the optical fiber can be retractable. As a result, the optical fiber is stripped by performing a relative movement of the means for heating with respect to the cladding while the means for heating are clamping the coated optical fiber.

In alternative embodiments, wherein the means for making an incision is not retractable, the optical fiber is stripped by performing a relative movement of the means for making an incision with respect to the optical fiber while the means for making an incision are clamping the coated optical fiber. As a result the means for making an incision scrapes the coating of the coated optical fiber. Preferably, the coated optical fiber is heated by the heating means before performing the relative movement.

In other embodiments, the processing device for removing a coating from an optical fiber further comprises cleaning means for cleaning a stripped portion of said optical fiber, whereby said cleaning means can be retractable or pivotable. Preferably, the stripped portion of the optical fiber is cleaned by performing a relative movement of the cleaning means with respect to the stripped optical fiber while the means for heating or the means for making an incision are clamping the coated optical fiber and the means for cleaning are clamping the stripped portion of the optical fiber.

The means to protect the optical fiber processing tools, e.g. stripping clamps, knives, heated profiled blades, cleaning means, etc. or protective means prevent at least some of the optical fiber processing tools from directly contacting the coating of the optical fiber. In this way, contamination of the optical fiber processing tools by residues of the coating is avoided. In a preferred embodiment, tape is used as protective means. In case two optical fiber processing tools are used on each side of the optical fiber, for instance two stripping clamps are used; a single or optionally two tapes may be used, each stripping clamp being protected by a tape. In another embodiment, a single tape is used, wrapped around the fiber when it is inserted between the clamps, so that it protects both stripping clamps. In the remainder of this description, mostly the term tape will be used as means to protect the stripping clamps. It is however to be understood that instead of tape other kinds of protective means may be used as well. Another kind of protective means is a thin-walled plastic tube element. The tube element may be placed between the clamps and surrounding the optical fiber and is allowed to move along the fiber together with the stripping device. In this way the clamps are not contaminated and the tube can be used to capture and evacuate the stripped coating of the fiber. Preferably, for every stripping step a new tube is used.

Advantageously the stripping clamp, which may e.g. comprise a flat plate, can open symmetrically to facilitate the entry of the fiber between the clamps, and in addition a guiding means can be provided. Especially, the guiding means can be provided for guiding the fiber end in the stripping clamps in such way that no contact between the fiber end and the tape is established. The processing device then preferably operates as follows. The coated optical fiber is clamped and heated while the heated plates are protected by tape from making contact with the coated optical fiber. In a next step, the clamps are translated along the fiber axis away from the fixed clamps over a predefined distance and as a result the heated coating breaks at the border between the heated and the non-heated portions. It is then removed from the optical fiber by means of the friction force between the clamp and the coating. The captured coating of the optical fiber can optionally be evacuated by the tape, while the non-heated portion and the core and cladding are held in place. Preferably, before or while the coated optical fiber is clamped, an incision is made on the coating of the optical fiber at a predefined distance.

As a result the brittle glass element of the optical fiber has no chance to get damaged in any way and by using tape to protect the clamp from being contaminated by the heated coating, resulting in a higher life time of the device. In addition the debris resulting from the stripping is transported away. The latter results in a highly reliable device and enables the integration of the device in an automated tool which is able to apply additional processing steps to the optical fiber, such as: cleaving, cleaning, fiber end treatment, attaching a connector, inspecting a processed fiber, etc.

Another preferred embodiment of the present invention provides a stripping device for removing a coating from a coated optical fiber, the coated optical fiber having a coating, the device comprising a clamp including two flat plates which can be heated, retractable means to make an incision and tape to protect the clamp and/or the means for making an incision. Advantageously the clamp can open symmetrically to facilitate the entry of the fiber into the clamp. The device then preferably operates as follows. The retractable knives are configured to make, next to the flat plates, an incision in the fiber, as far as the cladding. After performing this incision, the means can be retracted. The coated optical fiber is clamped and heated while the heated plates are protected from making contact with the coated optical fiber. Performing an incision may occur before or during the heating. The clamped coating of the optical fiber is then moved, while the non-heated portion and the core and cladding are held in place. The coating breaks at the location of the incision and is removed from the optical fiber by means of the friction force between the clamp and the coating. When the means for making an incision are not retracted, the coating of the optical fiber is clamped and heated. The means for making an incision scrapes the heated coating of the optical, while the non-heated portion and the core and cladding are held in place.

Before the fiber is entered in the stripping clamps, in another embodiment guiding means can be provided for guiding the fiber end in the stripping clamps in such way that no contact between the fiber end and tape is established. For instance by using movable clamps in between the fixed clamps and the stripping clamps.

After the fiber enters the stripping clamp, stripping of the fiber, using retractable means for making an incision, may be performed in four steps as follows. In a first step an incision can be made in the coating but not as far as the cladding, by for instance retractable knives or heated profiled blades and in a next step the clamps, which are protected from the fiber by tape, are heated, e.g. up to 120° C., the clamps are then translated along the fiber axis away from the fixed clamps over a predefined distance and as a result the coating breaks at the location of the incision and is removed from the optical fiber by means of the friction force between the heated clamp and the coating. Especially, the heaters will exercise a uniform shear force on the fiber resulting in a large strip length. In a third step, no incision is made in the fiber by the retractable knives, but the clamps and protective means are heated in order to strip the remaining primary coating of the fiber having a thickness between 200-300 µm. In an optional final step, again no incision is made but the clamps and tape are heated in order to strip any residues on the cladding.

After the fiber enters the stripping clamp, stripping of the fiber, using non-retractable means for making an incision, may be performed in four steps as follows. In a first step an incision can be made in the secondary coating but not as far as the cladding, by for instance knives or heated profiled blades and in a next step the clamps are heated, e.g. up to 120° C. Both means for making an incision and heated clamps can be protected from the fiber by tape. The heated clamps transfer heat to the coating of the fiber, which is softened and weakened and as the means for making an incision, which are not retracted, are translated along the fiber axis away from the fixed clamps over a predefined distance, the means for making an incision scrape the softened coating from the location of the incision and is removed from the optical fiber by means of the friction force between the means for making an incision and the coating. The translation of the means for making an incision along the fiber peels the coating from the fiber and pushes it off the surface. Especially, the means for making an incision will exercise a uniform shear force on the fiber resulting in a large strip length. In a third step, no incision is made in the fiber, but the clamps and protective means can be heated in order to strip the remaining primary coating of the fiber having a thickness between 200-300 µm. In an optional final step, again no incision is made but the clamps and tape are heated in order to strip any residues on the cladding.

If the fiber has an outer and an inner coating, the outer coating might be removed in a first stripping step and the inner coating in a second stripping step. After the first stripping step, the stripping clamps are opened, preferably new protective means, e.g. new tape, is dispensed, and the stripping clamps move back to the position where they can heat the inner coating that is to be removed. The stripping clamps are closed, and are moved again to remove the inner coating. Finally, a third heating and moving step may be performed to remove any debris that might still be present on the cladding of the optical fiber, thus performing a cleaning operation on the stripped optical fiber.

The fiber may only have an inner coating. An example of this is the special case of a reinforced optical fiber that comprises Kevlar between the outer and the inner coating. In this case, the outer coating and the Kevlar layer may be removed in a pre-treatment step, possibly by another device. The inner coating is then removed in the first stripping step discussed above, while the last stripping step will then be an "empty" step. An advantage of this method is that different kinds of fibers are treated in the same way, so that the operator does not have to enter information in the stripping device on the kind of fiber.

Alternatively, the stripping device may comprise a sensor that detects the kind of fiber that is to be stripped.

As a result, any optical fiber having a primary or secondary coating or both can be stripped. In addition, the operator will not have to specify any settings of the stripping device resulting in stripping of the optical fiber independent of the person operating the device. The latter results in a higher work efficiency and facilitates the handling of the device.

Further, in one embodiment of the device, two different types of tape can be used, an adhesive tape and a non-adhesive tape. One side of the adhesive tape is sticky, while the other side is non-sticky. The sticky side faces the coated optical fiber. The stripping device comprises driving means for driving the tapes. After the coating is removed from the fiber, the removed coating is sandwiched between the adhesive tape and the non-adhesive tape, and transported away from the stripping clamps by the driving means. The tapes can further be used to evacuate any debris resulting from stripping the optical fiber. This is a very convenient way to evacuate the coating debris. It is also safe: no debris remains near the stripping clamps, where it could damage the device in operation. Advantageously, a tape cartridge can be used which may contain three rollers that can be driven: a roller with adhesive tape, a roller with non-adhesive tape and a roller that can wind up the sandwich of the adhesive and the non-adhesive tape.

However, when the fiber is inserted between two layers of tape, the point of the fiber end can be sharp and it can penetrate the tape instead of sliding over it or the fiber can be bended due to plastic deformation of the buffer prior to insertion in the tool. Advantageously, in another embodiment of the device, the fiber can be supported during insertion between the tapes by using a guiding element, such as a movable clamp. The movable clamp can give guidance to the fiber end and can move in between the fixed clamp and the stripping clamp.

In some embodiments, a device in accordance with the invention comprises a plurality of stations, wherein in each station one or more of these processing steps are performed. In an embodiment, stripping and cleaning are performed in the same station. In one embodiment, the tensile test and the cleaving operation are performed in the same station.

BRIEF DESCRIPTION OF THE DRAWINGS

Further features of the present invention will become apparent from the drawings, wherein:

FIG. 26 illustrates an embodiment of a fiber attachment element in accordance with principles of the present invention;

FIG. 27 illustrates an enlarged view of a pre-alignment device of a connector according to embodiments of the invention;

FIGS. 34a and 34c show cross-sections of an embodiment of a connector body, comprising a first portion of the fiber attachment element before activation of the heat shrink material.

FIGS. 34b and 34d show cross-sections of an embodiment of a connector body comprising a second portion of the fiber attachment element before activation of the heat shrink material.

FIGS. 35a and 35c show cross-sections of an embodiment of a connector body comprising a first portion of the fiber attachment element after activation of the heat shrink material.

FIGS. 35b and 35d show cross-sections of an embodiment of a connector body comprising a second portion of the fiber attachment element after activation of the heat shrink material.

FIGS. 36a to 36e schematically illustrate subsequent stages wherein heat is transferred by a device to a heat recoverable material in accordance with principles of the present invention;

FIGS. 40a and 40b illustrate a stripping operation according to an embodiment of the invention, that is adapted to trap and evacuate debris;

FIGS. 41a and 41b schematically illustrate the operation of a stripping device according to embodiments of the invention;

FIG. 42 schematically illustrates the operation of an embodiment of a stripping device according to embodiments of the invention;

FIGS. 43a and 43b schematically illustrate a stripping blade according to a preferred embodiment of the invention;

FIGS. 46a to 46e illustrate a stripping operation, with axial tape transport, according to an embodiment of the invention;

FIGS. 47a to 47e illustrate a stripping operation, with axial tape transport, according to an embodiment of the invention;

FIGS. 49a-49c illustrate embodiments of the invention wherein a single tape is used.

FIG. 51 and FIG. 52 show possible arrangements of stations in embodiments of a device in accordance with the invention.

FIG. 53 shows a heat treatment station according to an embodiment of the invention.

FIG. 64 shows a converter for connecting a ferrule-less optical fiber connector to a ferruled connector;

DEFINITIONS

Figure 1:
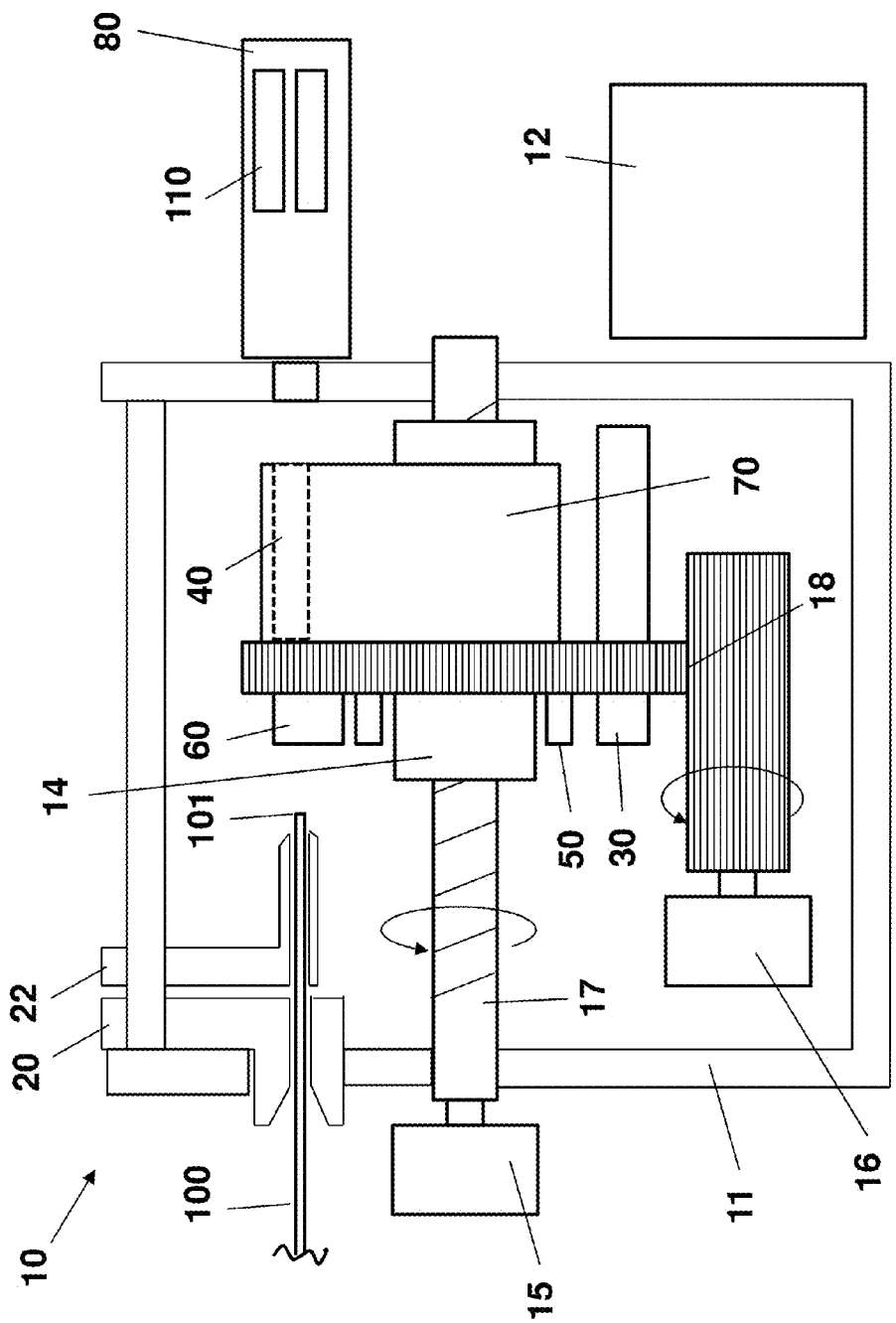
FIG. 1 is a schematic representation of a device according to an embodiment of the invention.

The term "insertion loss" as used herein relates to the loss of signal power resulting from the insertion of a device in a transmission line or optical fiber. The insertion loss is usually expressed in decibels (dB).

The "return loss" or "reflection loss" is the reflection of signal power resulting from the insertion of a device in a transmission line or optical fiber. It is usually expressed as a ratio in dB of the incident signal power relative to the reflected signal power (in order to obtain a positive number). It is advantageous to obtain a low reflected signal power, i.e. a high return loss.

"Coupling" herein means performing a relative movement between the station and the end of the optical fiber; so that after the relative movement the operation, in this case the attachment, can be performed on the optical fiber by the station. The relative movement can be: keeping the end of the optical fiber in a position that is fixed with respect to the tool and moving the station, or keeping the station in a position that is fixed and moving the end of the optical fiber, or moving both the station and the end of the optical fiber.

The term "fiber" as used herein relates to a single optical transmission element having a core having e.g. a diameter of 8 μm and a cladding having e.g. a diameter of 125 μm wherein the core is the central, light-transmitting region of the fiber, and the cladding is the material surrounding the core to form a guiding structure for light propagation within the core. The dimensions may of course be different; for multimode fibers, a core diameter of 50 μm or of 62.5 μm is most common. The core and cladding can be coated with a primary coating usually comprising one or more organic or polymer layers surrounding the cladding to provide mechanical and environmental protection to the light-transmitting region. The primary coating may have a diameter ranging e.g. between 200 and 300 μm. The core, cladding and primary coating usually are coated with a secondary coating, a so-called "buffer", a protective polymer layer without optical properties applied over the primary coating. The buffer or secondary coating usually has a diameter ranging between 300-1100 μm, depending on the cable manufacturer.

The term "connector" as used herein relates to an element that is used to terminate an optical fiber so that the fiber can be connected to another optical fiber or to a device. An optical fiber connector is basically a rigid cylindrical barrel surrounded by a sleeve that holds the barrel in its mating socket. The mating mechanism can e.g. be "push and click", "turn and latch", etc. Good alignment of the connected optical fibers is extremely important in order to obtain a good quality connection with low optical signal losses. Usually, so called ferruled connectors are used, wherein the stripped fiber is positioned coaxially in a ferrule. Ferrules can be made of ceramic, metal or sometimes plastic, and have a drilled center hole. Ferruled connectors are expensive, however. The central hole has to be drilled very accurately for good alignment of the optical fiber. Further, the fiber's end face is polished, so that the fibers in the two ferruled connectors make good physical contact. The polishing step is expensive. Alternative alignment solutions, containing ferrule-less connectors, are much less expensive. A "connector" is in this document preferably a ferrule-less connector, although a connector for mechanical splicing is an alternative possibility. Mechanical splicing is a method to connect two optical fibers, wherein the fiber ends are aligned and held together by a precision-made connector. Mechanical splicing is normally intended for a permanent connection, although in cases the fibers can still be disconnected, and connected again afterwards. An example of a mechanical splicing system is the RECORDsplice™ from Tyco Electronics. Before making a mechanical splice, the fibers are stripped of their coating, so that bare fiber ends are obtained. To obtain well-defined end faces that can then be abutted in the mechanical splice, the ends are mechanically cleaved with a precision cleave tool, such as the one used in the RECORDsplice Cleaver and Assembly Tool (RCAT).

That a station performs an operation "autonomously" means in this document that it functions independently: once the operation is started, it continues until the operation is terminated, without manual intervention, but possibly under the control of a controller. "Autonomously" is very similar to "automatically", but in this text "autonomously" is used for a station of the portable device, while "automatically" is used on a higher level, for the portable device, to indicate functioning without any manual intervention or manual action. Thus, the portable device can function automatically. Alternatively, the stations of the device can function autonomously, and the portable device can function non-automatically, which means that an action is performed, e.g. by the operator, between operations at the autonomously operating stations, either once or several times. If the coating layer or layers are removed from a portion of the fiber over a certain length, so that only the core and cladding remain bare, that portion of the fiber is "bare" as this is called in this document.

The term "light" as used herein relates to electromagnetic radiation, which comprises a part of the electromagnetic spectrum that is classified by wavelength into infrared, the visible region, and ultraviolet.

Embodiments disclosed herein can utilize a dimensionally recoverable element to assist in optical fiber retention. A dimensionally recoverable element is an element the dimensional configuration of which may be made to change substantially when subjected to heat treatment. Usually these elements recover towards an original shape from which they have previously been deformed, but the term "recoverable" as used herein, also includes an element which adopts a new configuration even if it has not been previously deformed. In embodiments of the present invention heat recoverable elements recover towards an original shape in an encapsulating and retaining form, in particular in an optical fiber retaining form.

A typical form of a dimensionally recoverable element is a heat-recoverable element, the dimensional configuration of which may be changed by subjecting the element to heat treatment. In their most common form, such elements comprise a heat-shrinkable sleeve made from a polymeric material exhibiting the property of elastic or plastic memory as described, for example, in U.S. Pat. No. 2,027,962 (Currie); U.S. Pat. No. 3,086,242 (Cook et al); and U.S. Pat. No. 3,597,372 (Cook), the disclosures of which are incorporated herein by reference. The polymeric material has been crosslinked during the production process so as to enhance the desired dimensional recovery. One method of producing a heat-recoverable element comprises shaping the polymeric material into the desired heat-stable form, subsequently crosslinking the polymeric material, heating the element to a temperature above the crystalline melting point (or, for amorphous materials the softening point of the polymer), deforming the element, and cooling the element while in the deformed state so that the deformed state of the element is retained. In use, because the deformed state of the element is heat-unstable, application of heat will cause the element to assume its original heat-stable shape.

The term "stripping" as used herein relates to removing a coating from the optical transmission element.

The term "evacuate" as used herein relates to remove securely waste matter from the optical fiber so that the debris may not recontaminate the fiber.

DETAILED DESCRIPTION OF EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the drawings, like reference numerals indicate like features; and, a reference numeral appearing in more than one figure refers to the same element.

FIG. 1 shows a schematic representation of an embodiment of a portable device 10 according to the invention. The global layout and construction is discussed here; functioning of the embodiment of the device is discussed in detail further below.

Figure 2:
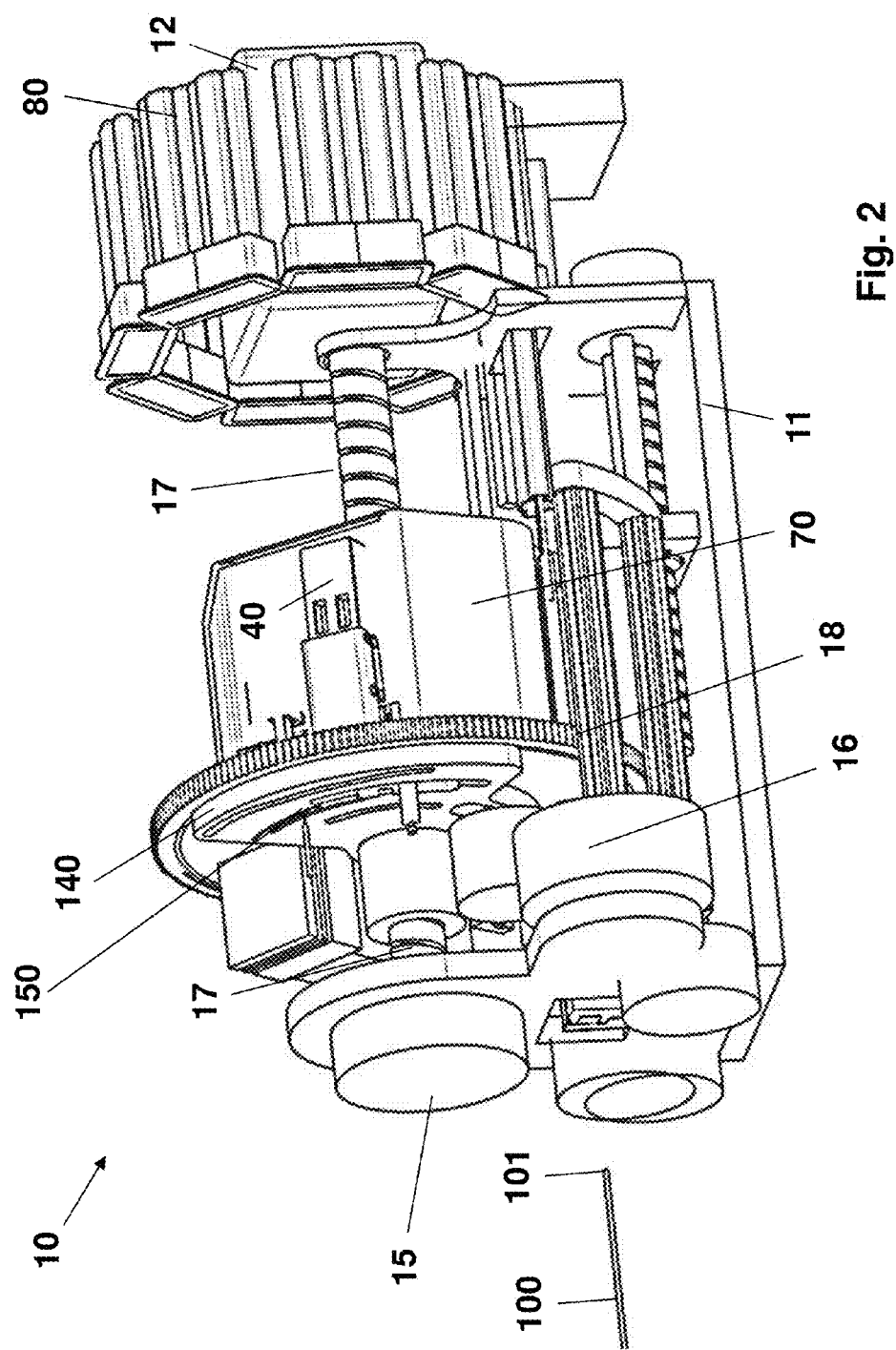
FIG. 2 shows the inside of a device according to an embodiment of the invention.

FIG. 2 shows a view of the inside of an embodiment of a device 10, corresponding to the schematic representation of FIG. 1.

An optical fiber 100 having an end 101 is received by the device 10. The parts of the device are mounted on frame 11 of the device.

In the embodiment of FIG. 1, the optical fiber 100 is received by a fixed clamp 10 that guides and afterwards clamps the fiber. During the process, the fiber doesn't move with respect to the portable device; it is clamped by the fixed entry clamp 10. Different processing stations 30, 40, 50, 60 are mounted on a rotating revolver head 14; these stations can be positioned sequentially at the location of the optical fiber 100 by rotating and translating the head. The revolver head 14 is rotated by motor 16, which may be a stepper motor, and gears 18. To translate the revolver head, revolver translation motor 15 (which may also be a stepper motor) is actuated. This makes spindle 17 turn, and translates revolver head 14 towards or away from the optical fiber 100, depending on the rotation direction of revolver translation motor 15. In a preferred embodiment, the device 10 comprises a tape cartridge 70. During stripping, of the fiber coating, and also during cleaving, debris is produced. This debris may comprise buffer, coating, glass particles (chips, cladding/core with lengths up to 25 mm). One of the functions of the tape in the tape cartridge is to catch the debris and to remove it. In one preferred embodiment, the device comprises a connector cartridge 80. Connectors 110, which may comprise two or even more parts to be mounted consecutively on the prepared optical fiber 100, are stored in the connector cartridge 80. Typically the connector cartridge may contain e.g. eight to twelve connectors. Connector attachment station 30 attaches a connector 110 to the optical fiber 100. Energy may be supplied to the device 10 by a battery 12 that is preferably a rechargeable battery.

The optical fiber 100 is aligned and guided by different means in device 10. In some embodiments, one of these means is movable clamp 22. The optical fiber is held by fixed clamp 20, and further by movable clamp 22. Moreover, in a preferred embodiment, the movable clamp may have an additional function: at the beginning of the operation, the operator may just insert the optical fiber a few mm into the device (in the opening of fixed clamp 20 in the embodiment of FIG. 1), whereupon the fiber is detected, caught by the movable clamp 22 and pulled further into the device by the movable clamp. A total length of e.g. 70 mm of fiber may thus be inserted into the tool.

Figure 3:
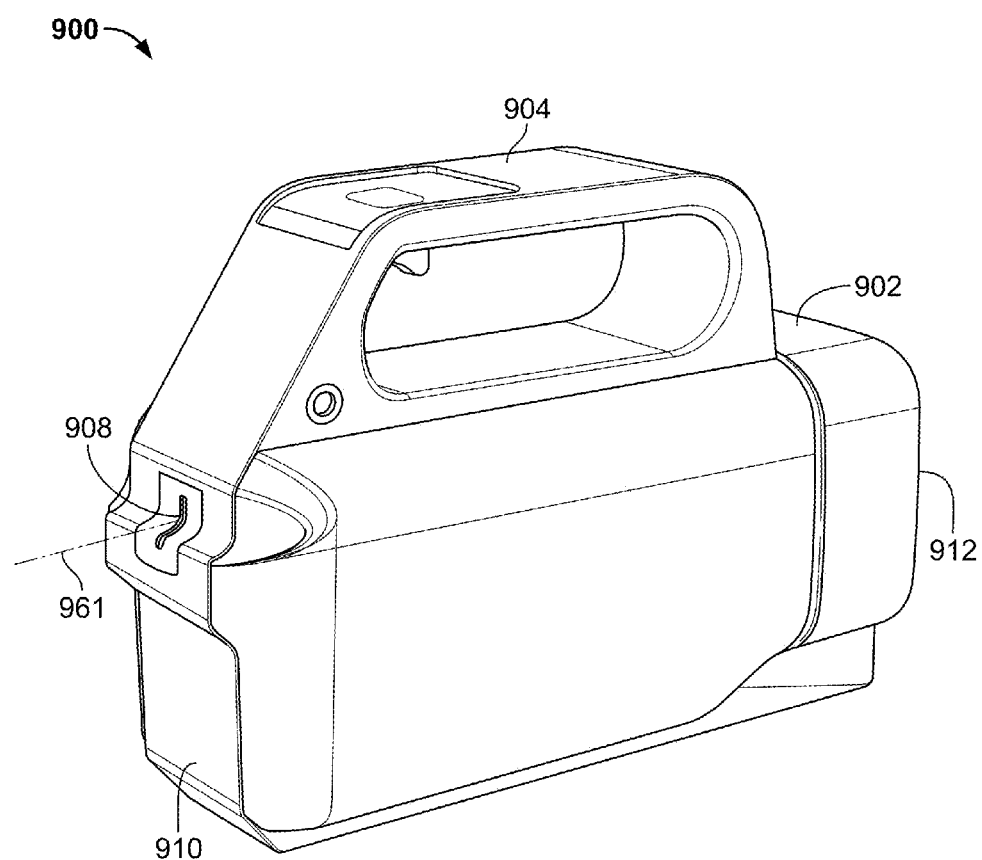
FIG. 3 illustrates a tool in accordance with the principles of the present disclosure.

FIGS. 3-25 illustrate a tool 900 in accordance with the principles of the present disclosure. The tool 900 includes an internal mechanism for attaching a connector body on an optical fiber. It is preferred for the tool 900 to be relatively compact and portable. In certain embodiments, the tool 900 has an overall weight less than 5 kilograms, or less than 3 kilograms, or less than 2 kilograms. As depicted at FIG. 3, the tool 900 includes an outer housing 902 having a handle 904 for facilitating carrying the tool 900. The housing 902 allows the tool 900 to be easily be carried to remote locations (i.e., locations away from a manufacturing facility or factory) and used to affix connector bodies to optical fibers in the field. The tool 900 can also be used to pre-process an optical fiber prior to inserting the optical fiber within a connector body. The housing 902 can have various removable portions that can be removed from the main body of the housing to allow access to the interior components for maintenance. Furthermore, the removable portions can allow cartridges such as a connector cartridge 906 (see FIG. 15) to be loaded into the housing 902 as needed. Referring back to FIG. 3, the housing 902 can further define a fiber insertion opening 908 for allowing an optical fiber 960 (see FIG. 4) to be inserted into the housing 902. The optical fiber 960 can be inserted into the housing 902 along an insertion axis 961. It will be appreciated that the fiber insertion opening 908 is preferably large enough to allow connector bodies to be removed from the interior of the housing 902 once the connector bodies have been affixed to corresponding optical fibers. In certain embodiments, a flexible gasket can be provided at the fiber insertion opening 908 for reducing the likelihood of contaminants entering the housing.

Figure 4:
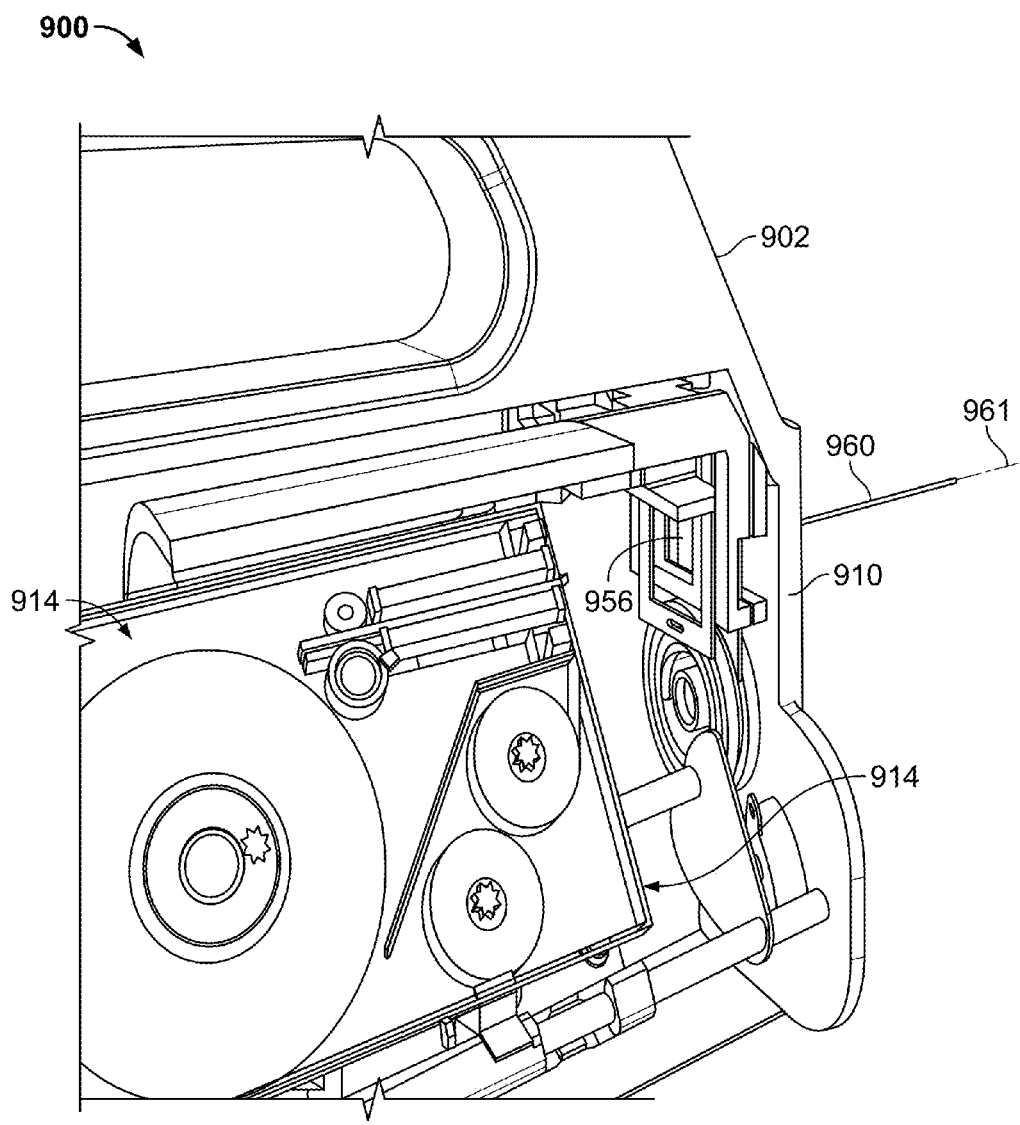
FIGS. 4-25 show a sequence of operating steps/stages implemented by the tool of FIG. 3 for pre-processing and connectorizing an optical fiber.
Figure 5:
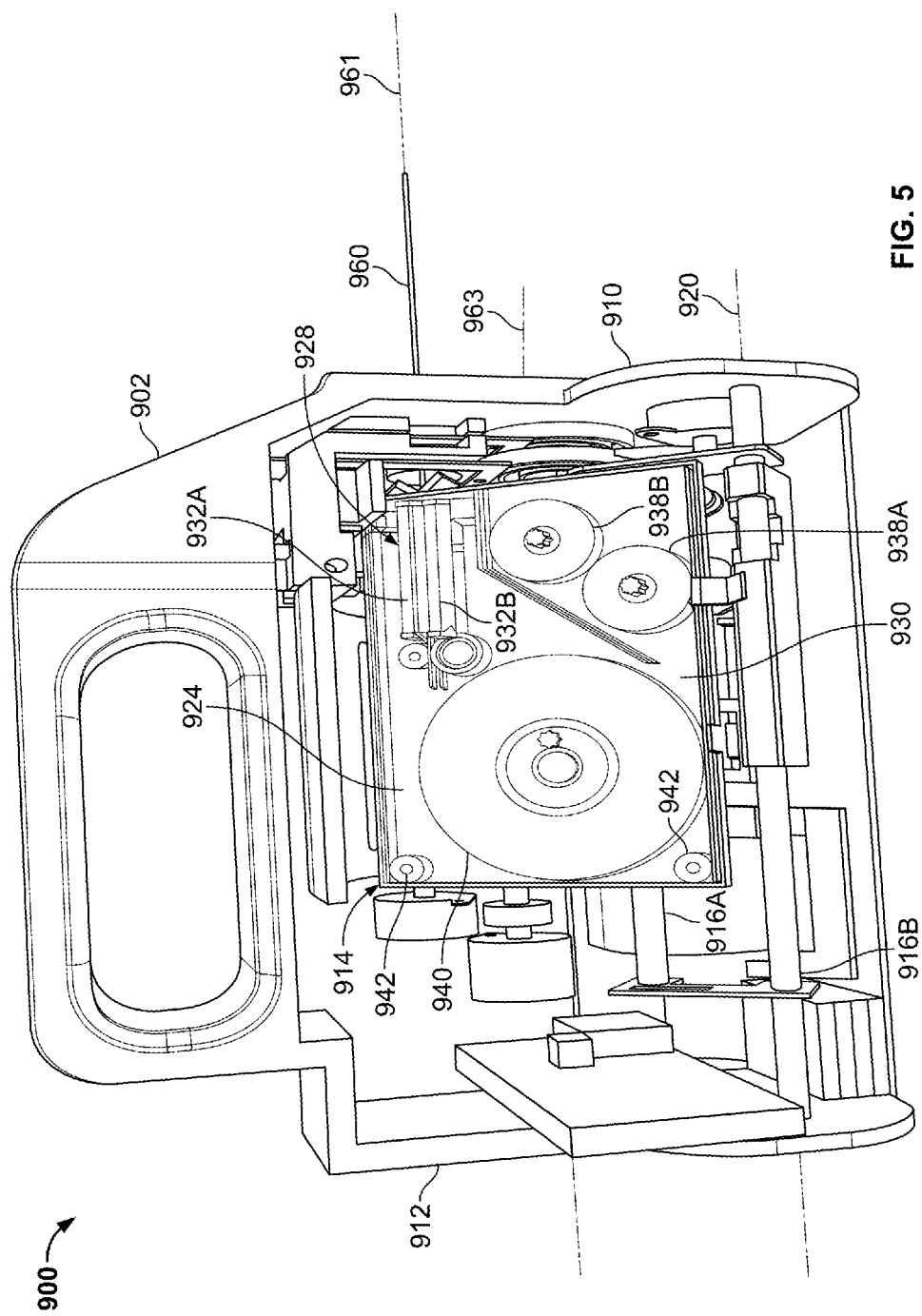
Figure 6:
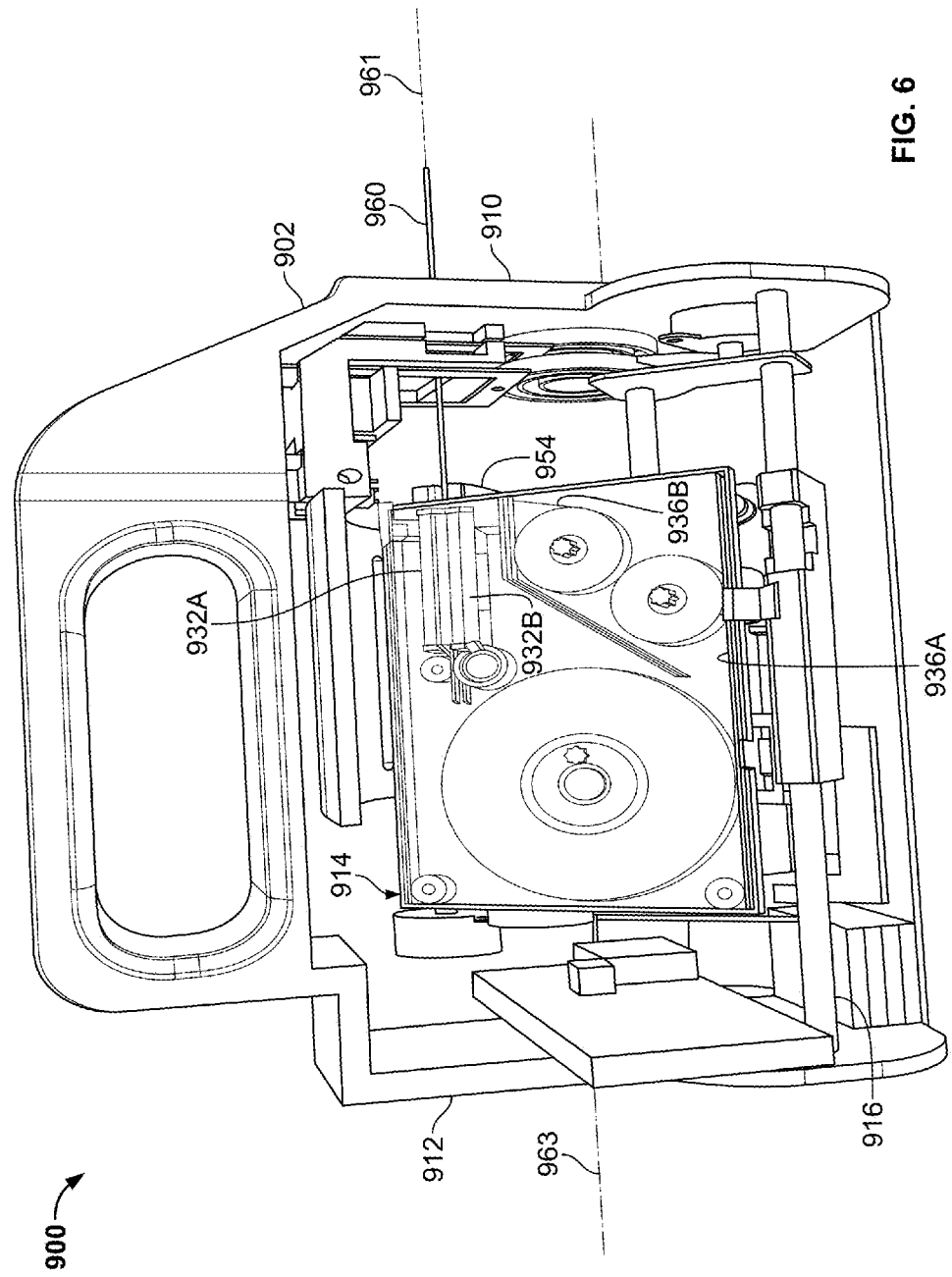
Figure 7:
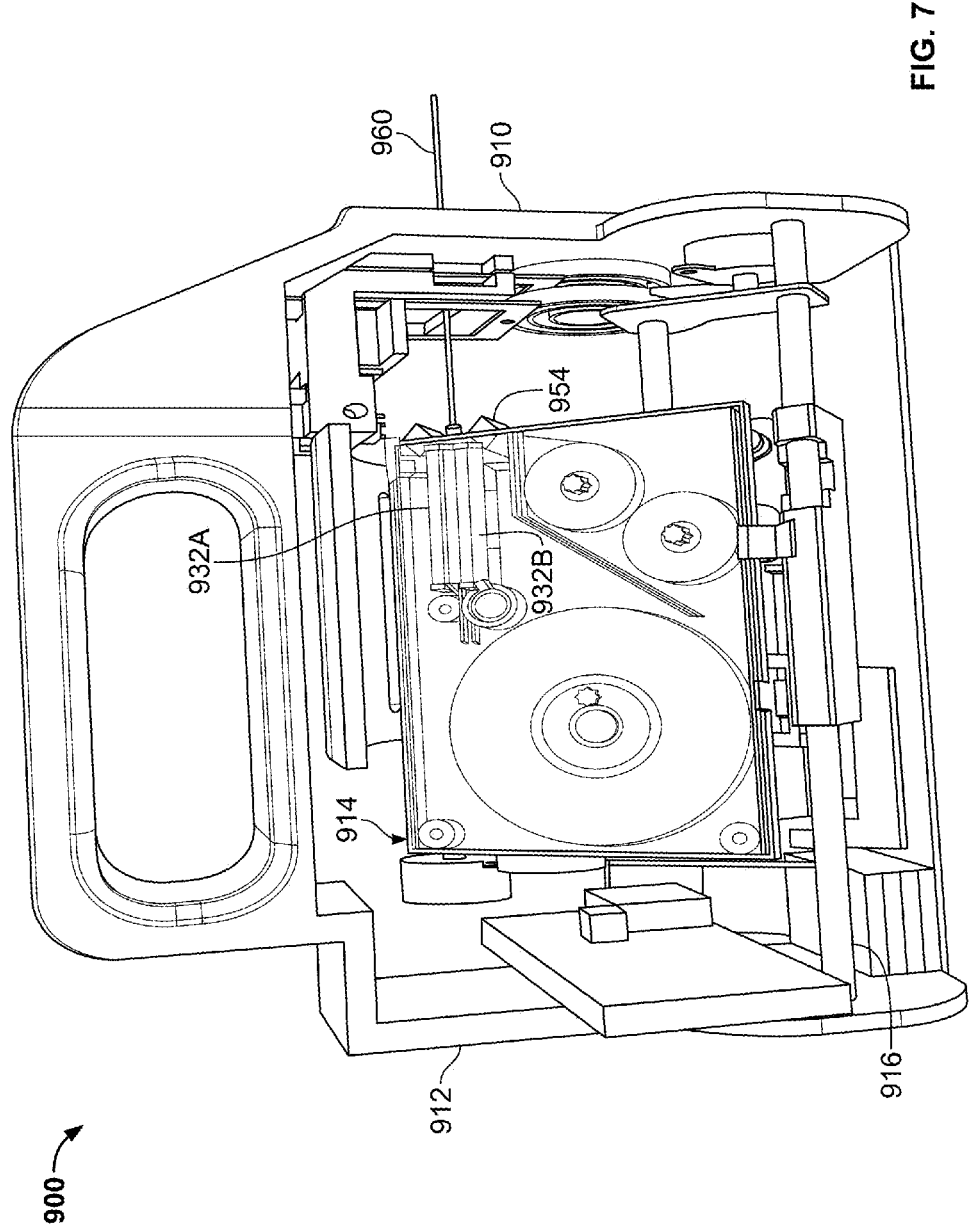
Figure 8:
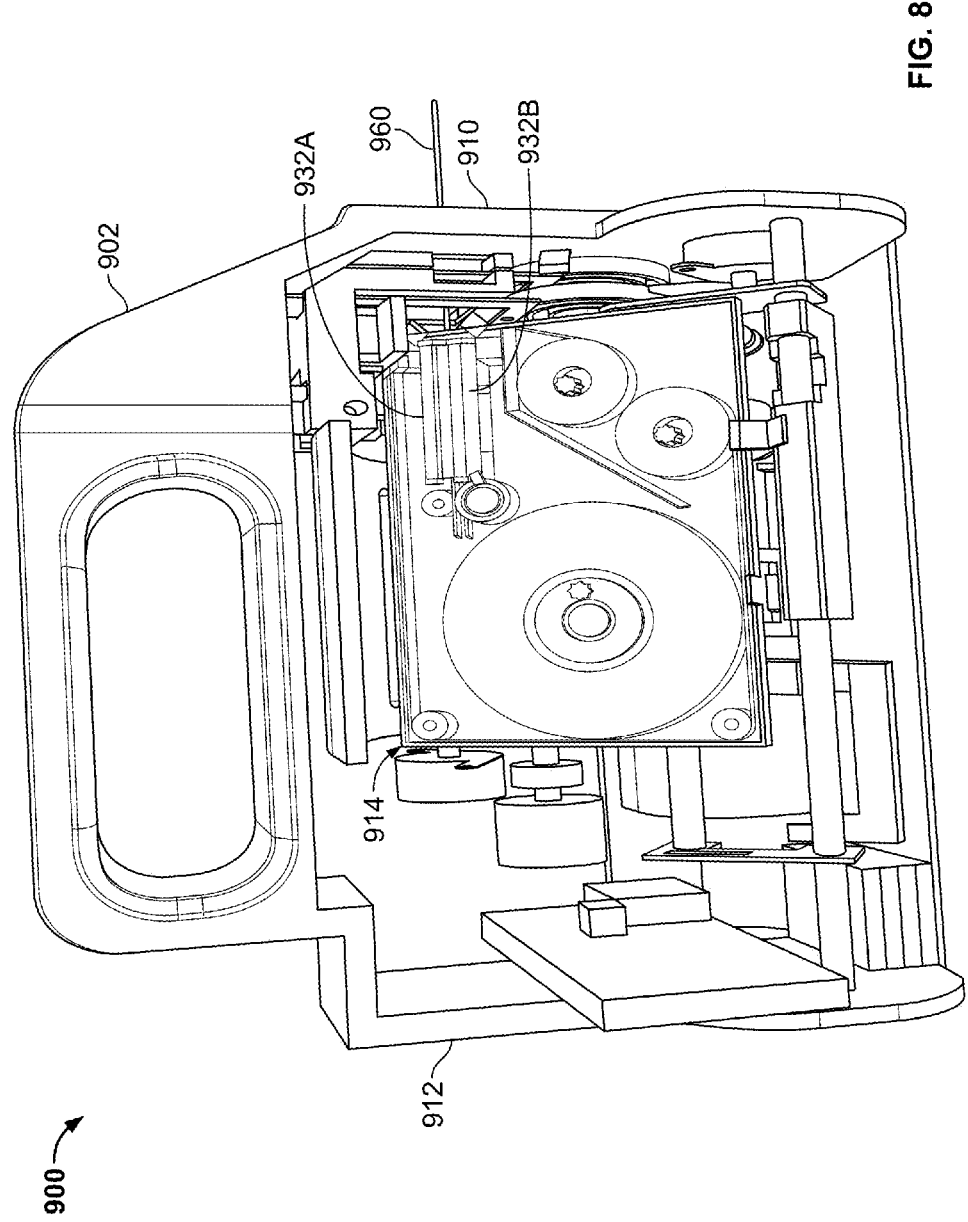
Figure 9:
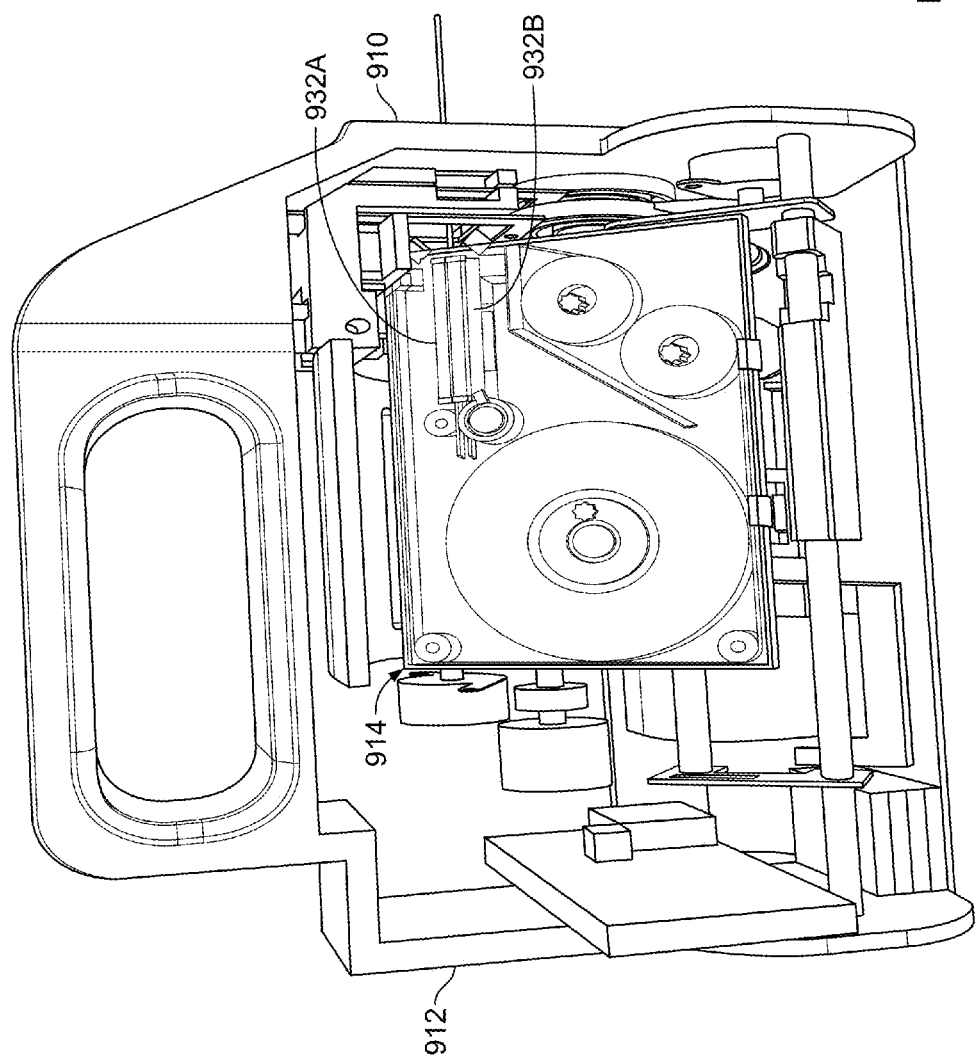

FIGS. 4-25 show the housing 902 with side panels removed so as to depict interior components of the tool 900. As shown at FIG. 5, the housing 902 includes a first end 910 positioned opposite from a second end 912. Various mechanical components (e.g., mechanisms, arrangements, devices, etc.) are disposed within the housing 902. The components include a carriage 914 (i.e., a carrier) mounted on linear bearings 916 (i.e., slide rods). The linear bearings 916 extend between the first and second ends 910, 912, of the housing 902. During operation of the tool 900, a drive mechanism is used to slide the carriage 914 back and forth along the linear bearings 916. Movement of the carriage 914 on the linear bearings 916 is along a carriage slide axis 963 that is parallel to the fiber insertion axis 961. The bearings 916 include an upper bearing 916A and a lower bearing 916B. A pivot mechanism is used to pivot the upper linear bearing 916A and the carriage 914 about a pivot axis 920 that extends through the lower linear bearing 916B (see FIGS. 14 and 15). By pivoting the carriage 914 about the pivot axis 920, different operational stations carried by the carriage 914 can be aligned with the fiber insertion opening 908 at different stages of the connector processing and affixation operation implemented by the tool 900. By sliding the carriage 914 back and forth along the carriage slide axis 963, the various components carried by the carriage 914 can be moved along the fiber insertion axis 961 axially toward the optical fiber 960 and axially away from the axial fiber 960. It will be appreciated that any number of different mechanical drive mechanisms can be used within the housing 902 to provide the desired automation and movement of parts. Example drive mechanisms include servo-motors, stepper motors, screw drives or other known drive mechanisms. A battery or other power means can also be provided within the housing for powering the various mechanical components.

Figure 14:
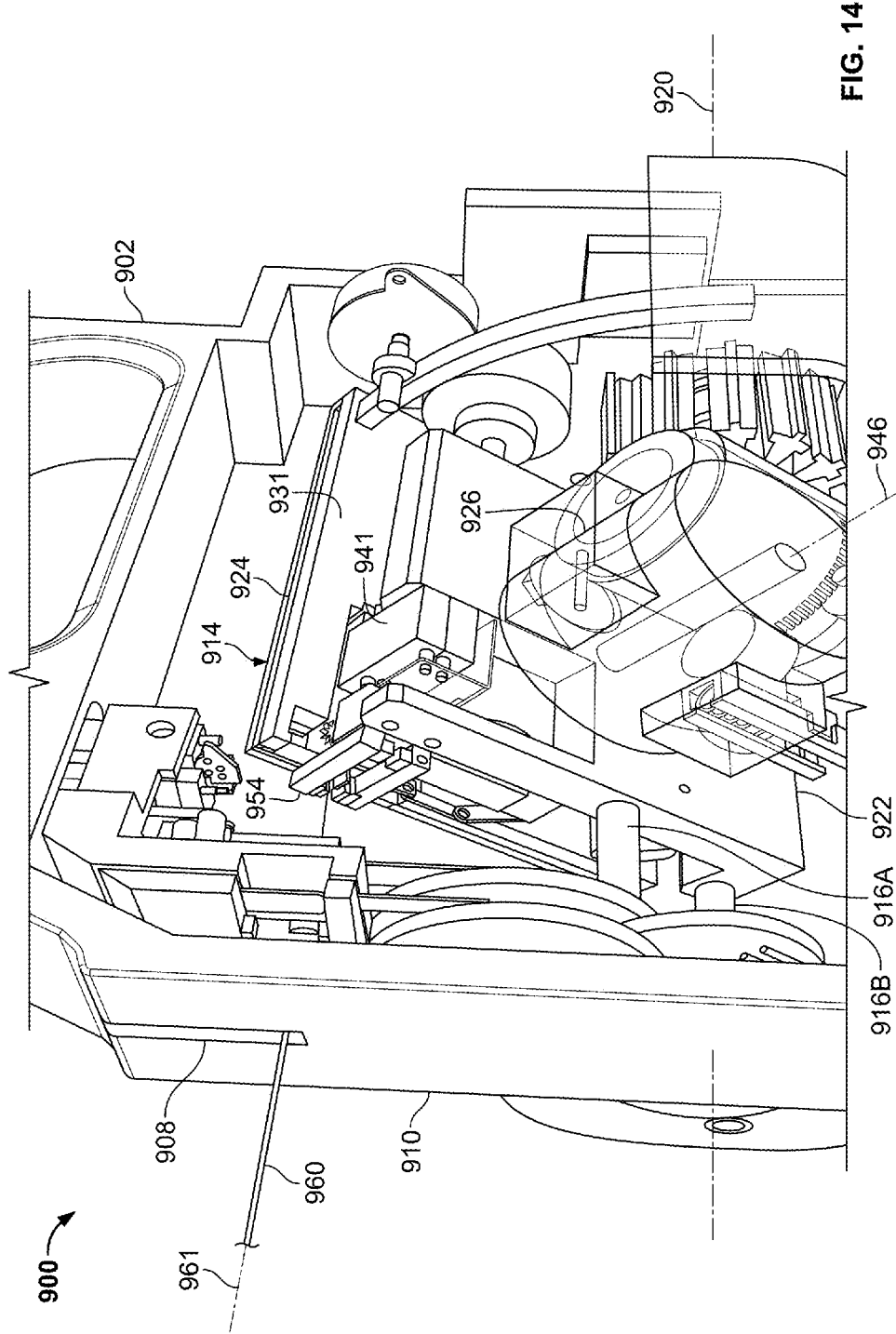

Referring to FIG. 14, the carriage 914 includes a base 922 that is slidably mounted on the linear bearings 916A, 916B and that can be pivoted about the pivot axis 920. The carriage 914 also includes a plate 924 mounted to one side of the base 922 and a rotating head 926 mounted to an opposite side of the base 922. A first side 930 (see FIG. 5) of the plate 924 faces away from the base 922 and a second side 931 (see FIG. 14) of the plate 924 faces toward the base 922. Various operational components are carried by the carriage 914. For example, a stripping station 928 (see FIG. 5) is mounted at the first side 930 of the plate 924. It will be appreciated that the stripping station 928 can have any of the features of stripping stations described elsewhere herein. As depicted, the stripping station 928 includes heated clamping members 932A, 932B that are movable between an open position (see FIGS. 5-8) and a closed position (see FIG. 9). Also mounted at the first side 930 of the plate 924 is a continuous reel waste collection device 934 (i.e., a waste evacuation device). It will be appreciated that the waste collection device 934 can have any of the features of waste evacuation devices described elsewhere herein. As depicted, the waste collection device 934 includes tapes 936A, 936B dispensed from dispensing reels 938A, 938B and routed between the heated clamping members 932A, 932B. The tapes 936A, 936B are adapted to capture debris generated from stripping and cleaving operations and enclose the debris between the tapes 936A, 936B in the form of a tape sandwich. The sandwiched tapes pass through a gap between the heated clamping members 932A, 932B and are collected on a collection reel 940. The tape 936A is routed around the periphery of the plate 924 and is guided by guide rollers 942 to a position adjacent to the heated clamping members 932A. The tape 936B is routed more directly to the heated clamping member 932B. The tapes 936A, 936B merge at the heated clamping members 932A, 932B and pass between the heated clamping members 932A, 932B.

Figure 16:
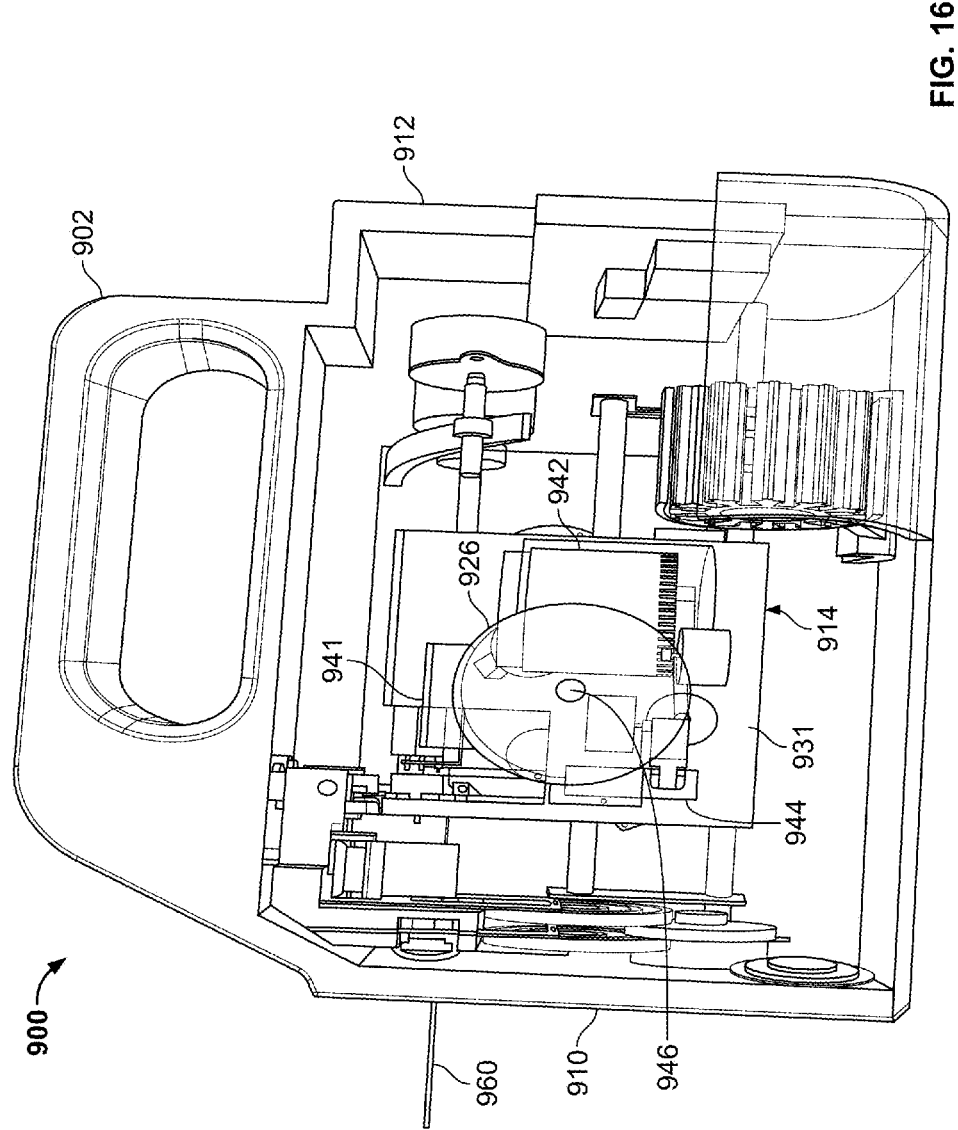

The rotating head 926 of the carriage 914 is rotatable about an axis of rotation 946 (see FIG. 17) that is generally transverse with respect to the pivot axis 920, the fiber insertion axis 961 and the carriage slide axis 463. Various components/stages are mounted on the rotating head 926. The components can be mounted to the rotating head 926 at locations that are radially spaced about the axis of rotation 946. In this way, by rotating/indexing the rotating head 926 about the axis of rotation 946, the rotating head 926 can function as a carousel for sequentially bringing the various components into axial alignment with the insertion axis of the optical fiber 910. As shown at FIG. 16, one of the components carried by the rotating head 926 is an arc treatment station 941 of a type described elsewhere herein. Additionally, an optical testing station 942 and a connector body carrier and heating station 944 are mounted to the rotating head 926. By pivoting the carriage 914 to a given location about the pivot axis 920, and rotating/indexing the rotating head 926 about the axis of rotation 946 to a desired location, the arc treatment station 942, the optical testing station 942 and the connector body carrier and heating station 944 can be sequentially aligned with the fiber insertion opening 908 and the fiber insertion axis 961 during processing and connectorization of the optical fiber.

Various additional mechanisms and components are also mounted within the housing 902. For example, a cleaving station 950 (see FIG. 12) is mounted to a top wall of the housing 902. A drive mechanism is preferably provided for extending and retracting (e.g., lowering an raising) the cleaving station 950 relative to the insertion axis 961 of the optical fiber 960. An arrangement of fiber clamps are also provided within the housing 902. In one embodiment, the arrangement of clamps can include a first clamp 954 (see FIGS. 6 and 7), a second clamp 956 (see FIG. 4) and a third clamp 957 (see FIG. 12). The first clamp 954 is mounted to the carriage 914 at a location adjacent to the stripping station. Since the first clamp 954 is mounted to the carriage 914, movement of the carriage 914 along its slide axis 963 moves the first clamp 954 along the slide axis 963 and also along the fiber insertion axis 961. Thus, a drive mechanism is provided for moving the first clamp 954 along the insertion axis 961 of the optical fiber. The first clamp 954 can be referred to as an axially movable clamp since it is movable along the insertion axis 961 of the optical fiber. The second clamp 956 is mounted to the first end 910 of the housing 902 adjacent the insertion opening 908. In the depicted embodiment, the second clamp 956 is not movable along the insertion axis 961 of the optical fiber 960 and therefore can be referred to as an axially fixed clamp or a fixed clamp. The third clamp 957 is positioned between the first and second clamps 954, 956 and can be referred to as an intermediate clamp.

Figure 15:
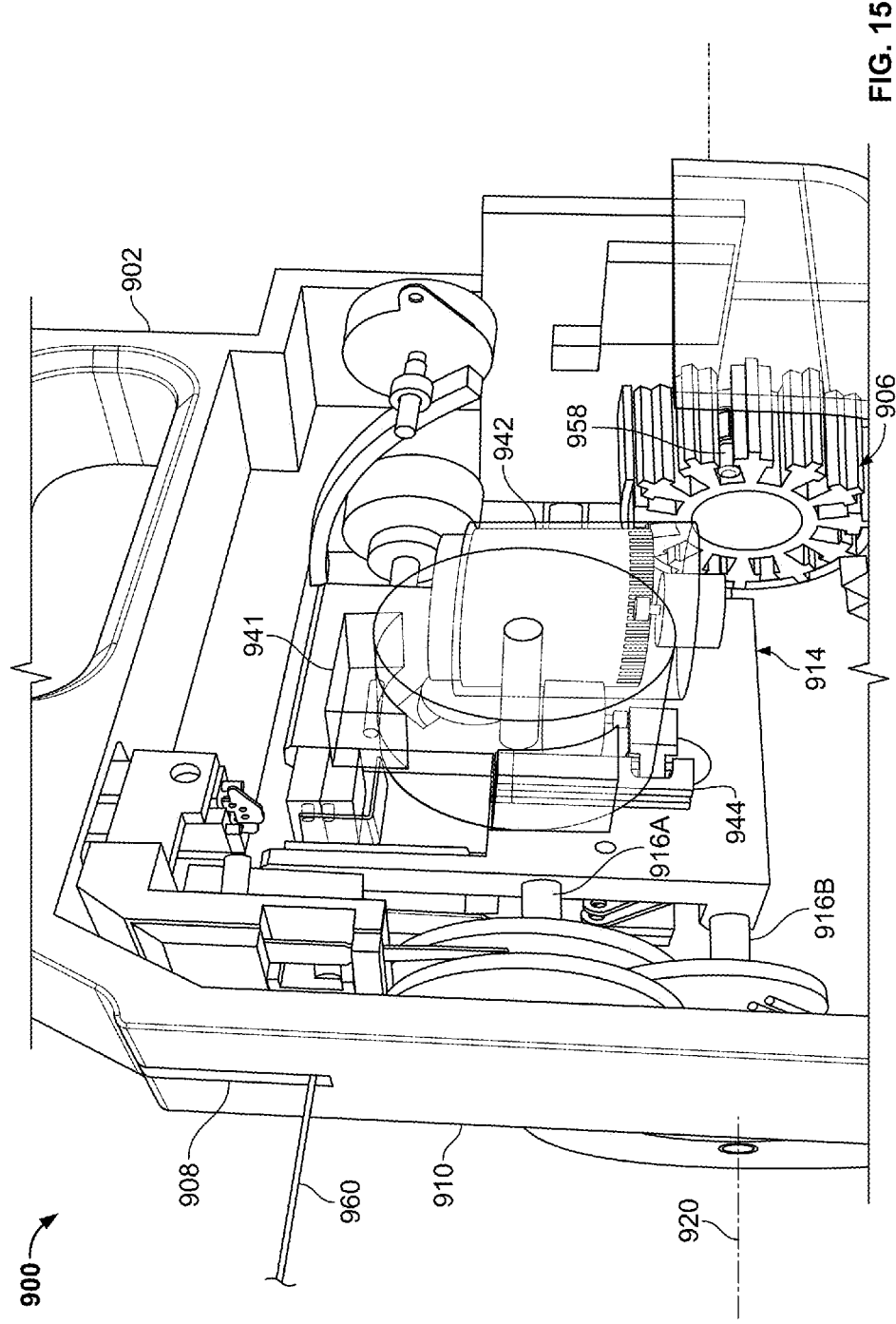

The connector cartridge 906 of the tool 900 is preferably loaded with connector bodies 958 (see FIG. 15). The connector cartridge 906 can include a plurality of slots or positions in which the connector bodies can be individually held. In one embodiment, the connector cartridge 906 can be a carousel that is indexed by a drive mechanism to consecutively position the slots containing the connector bodies 958 at a connector body pick-up location where the connector bodies 958 can be fed (e.g., by a pusher device) from the connector cartridge 906 to the connector body carrier and heating station 944. When all of the connector bodies 958 have been dispensed from the connector cartridge 906, the connector cartridge 906 can be removed from the housing 902 and replaced with a fully loaded connector cartridge 906.

In a preferred embodiment, a heat recoverable sleeve containing heat activated adhesive is preferably pre-mounted within each of the connector bodies 958. As described elsewhere herein, the heat recoverable sleeves are preferably positioned over attachment elements that are affixed or otherwise connected within the connector bodies 958. Once the connector cartridge 902 has been loaded within the housing 902, the tool 900 is ready to be used for processing optical fibers and for affixing connector bodies to the optical fibers.

To process and connectorize an optical fiber 960, it is only necessary to insert the optical fiber 960 into the housing 902 through the fiber insertion opening 908 along the insertion axis 961. FIG. 4 shows the optical fiber 960 being inserted into the housing 902. Once the optical fiber 960 is inserted into the housing 902, the carriage 914 slides along the linear bearings 916 (i.e., along the carriage slide axis 963) toward optical fiber 960 at the first end 910 of the housing 902 (see FIG. 5). The first clamp 954 then clamps on the optical fiber 960 and the carriage 914 is slid back toward the second end 912 of the housing 902 along the linear bearings 916 to pull a predetermined length of the optical fiber 960 into the housing 902 (see FIG. 6). Once the predetermined length of optical fiber has been pulled into the housing 902, the second clamp 956 is actuated to axially fix the optical fiber relative to the housing 902. The first clamp 954 is then opened (see FIG. 7) and the carriage 914 is slid back toward the first end 910 of the housing 902 such that the optical fiber 960 moves between the heated clamping elements 932A, 932B (see FIG. 8). The heated clamping elements 932A, 932B are then moved from the open position to the closed position (see FIG. 9) and heated. In this way, the heated clamping elements 932A, 932B heat and clamp an outer coating of the optical fiber 960. The tapes 936A, 936B are positioned between the optical fiber 960 and their respective heated clamping elements 932A, 932B and function as protective layers/shields as well as providing a debris capturing function.

Figure 10:
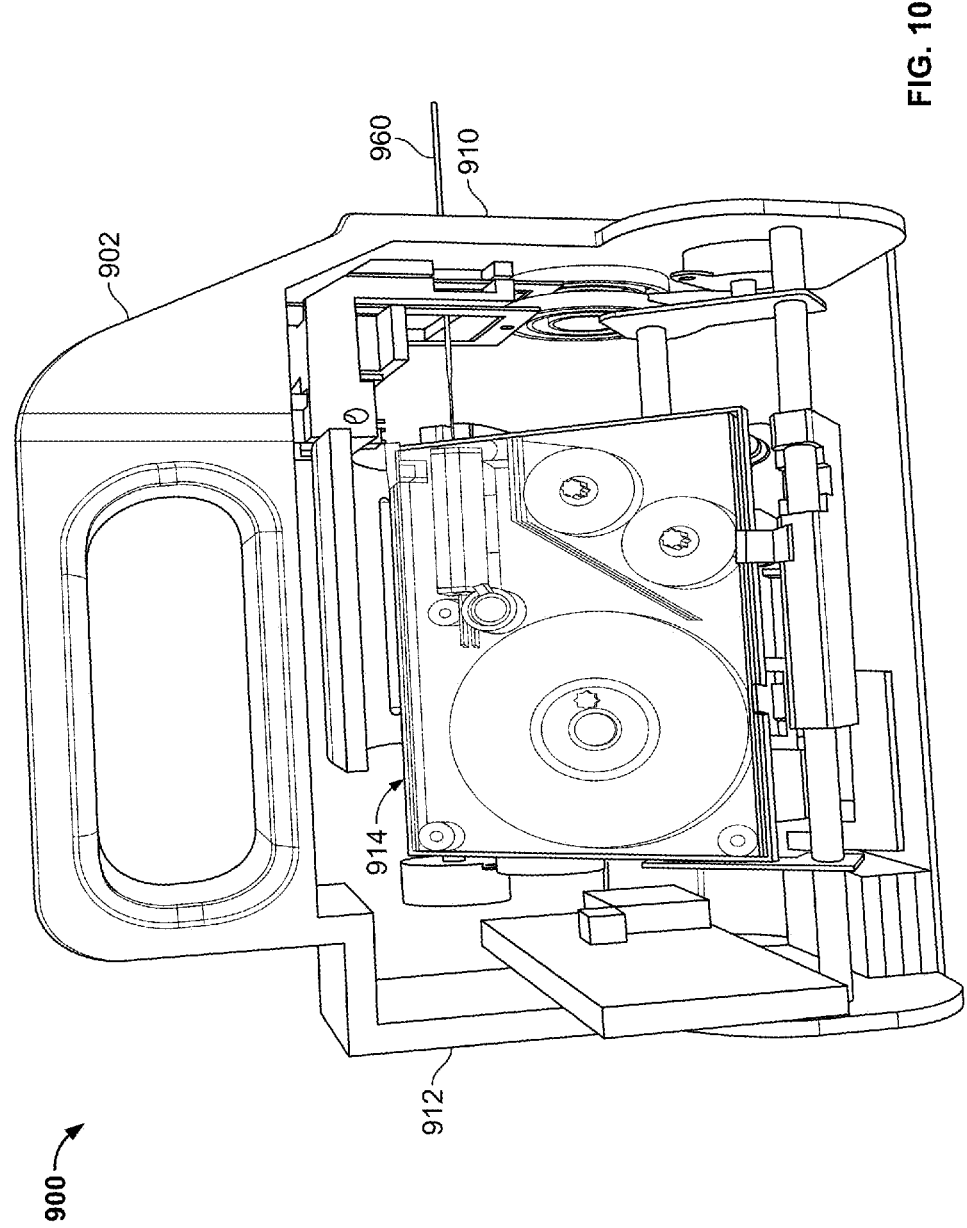

Once the coating of the optical fiber 960 has been heated and otherwise processed (e.g., scored) at the stripping station, the carriage 914 is moved back along the linear bearings 916 toward the second end 912 (i.e., axially away from the optical fiber 960) such that the heated and clamped portion of the coating of the optical fiber 960 is axially pulled and thereby stripped from the bare glass portion of the optical fiber 960. The stripped portion of the coating is captured between the tapes 936A, 936B of the waste collection device 934. FIG. 10 shows the optical fiber with the end portion of the coating stripped from the bare glass portion.

Figure 11:
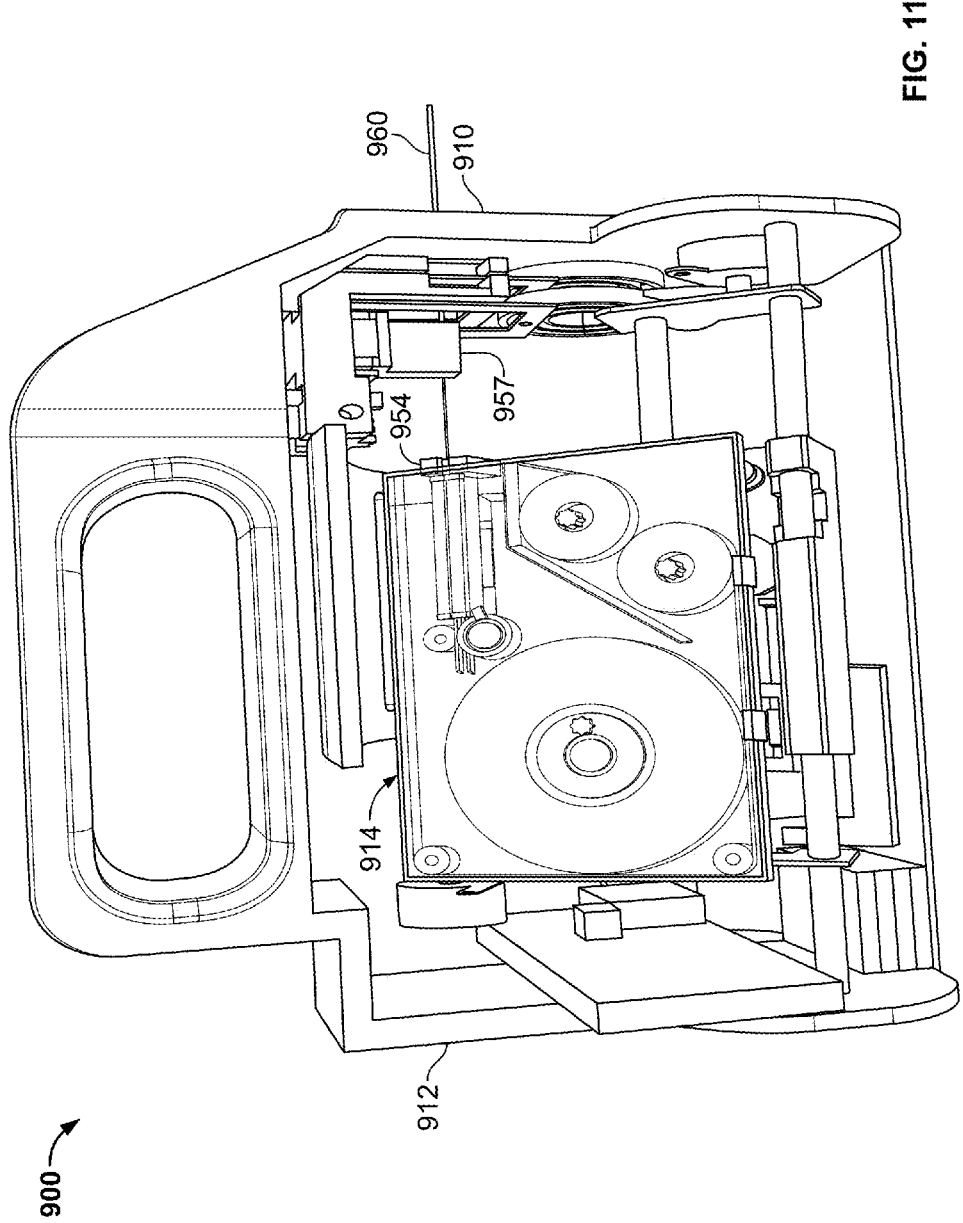
Figure 12:
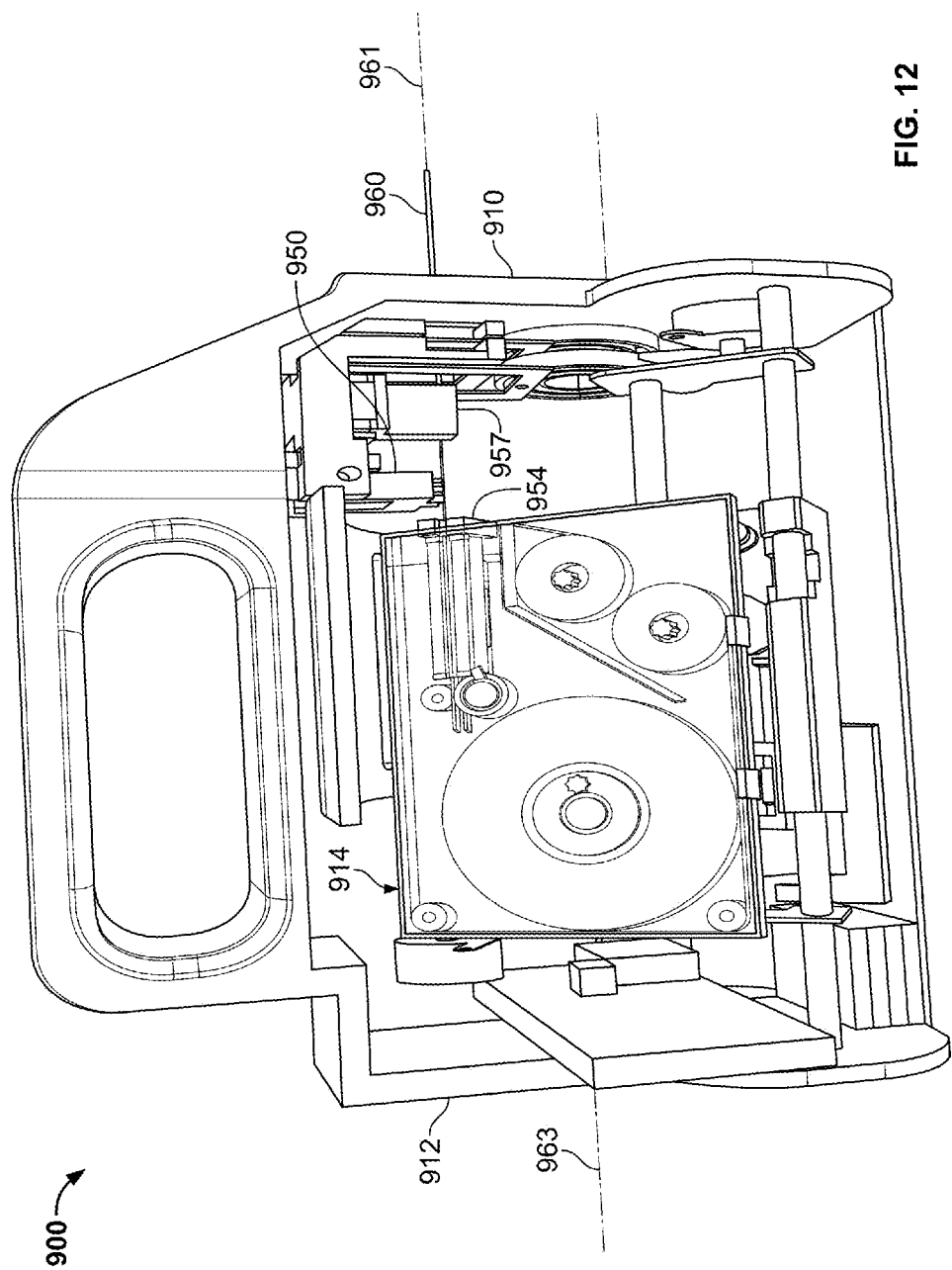
Figure 13:
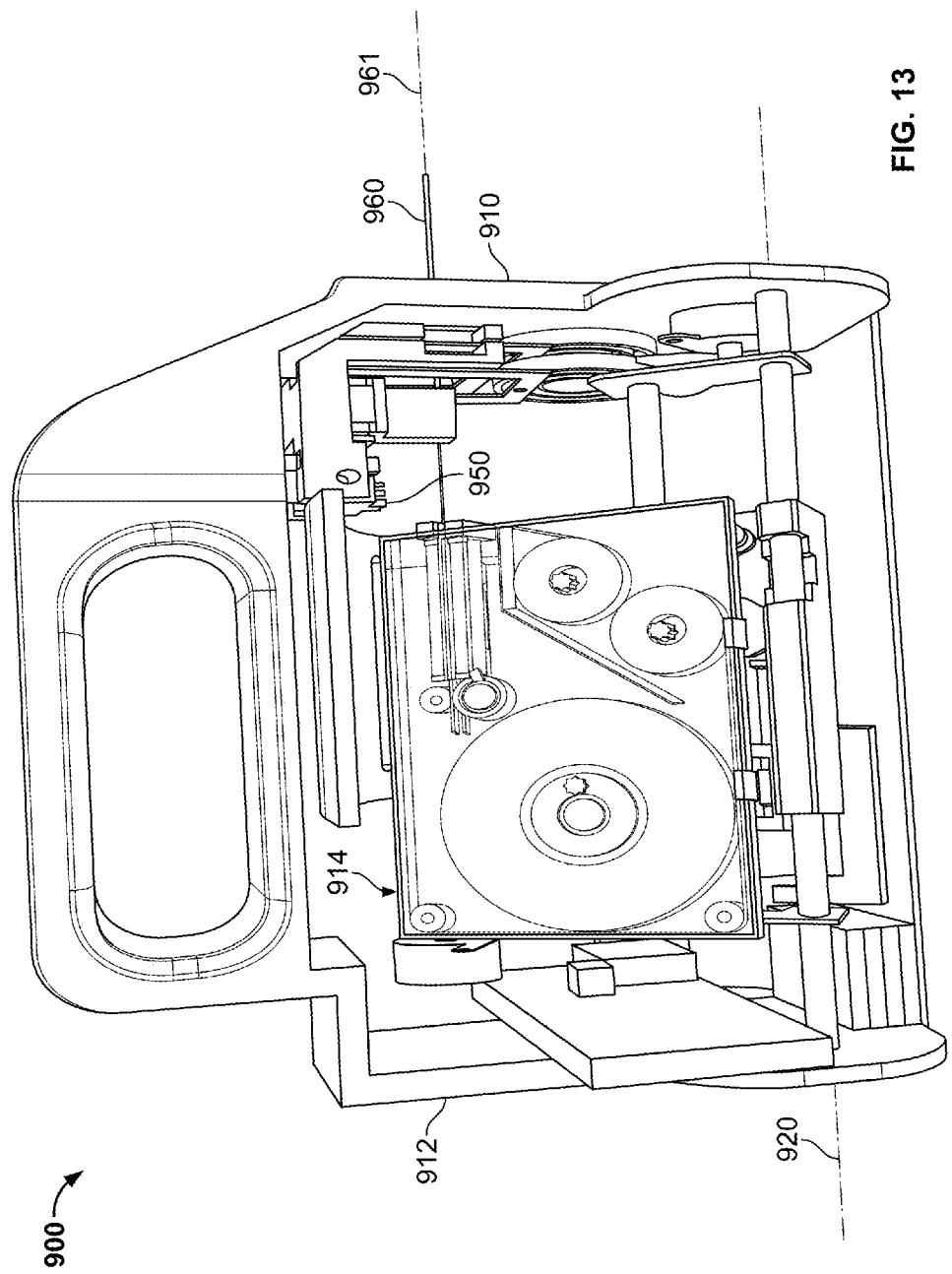

After stripping, the optical fiber 960 is clamped by the third clamp 957 and the first clamp 954 (see FIG. 11). The first clamp 954 clamps on the bare glass portion of the optical fiber 960 and the third clamp 957 clamps on a coated portion of the optical fiber. The cleaving station 950 is then extended thereby lowering the cleaving station 950 to a cleaving position aligned with the insertion axis 961 of the optical fiber 960 (see FIG. 12). The optical fiber 960 is then cleaved by the cleaving station 950. The waste end portion of the fiber and any other cleaving debris are captured by the waste collection device 934. After cleaving, the cleaving station 950 is retracted (see FIG. 13) and the carriage 914 is pivoted about the pivot axis 920 (see FIGS. 14 and 15) to offset the stripping station from the fiber insertion axis 961 and to orient the rotating head 926 in alignment with the fiber insertion axis 961. As so positioned, the arc treatment station 941 carried by the rotating head 926 aligns with the optical fiber 960 (see FIGS. 15 and 16).

Figure 17:
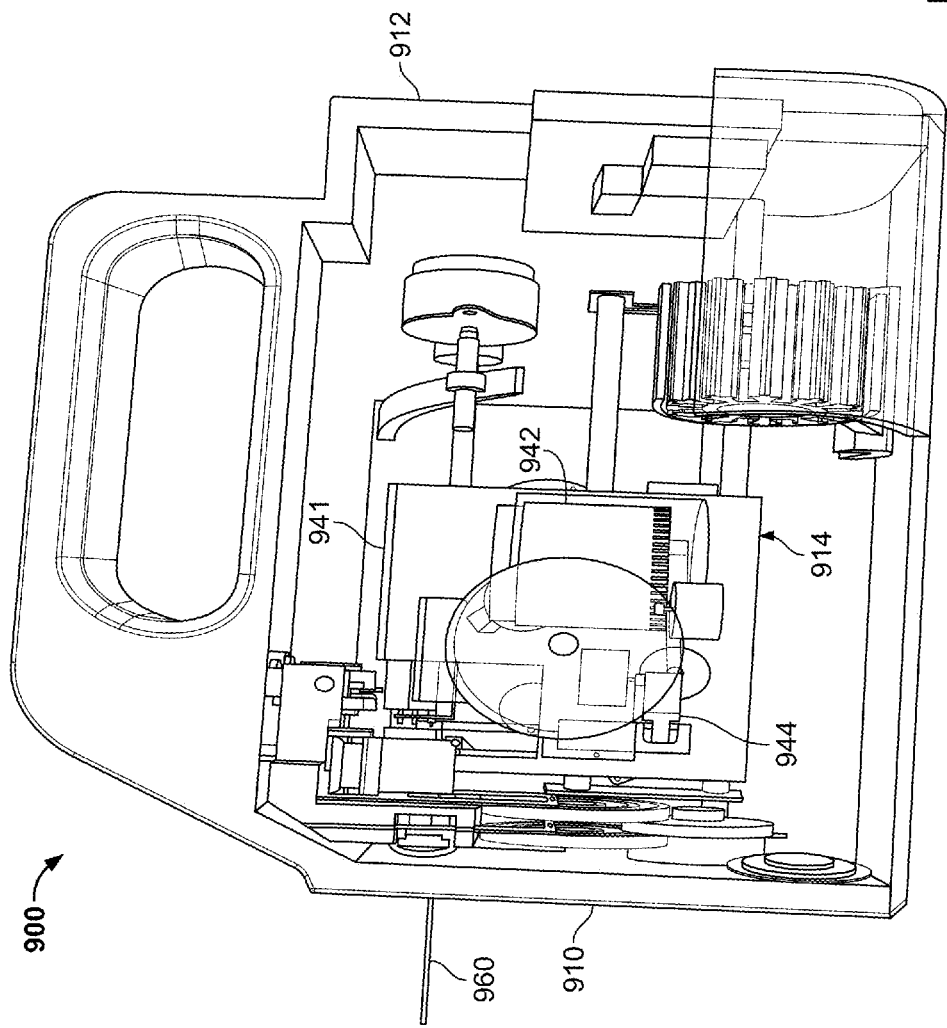
Figure 18:
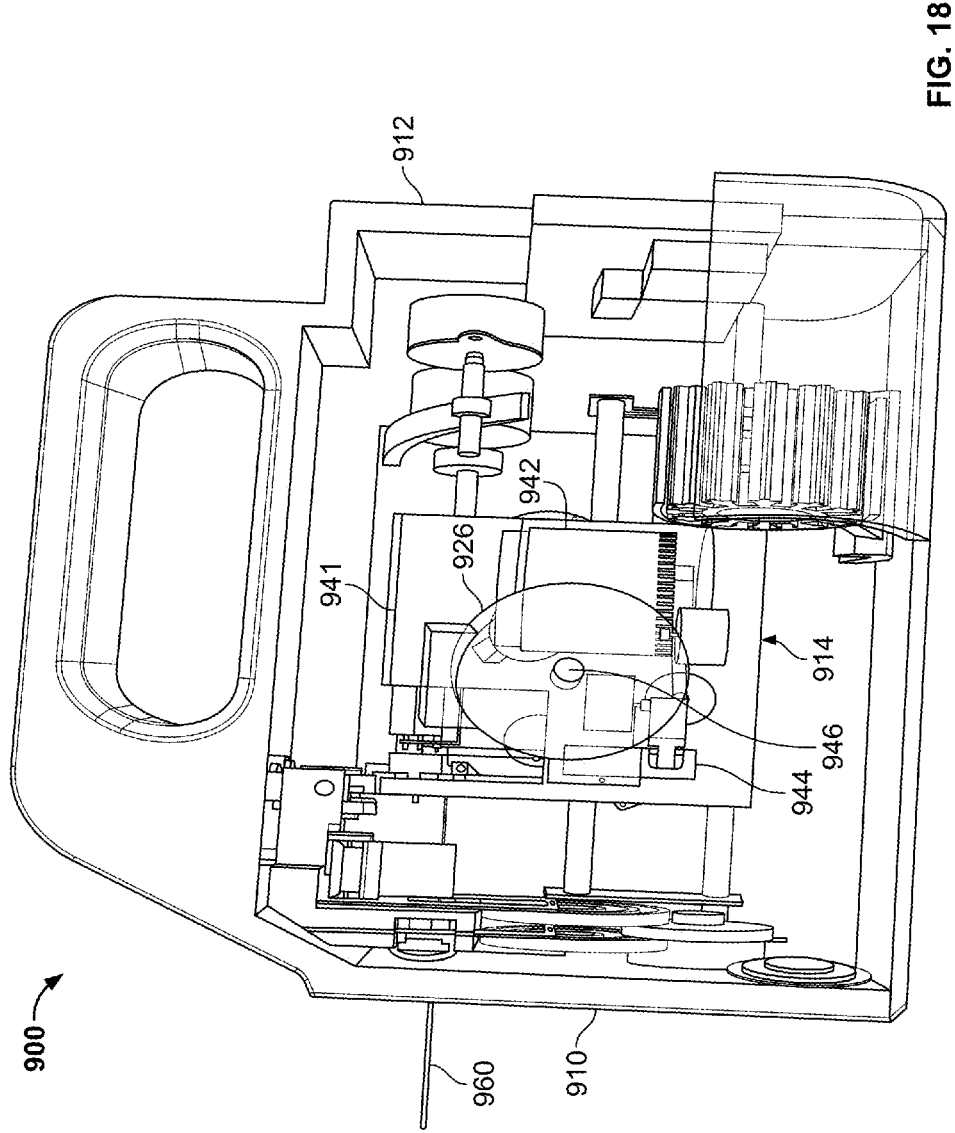
Figure 19:
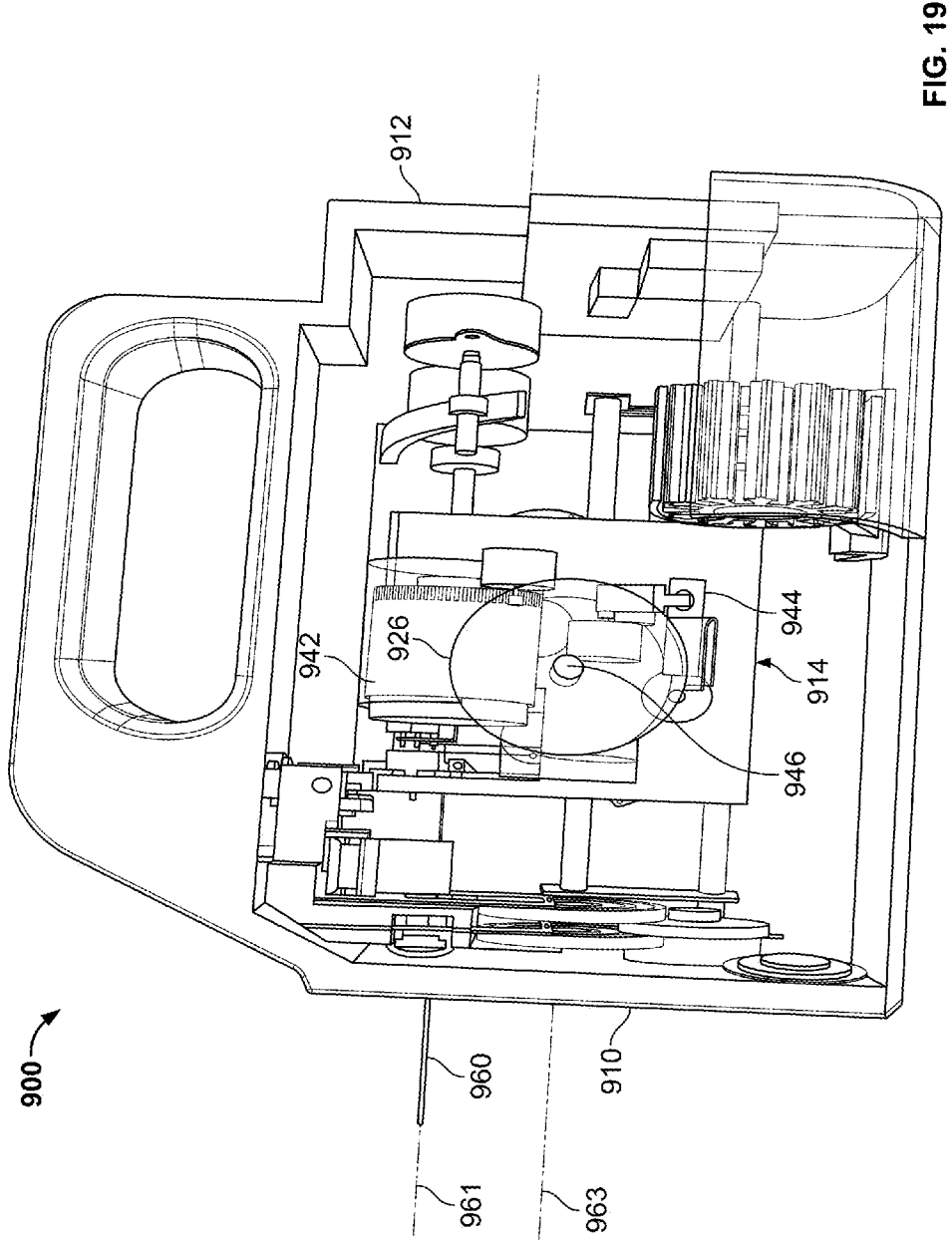
Figure 20:
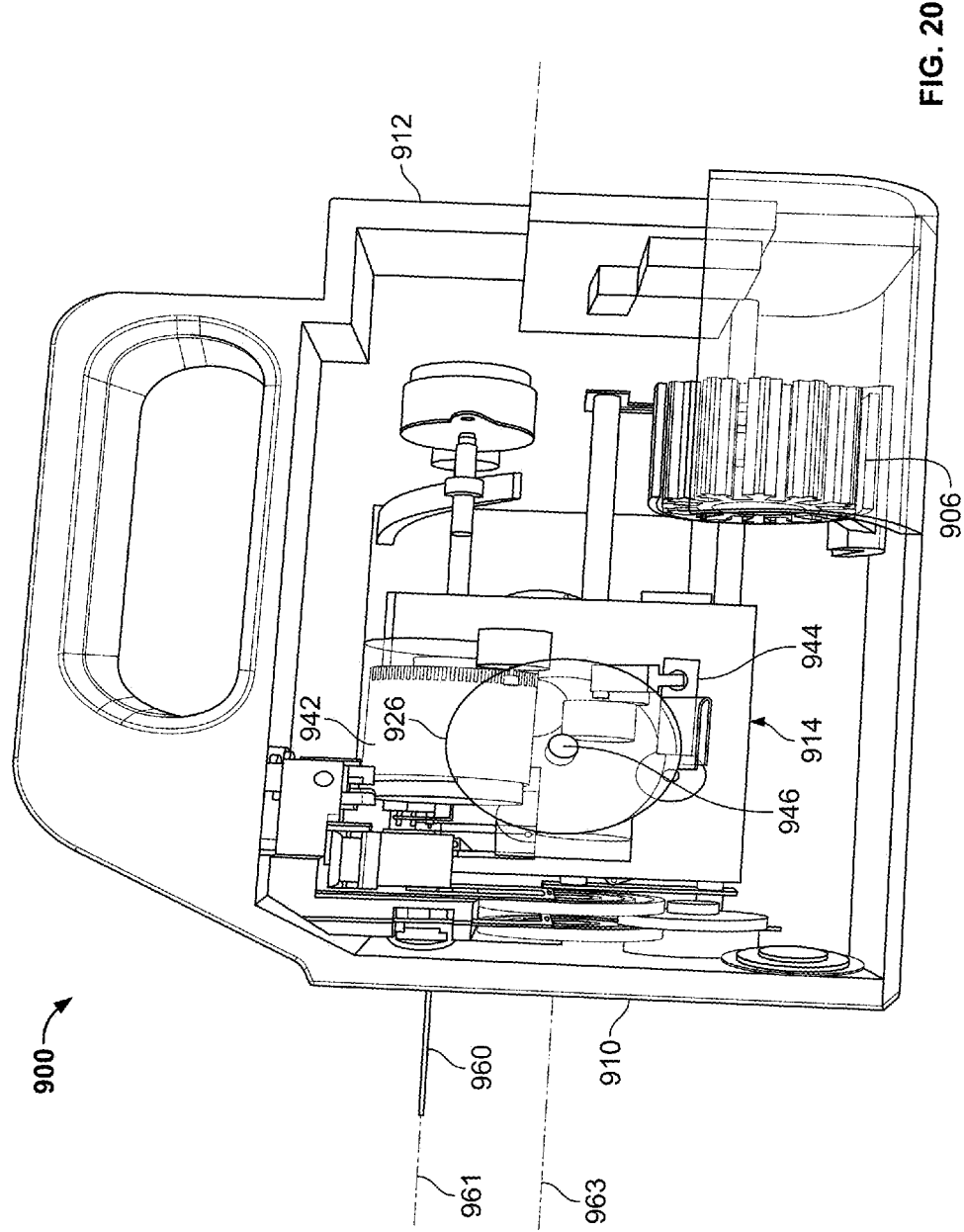

The carriage 914 is then slid along the carriage slide axis 963 back toward the first end 910 of the housing 902 (i.e., back towards the optical fiber 960) such that the optical fiber 960 is received/positioned/inserted within the arc treatment station 941 (see FIG. 17). With the optical fiber 960 positioned within the arc treatment station 941, the cleaved end of the optical fiber 960 is processed by an arc treatment process of the type described elsewhere herein. After the arc treatment process has been completed, the carriage 914 is slid back away from optical fiber 960 along the carriage slide axis 963 such that the optical fiber 960 is removed from the arc treatment station (see FIG. 18). The rotating head 926 is indexed about the axis of rotation 946 to bring the optical testing station 942 into axial alignment with the optical fiber 960 (see FIG. 19). The carriage 914 is then again slid along the carriage axis 963 toward the optical fiber 960 such that the optical fiber 960 is received into the optical testing station 942 for optical testing (see FIG. 20).

Figure 21:
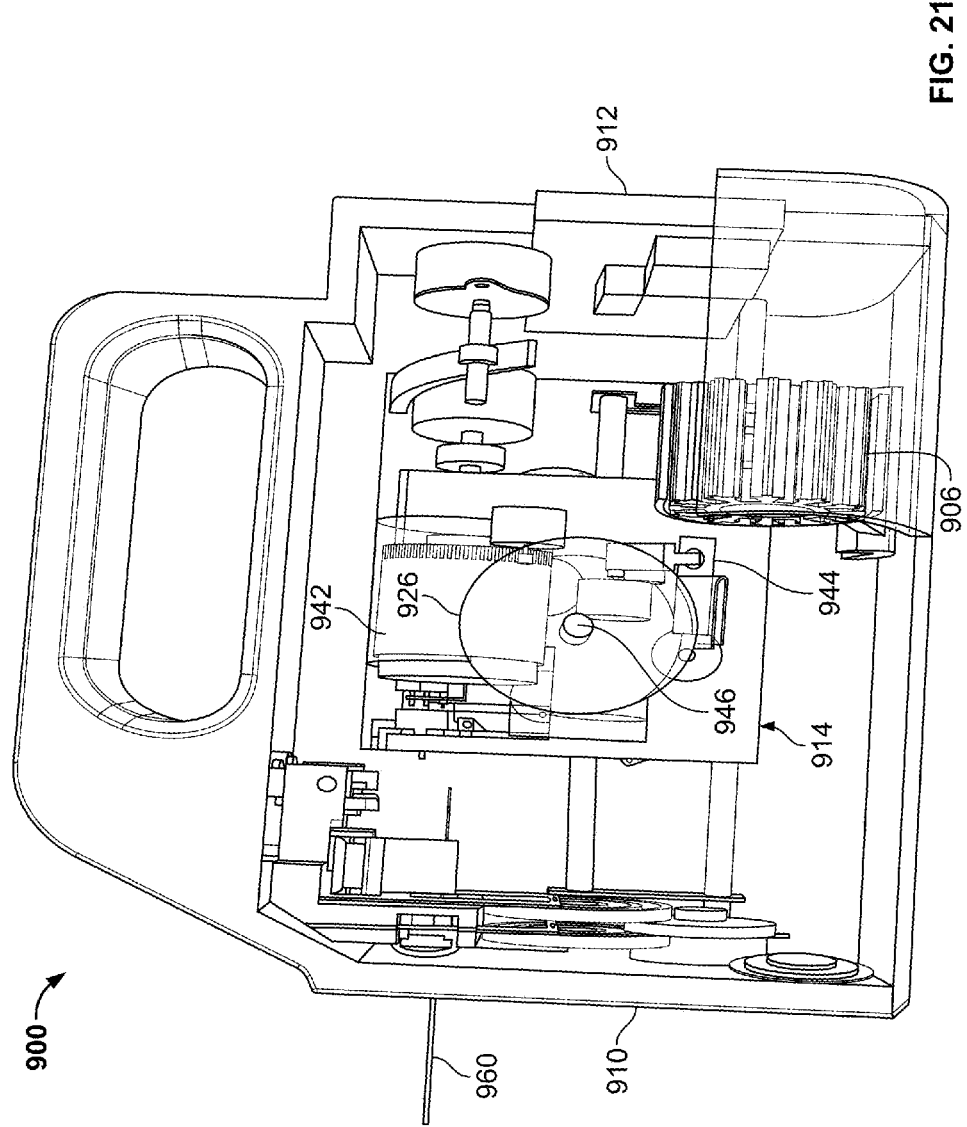
Figure 22:
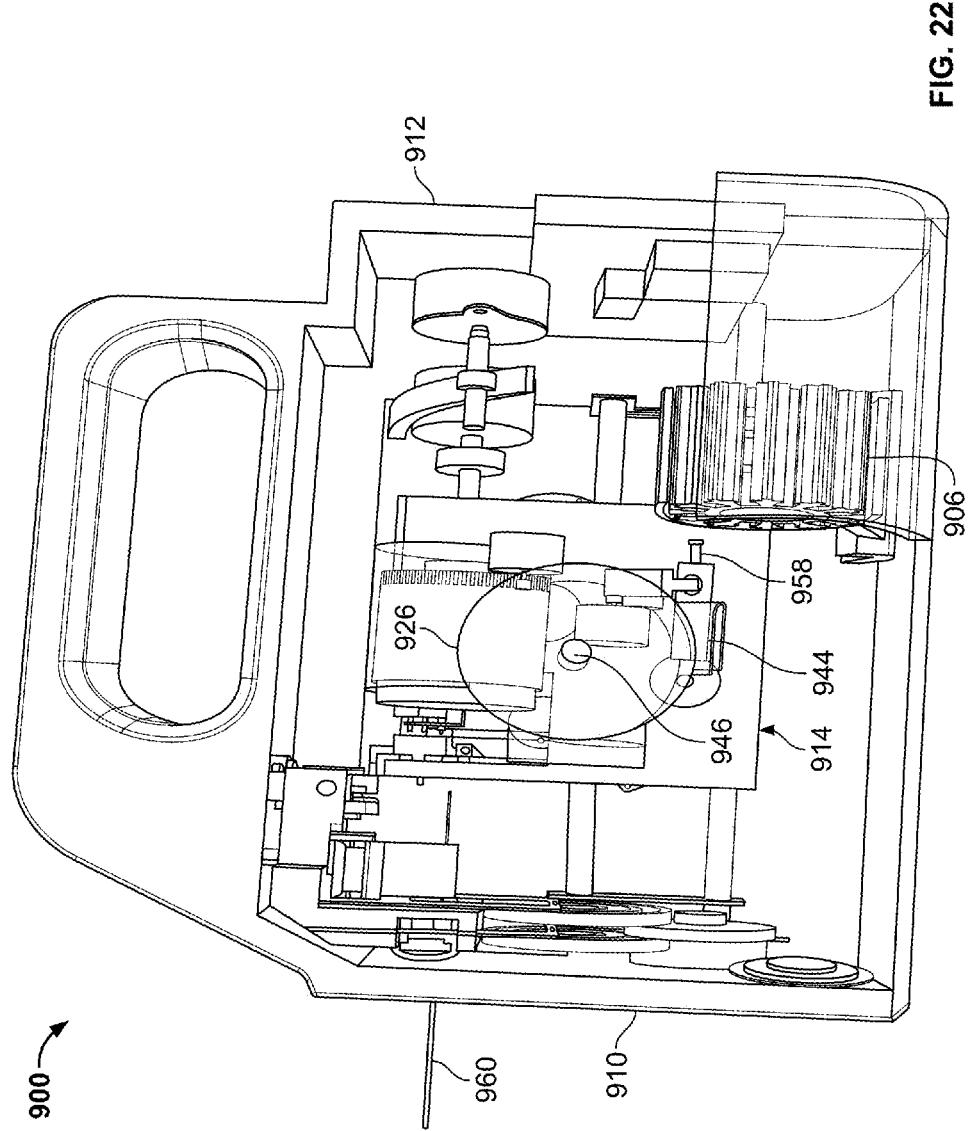

After optical testing, the carriage 914 is slid along the carriage slide axis 463 away from the optical fiber 960 to a position where the optical fiber 960 is removed from the optical testing station 942 and the connector body carrier and heating station 944 is positioned directly adjacent to the connector cartridge 906 (see FIG. 21). A connector body 958 is then dispensed from the connector carriage 906 into the connector body carrier and heating station 944 (see FIG. 22). It will be appreciated that a mechanical pusher or other structure can be used to transfer the connector body 958 from the connector cartridge 906 to the connector body carrier and heating station 944. It will also be appreciated that the connector cartridge 906 can be rotationally indexed such that a given connector body 958 is ready to be dispensed to the connector body carrier and heating station 944.

Figure 23:
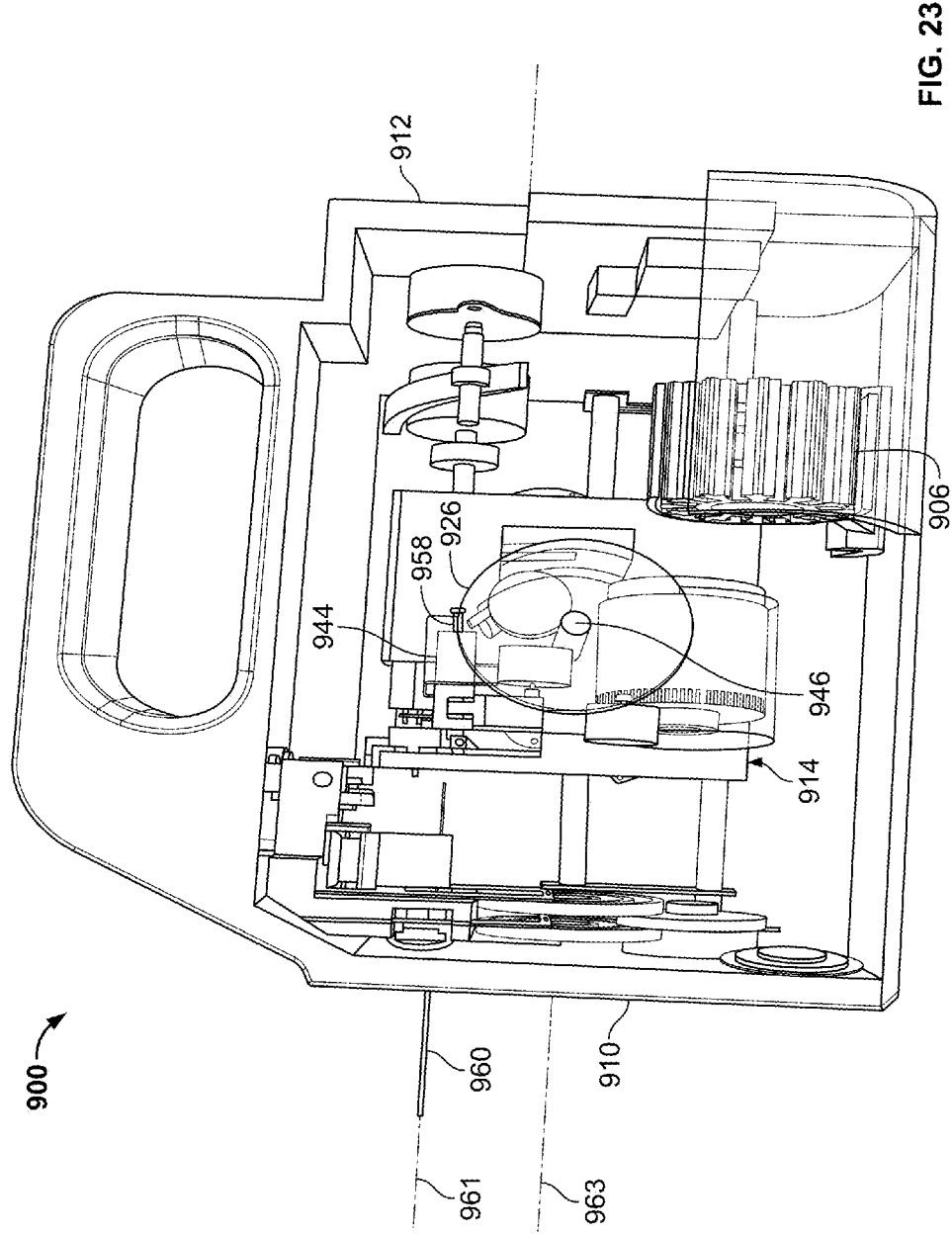
Figure 24:
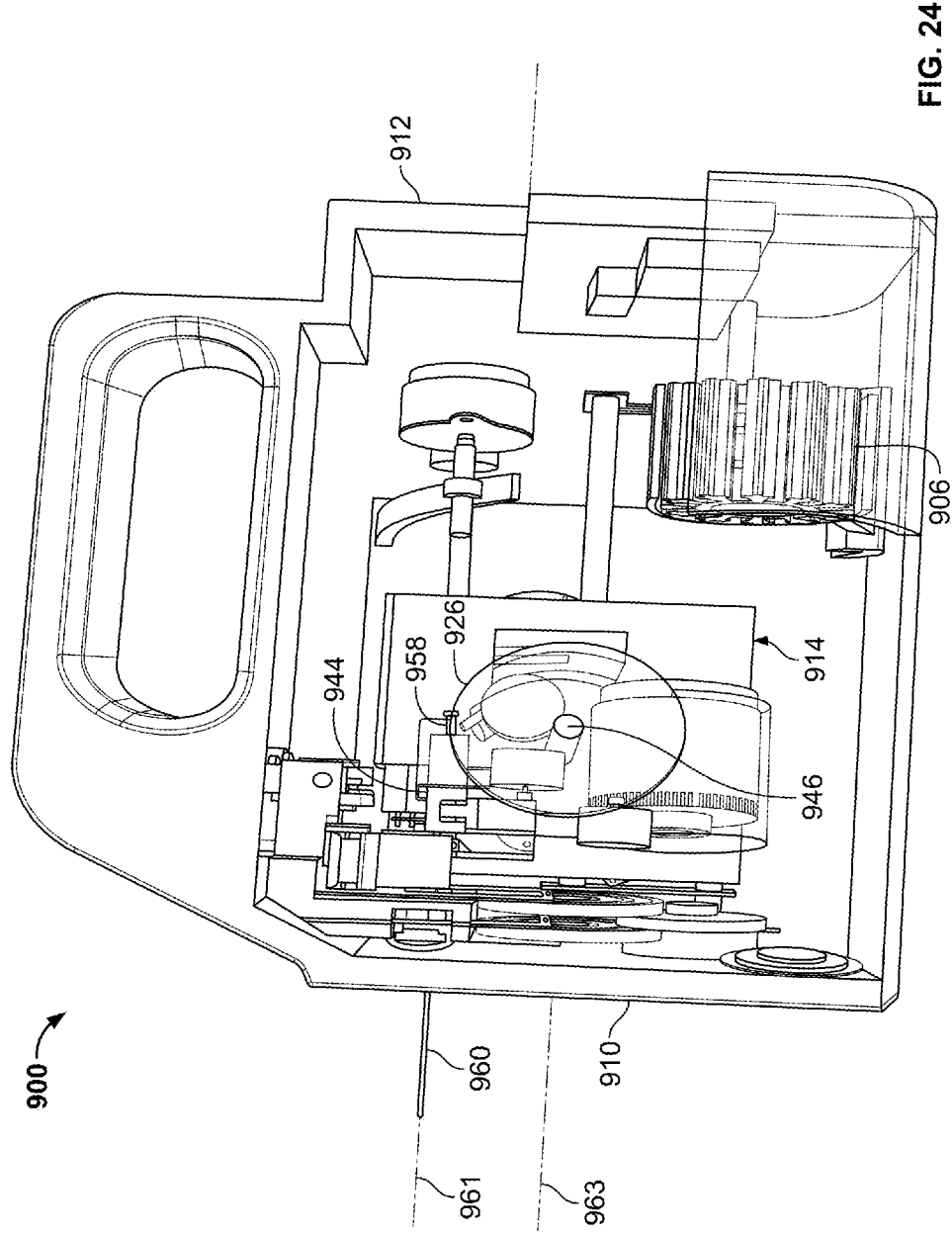
Figure 25:
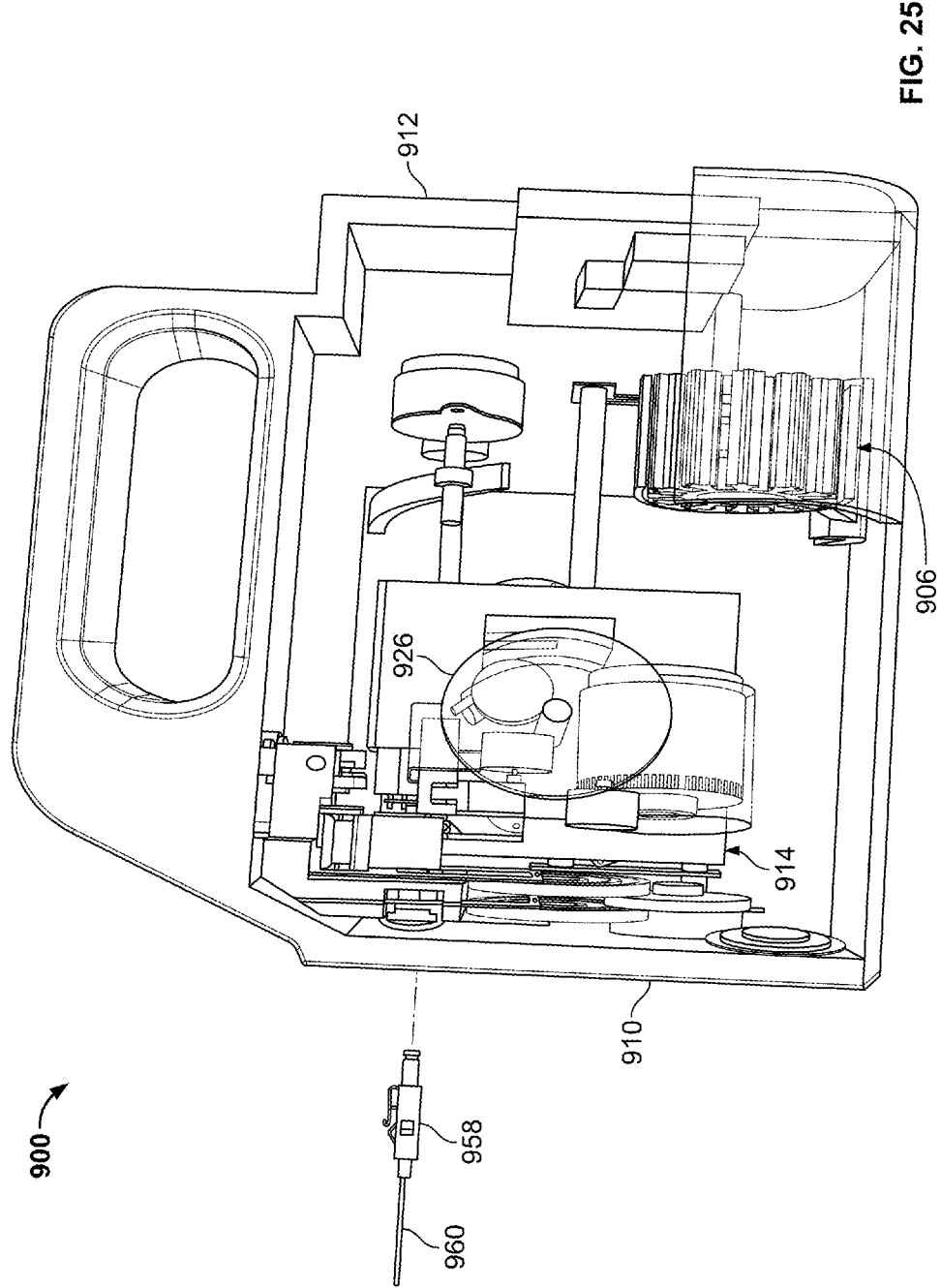

Once the connector body 958 has been loaded into the connector body carrier and heating station 944, the rotating head 926 is indexed about the axis of rotation 946 to bring the connector body 958 held by the connector body carrier and heating station 944 into alignment with the optical fiber 960 (see FIG. 23). The carriage 914 is then slid along the carriage slide axis 963 back toward the optical fiber 960 such that the optical fiber 960 is received into the connector body 958 (see FIG. 24). As the connector body 958 slides over the optical fiber 960, it will be appreciated that the optical fiber 960 fits inside the heat recoverable sleeve that is positioned over the attachment member connected within the connector body 958. With the optical fiber 960 extending within the heat recoverable member, the heat recoverable member is heated by the connector body carrier and heating station 944 as described elsewhere herein to shrink the heat recoverable sleeve down upon the optical fiber and to activate heat activated adhesive located within the heat recoverable sleeve. Once the adhesive has suitably cured, the adhesive and the heat recoverable sleeve cooperate with the attachment member to axially affix the optical fiber 960 within the connector body 958. The various clamps within the housing 902 are then released thereby allowing the operator to pull the optical fiber 960 with the connector body 958 attached thereto from the housing 902 through the fiber insertion opening 908 (see FIG. 25). The various mechanisms within the housing 902 then reset and the tool 900 is ready to process and connectorize another optical fiber in the same manner described above.

In certain embodiments, the arc treatment is performed at the cleaved end of the optical fiber 960 so as to provide an arc treated, unspliced end of the optical fiber. Such a treatment is particularly suitable for ferrule-less connectors. In such embodiments, the heat recoverable sleeve and adhesive can affix the optical fiber to the connector body in cooperation with the attachment member, and no optical splice is provided within the heat recoverable sleeve. In other embodiments, a ferruled connector can be manufactured by pre-installing a ferrule within fiber optic pigtail in each connector body 958, and then splicing (e.g., fusion splicing) the fiber optic pigtail to the optical fiber 960. The splice can be protected and reinforced by a heat recoverable sleeve containing heat activated adhesive.

Figure 50:
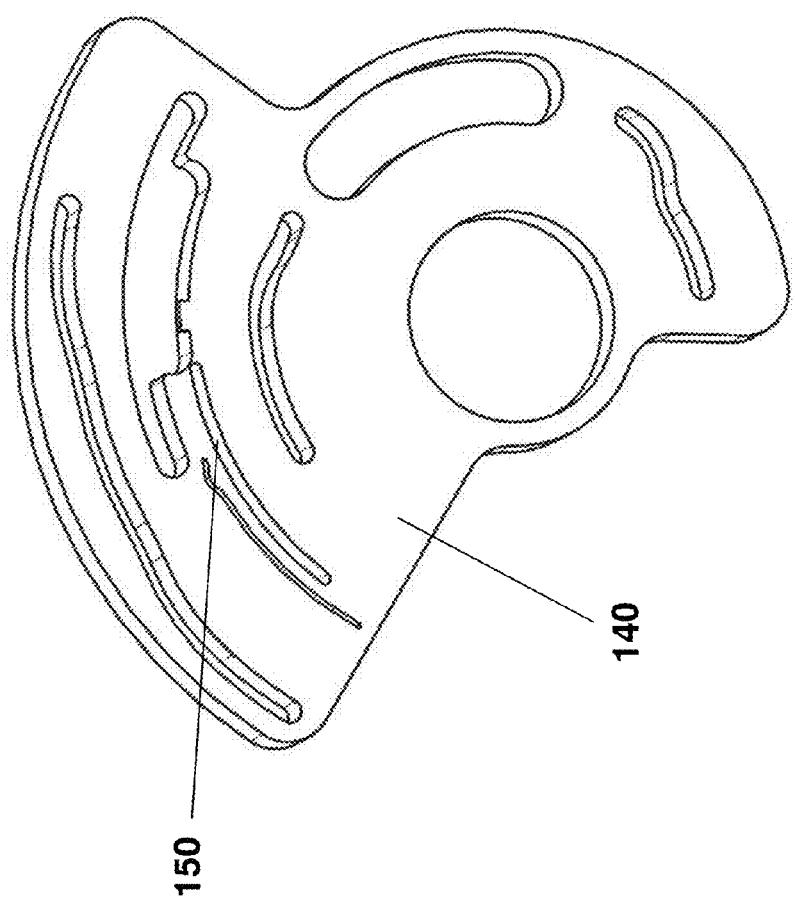
FIG. 50 shows an embodiment of a cam plate as used in an embodiment of the invention.

In some embodiments, another aligning means is cam plate opening 150 in cam plate 140, shown in FIG. 50. A function of cam plate 140, which is also shown in FIG. 2, is to actuate specific clamps in the device 10. Further, cam plate opening 150 is used to align optical fiber 100 near its end 101.

In the embodiment of FIGS. 1 and 2, the different stations used to perform operations to prepare the optical fiber 100 are configured in a rotationally symmetric layout.

FIG. 51 illustrates such a layout: the stations 90 rotate, e.g. in the direction of arrow 28, around an axis 103 parallel to the axis 102 of the optical fiber 100. As mentioned already above, the relative movement is important; therefore in another embodiment the stations may remain fixed and the optical fiber may rotate.

FIG. 52 illustrates another possible layout, wherein the stations 90 translate in the direction of arrow 27, perpendicular to the axis 102 of optical fiber 100. In FIG. 52, the stations are arranged along a single row. In another, preferred embodiment the stations are aligned along more than one, preferably along two, parallel rows. The stations can then be moved by translational movements to the location of optical fiber 100. Such a layout along two rows is compact, as is also the case for the rotational layout shown in FIG. 51.

Now the different operations will be discussed that may be performed in the different stations of the portable tool.

Figure 39:
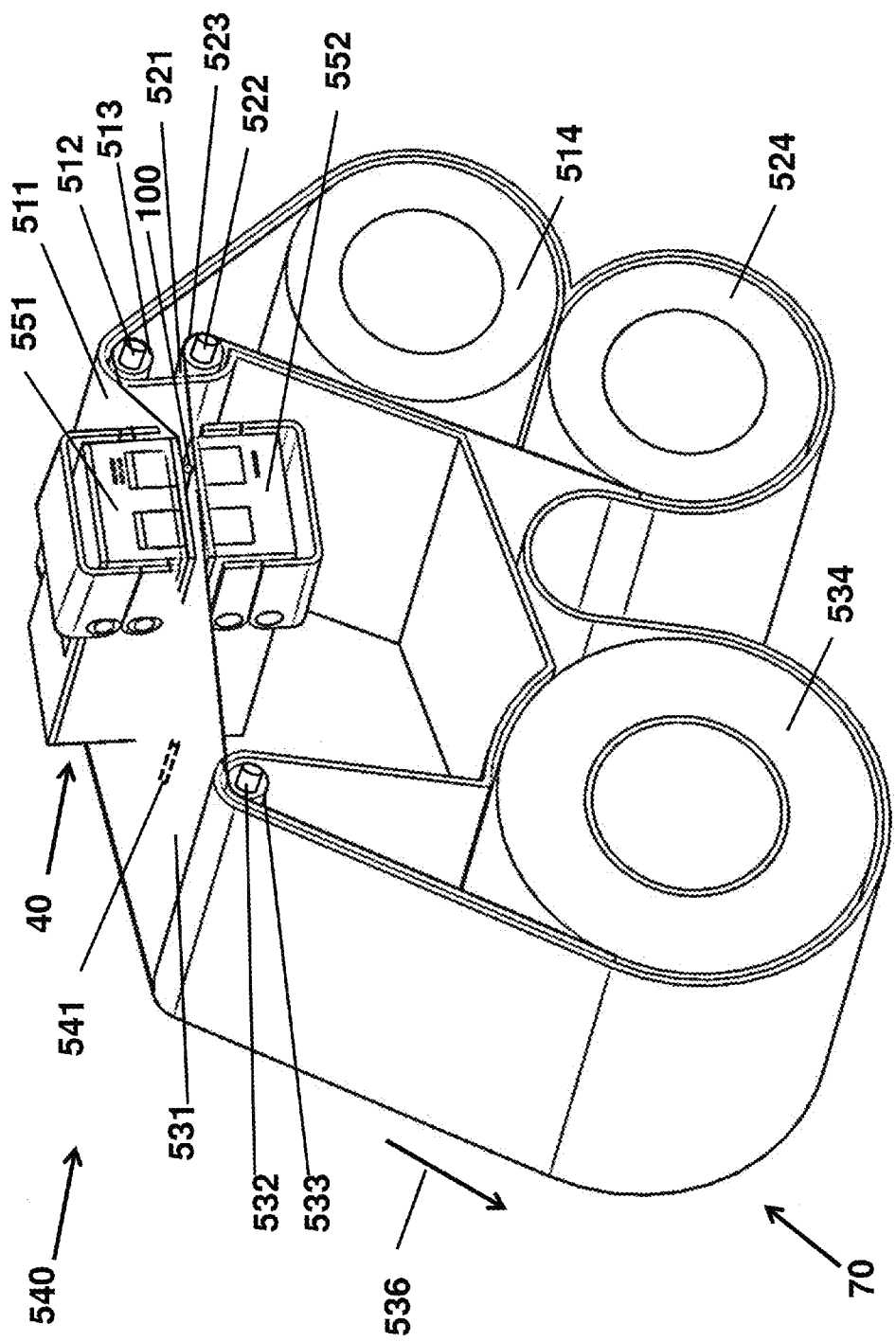
FIG. 39 schematically illustrates a device according to an embodiment of the invention that includes a tape cartridge.

FIG. 39 shows a stripping station 40 and tape cartridge 70. In the stripping station, one or more coatings are removed from the optical fiber. The stripping is performed by a reliable stripping process; this is required because of the high degree of automation of the device. In one embodiment, the fiber is stripped as follows. Stripping is performed in two or more steps: in a first step the buffer is stripped, in the subsequent step or steps the coating. Preferably, stripping knives as well as heaters are used: the buffer and coating are heated by the heaters, and subsequently an incision in the coating, not as far as the cladding, is made by the knives. The knives are retracted, and the heaters move in a direction along the fiber axis, while clamping the fiber. A friction force is thus exerted by the heaters on the fiber, while the fiber cladding and core are clamped (by the fixed clamp 20), so that the coating is removed. In an embodiment, a set of coatings having diameters of 900 μm and 250 μm are removed. In one embodiment, the coatings are removed over a length of 35 mm. Preferably, the heaters have the form of flat clamps. In a preferred embodiment, the heaters are protected from direct contact with the coated fiber by tape. This prevents the heaters from being contaminated by hot coating residues.

FIGS. 41a and 41b schematically illustrate the operation of an embodiment of a stripping device 540 in accordance with the invention. FIGS. 41a and 41b show side views of the stripping device 540, in two different positions. In FIG. 41a, optical fiber 100 is held by fixed clamps 20 and positioned between heated stripping clamps 551, 552. The stripping clamps are closed, and clamp fiber 100. They are protected by protective means 511, so that they do not contact the coated fiber 100. The fixed clamps 20 may support fiber 100 continuously throughout the stripping process. Before the fiber enters the stripping clamps 551, 552, a movable clamp (not shown) may be provided to guide the fiber end between the stripping clamps 551, 552 in such way that no contact between the fiber end and the tapes is established. Preferably, first an incision can be made in the coating but not as far as the cladding by means for making an incision, e.g. retractable knives or heated profiled blades or a heated protruding element 604. After making an incision the means for making an incision 604 can be retracted. The retraction can be controlled by an actuating moving means 614, such as a motor. The clamps are heated at a temperature between 100 and 120° C. of e.g. 120° C. The coating of the optical fiber 100 is thus heated, and weakened preferably the heated plates and the means for making an incision are protected at all times by the protective means 511. The making of an incision by the means for making an incision 604 may occur before or during the heating. The stripping clamps 551, 552 clamp the fiber 100 and protective means 511, gluing both tapes 511 together and capturing the coating. The stripping clamps 551, 552 are moved relatively to the cladding of the optical fiber, by actuating moving means, such as a motor, comprised in the stripping device 540. In FIG. 41b, the stripping clamps 551, 552 are translated along the fiber axis away from the fixed clamps over a predefined distance. The coating is translated as well because of the frictional force between the coating and the protected stripping clamps, and as a result the coating breaks at the location between the heated and the non-heated portion. The captured coating 541 of the optical fiber is sandwiched between the protective means 511. The protective means 511 may be a tape, whereby the single tape may be guided around the optical fiber so that it forms a wrap, and that the captured coating 541 is caught between two portions of the single tape facing each other and forming a sandwich. In some embodiments two tapes can be used, each tape protecting a stripping clamp and a means for making an incision e.g. one adhesive tape and one non-adhesive tape, so that the sandwich may be evacuated and move the captured coating 541 away from the stripping clamps. Because of the protective means 511, the hot stripping clamps 551, 552 and means for making an incision 604 are not contaminated by coating debris. An additional advantage is that this stripping process can easily be performed in an automated device, since coating debris is safely evacuated.

In some embodiments, the tape material preferably has high strength and good resistance to temperatures up to e.g. 220° C. Further it preferably has a low coefficient of friction with respect to glass, preventing high clamping forces on the fiber after the stripping operation. A tape comprising of non-woven materials may be used, such as cellulose based materials.

Other materials used for a tape according to embodiments of the invention can be for instance Kapton tape, which is a polyimide film (poly [4,4'-oxydiphenylene-pyromellitimide]), which can remain stable in a wide range of temperatures, from −273 to +400° C. Also different other types of tape substrates can be used such as PET (polyethylene) which can be used at lower temperatures (up to 120° C.). In embodiments where profiled blades are used, tapes consisting of a woven textile material can be used. For instance two types that are commercially available can be used: (1) Optipop RS, which is the tape material used in the optical connector cleaner Optipop R1 produced by NTT AT, and (2) a woven textile tape material as used in ReelClean 500 optical fiber connector cleaner produced by Korean company TheFibers Inc.

In case of perpendicular tape transport, the tape may have a width of about 25 mm which is about the stripping length. The tape may also have markers which are used to wind the tape over the right distance and indicate the end of the tape. The tape may be carried in a cartridge that can be wider than the tape to accommodate debris protruding from the tape.

In addition, when using a single tape and/or second tape in some embodiments of the invention, to protect the fiber when using a heater, a tape comprising no sticky or adhesive zones can be used. The heat produced by the heater preferably generates the sticky behavior of the tape which helps the trapping of the debris. In an alternative embodiment, the tape can comprise zones with adhesives, whereby the adhesives become sticky after heat activation, thus the heat activated tape remains usually tack-free until it is activated by a heat source.

In other embodiments, the first or second tape may comprise zones which are embossed, whereby said embossed zones are adapted to cover perforated zones of the other tape. The embossed zone of the first or second tape and the perforated zone of the other tape are positioned such that a sandwich can be formed when both tapes are aiding the trapping of the debris.

Figure 45B:
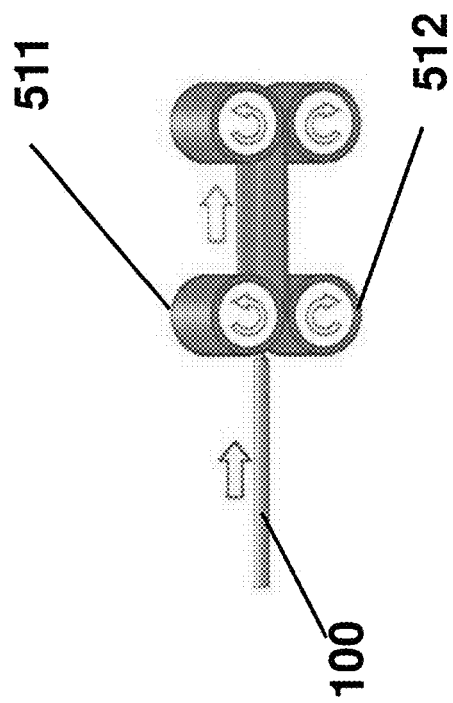
FIG. 45a illustrates perpendicular tape transport and FIG. 45b axial tape transport according to embodiments of the invention.
Figure 45A:
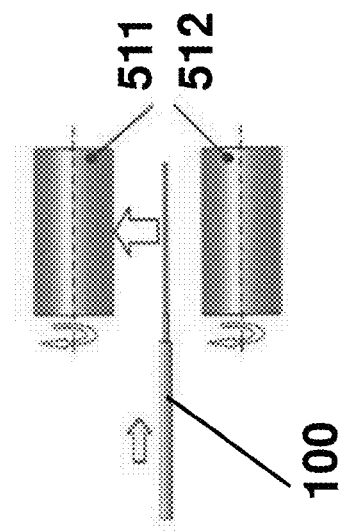

As protective means 511 two tapes may be used, each for one heated clamp. The two tapes may be of the same type, or of a different type. Alternatively, a single tape may be used that is wrapped around the fiber when it is inserted between the clamps, so that it protects both stripping clamps. The tape 511 may be driven between the stripping clamps in a direction perpendicular to the axis of the optical fiber, as shown in FIG. 45*a*. Alternatively, the tape 511 may be driven in a direction parallel to the axis of the fiber 100, as shown in FIG. 45*b*.

After evacuation of the stripped coating of the optical fiber 541, the stripped portion of the optical fiber can be guided back (not shown) and positioned between the stripping clamps 551, 552, then the stripping clamps are closed, which clamp the fiber 100. Again, the clamps and knives are preferably both protected by protective means 511, so that they do not contact the stripped portion of the optical fiber. The fixed clamps 20 may support the fiber 100 continuously throughout the stripping process. The heating clamps are heated at a temperature of e.g. 120° C. and any remaining debris on the stripped optical fiber 100 is thus heated, and weakened. The stripping clamps 551, 552 are moved relatively to the stripped optical fiber, by actuating moving means, such as a motor, comprised in the stripping device 540. The stripping clamps 551, 552 are translated along the fiber axis away from the fixed clamps over a predefined distance. The remaining debris on the stripped portion of the optical fiber is translated as well because of the frictional force between the coating and the protected stripping clamps, and as a result the remaining debris of the stripped fiber is captured and sandwiched between the protective means 511. As a result the stripped portion of the optical fiber is cleaned and the remaining debris can be safely evacuated in a next step. In this embodiment, the retractable knives preferably are not applied.

In another embodiment of the present invention schematically illustrated in FIG. 42, the a stripping device 540 further can comprise cleaning means 640 in accordance with embodiments of the invention. Before the stripping clamps 1 or means of making an incision 604 are translated along the fiber axis away from the fixed clamps over a predefined distance, the cleaning means 640 are pivoted in a direction, as illustrated by arrows 641, 642. When the stripping clamps or means for making in an incision 604 are translated along the optical fiber axis, the cleaning means which cover the stripped portion of the optical fiber clean the stripped portion of the optical fiber along the axis of the optical fiber. The cleaning means 640 slightly put pressure on the stripped portion of the optical fiber and as a result of the translating movement of the stripping clamps the stripped portion of the optical fiber is cleaned.

Each cleaning means preferably can comprise a container which can be filled with a cleaning liquid. The cleaning liquid preferably is functional and hazardless during the heating of the clamps or means for making an incision. Preferably a benzyl alcohol is used having a suitable flaming and/or boiling point. For instance benzyl alcohol, having a boiling temperature of 203-205° C., a flaming point of 98° C., an ignition temperature of 436° C. can be used which is preferably non-toxic. Other examples can be improved formulations and mixtures based on benzyl alcohol such as for instance:

50% mixture of benzyl alcohol and TEGMBE (Triethylene glycol monobutyl ether), or a mixture of benzyl alcohol with 1% surfactant Byk333 (Polyether modified polydimethylsiloxane). Both additive substances are preferably chosen in order to improve cleaning performance by reducing the mixture's surface tension below that of the benzyl alcohol, in order to replicate the behavior of IPA (IsoPropyl Alcohol), but were also chosen such that the boiling point and flaming point would be comparable or higher to those of benzyl alcohol.

The cleaning means can be made of a rubber material such that the disposal of the cleaning liquid on the stripped fiber is performed in a controlled manner. One could also use a sponge material as cleaning means; however controlling the disposal or spreading of the cleaning liquid can be more difficult as compared to a rubber material. When translating the stripping clamps or means for making an incision along the fiber axis the stripped portion of the optical fiber is cleaned, preferably the protective means used in this embodiment can be a tape which is made of a textile material such that it can transfer the cleaning liquid to the stripped portion of the optical fiber in a most optimal way.

In other embodiments the cleaning means can be retractable in stead of pivotable, whereby the cleaning means are positioned on a stripped portion of the optical fiber, when the optical fiber is translated resulting in a cleaning of the stripped portion of the optical fiber. The retractable cleaning means can be controlled by an actuating moving means (not shown), such as a motor. After the cleaning operation the cleaning means can be retracted back to their original position. However, pivotable cleaning means are preferred as they advantageously take less space and result in a smaller stripping device.

FIG. 43*a* schematically shows a means for making an incision, for instance a profiled blade or knife according to another embodiment of the present invention. The profiled blade comprises an edged profile whereby the surface profile is adapted to fit to a protective means over the coating or cladding of an optical fiber. The edge profile of the profiled blade 660 comprises arcuate grooves preferably semicircular stripping grooves repetitively positioned next to each other along a direction perpendicular to the fiber axis, having a period of 0.3 mm, which have dimensions adapted to fit around an optical fiber, for instance having a radius of 0.0625 mm. The surface profile is shaped so that a free optical fiber end locates in one of the arcuate elements, i.e. is trapped thereby. FIG. 43*b* shows an enlarged view of detail A of the profiled surface blade.

The shape of the profiled blade is designed such that the larger radius portion of the curved edge matches the outer diameter of the bare fiber (i.e. 0.125 mm) with a circular clearance around the fiber of i.e. 0.05 mm to accommodate the cleaning means and/or the protective means (i.e. cleaning textile). When, two profiled blades are used, the resulting hole diameter is preferably such that it will cut enough into the coating but will not contact the cladding. This prevents the means for making an incision from damaging the glass fiber.

Figure 44B:
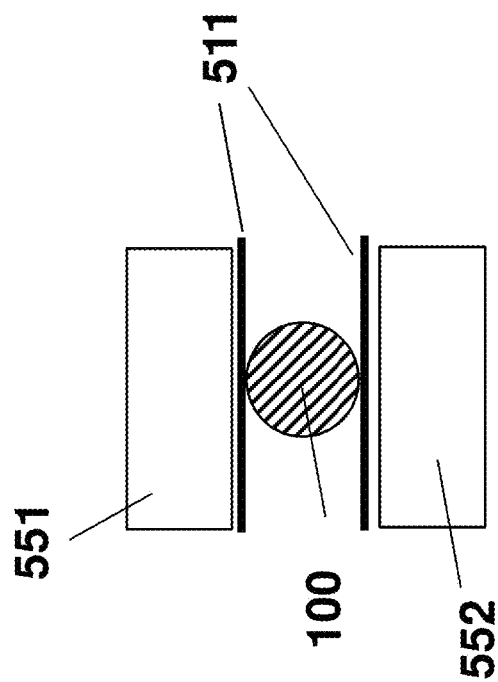
FIGS. 44a and 44b respectively schematically illustrate a profiled stripping blade compared to a straight stripping blade according to embodiments of the invention.
Figure 44A:
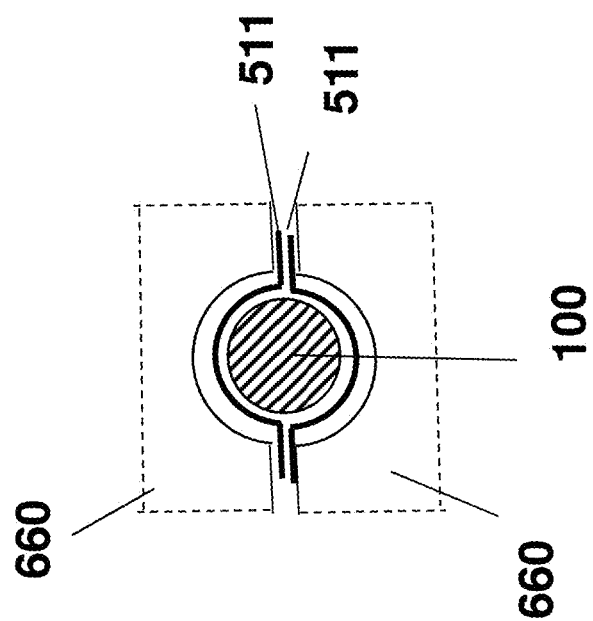

FIG. 44*a* and FIG. 44*b* schematically illustrate the advantage of using a profiled means for making an incision as compared to a straight means for making an incision. When using protective means, such as for instance a tape material 511, the profiled means for making an incision enables the protective means to cover a larger portion of the surface of the optical fiber 100. As a result, a larger portion of the coating of the optical fiber 100 is heated and weakened resulting in a more efficient heating of the coated optical fiber.

Instead of two heaters or two means for making an incision, more heaters or means for making an incision, or just a single heater or means for making an incision, may be provided. The guiding element or guiding elements is/are preferably adapted for guiding the protective means, for instance the tape, or tapes, to protect the heater(s) and optionally the means for making an incision from contacting the optical fiber. As discussed above, this prevents the heater(s) or means for making incision from being soiled by heated coating. The tape may thus have two functions: in evacuating the debris on the one hand, and protecting the heater(s) and optionally means for making an incision from contacting the optical fiber on the other hand.

Different orientations of a tape of optionally tapes are possible. The tapes 511, 512 may be guided in a direction perpendicular to the axis of the optical fiber 100, as shown in FIG. 45a. Alternatively, the tapes 511, 512 may be guided in a direction parallel to the axis of the optical fiber 100, as shown in FIG. 45b.

FIGS. 47a to 47e schematically show an embodiment of a stripping operation in a direction parallel to the axis of the optical fiber, and the subsequent debris evacuation. In FIG. 47a, optical fiber 100 is inserted, in the direction of arrow 556, between the heaters 551 and 552 that are protected by tapes 511 and 512 (or by a single folded tape). Preferably the optical fiber 100 is inserted in between the heaters 551 and 552 over a distance of 10 to 70 cm. A first incision is performed on the optical fiber 100 preferably in the coating but not as far as the cladding by the means for making an incision 604, for instance retractable knives with profiled blades or heated profiled blades, as shown in FIG. 47b. After making an incision, the means for making an incision 604 can be retracted. In other embodiments, the means for making an incision can be non-retractable, i.e. after making an incision the means for making an incision remain in contact with the optical fiber. As a result, in when non-retractable means for making an incision are used, the clamps and the means for making an incision 604 are translated in a relative movement; the means for making an incision in addition scrape the heated and weakened coating from optical fiber. The making of an incision can thus be obtained mechanically or by heating the blades at a temperature of e.g. 200° C. In embodiments where retractable means for making an incision are used, the retraction can be controlled by an actuating moving means (not shown), such as a motor. The heaters 551 and 552 are moved towards each other, in the direction of arrows 558, as shown in FIG. 47c, and the coating of the optical fiber is heated (FIG. 47c). The clamps are preferably heated at a temperature between 100 and 120° C. of e.g. 120° C. whereas the retractable knives are heating at a temperature of e.g. 200° C. Subsequently, the optical fiber is pulled out by suitable pulling means, in the direction of arrow 557. Before the translational movement, the cleaning means 540 are pivoted in a direction, as illustrated by arrows 641, 642, such that the cleaning means cover the stripped portion of the optical fiber along the axis while the optical fiber is pulled out the from the fixed clamps over a predefined distance as illustrated in FIG. 47d. The cleaning means 640 slightly put pressure on the stripped portion of the optical fiber and as a result of the translating movement of the stripping clamps the stripped portion of the optical fiber is cleaned. The stripped-off coating is left as debris 541 between the tapes (or tape) as illustrated in FIG. 47e. Instead of pulling the optical fiber out, the heaters 551, 552 may be moved in the direction opposite to the direction of arrow 557; only a relative movement is required. Then, heaters 551 and 552 are moved away from each other in the direction of arrows 559, and preferably the cleaning means are pivoted back in their original position (FIG. 47d), and finally the tapes 511 and 512 (or single folded tape) are moved in the direction of arrow 563, thus evacuating the debris 541.

The tape material preferably has high strength and good resistance to temperatures up to 220° C. Further it preferably has a low coefficient of friction with respect to glass, preventing high clamping forces on the fiber after the stripping operation. Tape of non-woven materials may be used, such as lens cleaning tissue. Especially in case of perpendicular tape transport, the tape may have a width of about 25 mm which is about the stripping length. The tape may also have markers which are used to wind the tape over the right distance and indicate the end of the tape. The tape may be carried in a cartridge that can be wider than the tape to accommodate debris protruding from the tape.

It is advantageous to provide a separate, replaceable unit with protective means, such as tape cartridge 70, for the stripping heaters. In this way, it is easy to provide new protective means when all protective means were used up, by simply exchanging the old unit for a new one, i.e. in the embodiment of FIG. 39 by replacing the cartridge 70. Moreover, the waste is thus removed. In a preferred embodiment, the tape cartridge is sufficient for more than 60 connector attachments.

Figure 38A:
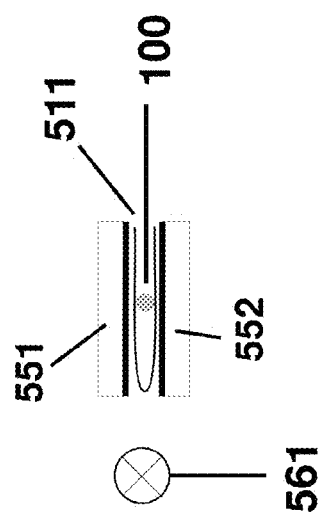
FIG. 38a-38b illustrates a one tape arrangement for use with a station where the optical fiber comprises or generates debris according to embodiments of the invention.

FIG. 38a illustrates a first tape arrangement for use with a debris forming station in accordance with an embodiment of the present invention. For example, one tape 511 can be used so that the debris is trapped between two portions of the one tape 511. The station is adapted to form a tape sandwich, whereby the sandwich is formed by two different longitudinal portions of one tape 511 that are folded over with the fold being transverse to the tape to form a sandwich, and the debris, is evacuated in the direction of arrow 561. To achieve this the tape is inserted between two clamps 551, 552 so that it folds over on itself longitudinally to thereby form a sandwich when the clamps are closed thus trapping debris.

Figure 38B:
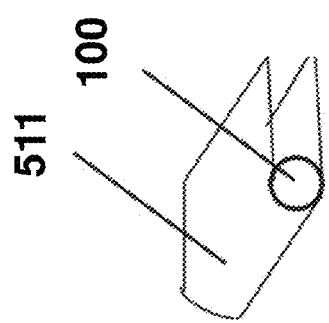

FIG. 38b illustrates a second tape arrangement for use with a debris forming station in accordance with an embodiment of the present invention. For example, one tape 511 can be used so that the debris is trapped between two portions of the one tape 511. The station is adapted to form a tape sandwich, whereby the sandwich is formed by two portions of one tape 511, as illustrated schematically in FIG. 38b, and the debris, is evacuated in the direction of arrow 561. To achieve this, the tape can be guided so that it folds over on itself with a fold along a longitudinal axis to thereby form a wrap around the fiber 100. By closing the open sides of the wrap, e.g. by closing the sides by rollers, the sandwich is formed thus trapping debris.

FIG. 39 schematically shows a device 540 for evacuating debris 541 from an optical fiber 100. In station 90, an operation is performed on an optical fiber 100 that generates debris 541. The debris is removed from the optical fiber 100 in station 90 and caught between a first tape 511 and a second tape 521. The first and the second tape form a sandwich 531 that is transported in the direction of arrow 536 and that evacuates the debris 541, i.e. is securely held such that the evacuated debris will not come into contact with the fiber again. In this embodiment, the device 90 includes a tape cartridge 70. The tape cartridge includes a first roller 514 with a supply of the first tape 511 and a second roller 524 with a supply of the second tape 521. Both tapes come together in the station 90, and after trapping the debris form tape sandwich 531 with the trapped debris 541, that is wound on take-up roller 534, and that thus evacuates the debris 541. In this embodiment, the first tape 511 is guided by guiding roller 513 and by a small roller (not shown) at an edge of heater 551 of station 90, and the second tape 521 is guided by guiding roller 523, while the sandwich 531 when completed is guided by guiding roller 533. The guiding rollers of the first and of the second tape are positioned such that the debris 541 is caught between the tapes 511, 521 in station 90. Guiding roller 513 is driven by a driving element 512, e.g. an electric motor, and guiding roller 23 is driven by driving element 522. Further, sandwich 531 is guided by guiding roller 33 and driven by driving element 532. The driving elements drive the guiding elements by any suitable method, e.g. the driving element may be concentric with the guiding element it drives.

Preferably, the driving elements 512, 522 and 532, which are in the embodiment of FIG. 39, do not form part of the tape cartridge 70, but are part of the device 540. The tape cartridge 70 is preferably just a consumable that comprises the first and the second tape. A tape cartridge 70 of which the tapes were used up can then easily be replaced by a new, full cartridge. Using such a tape cartridge is thus very convenient. In another embodiment, one or more driving elements for the tape may be part of the tape cartridge. It is preferred that the tape cartridge 70 comprises means for guiding the tapes. The path of the tapes, and the path of the sandwich, which is determined by the guiding means, is preferably such that the first 511 and the second 521 tape form a sandwich 531 immediately after the debris 541 is caught between the first and the second tape. In this way, the debris is safely evacuated, and cannot soil the device 540 or recontaminate the fiber 100. That the debris 541 is safely evacuated is especially advantageous when the device 540 is automated, or is integrated in an automated tool.

Preferably, the first and/or second tape 511 or 521 has sticky or adhesive zones for contacting the other tape 521 or 511. One or both tapes may be sticky or have adhesive capability (e.g. inherently or from a coating) over its entire surface facing the other tapes, or it may just comprise sticky or adhesive zones. Preferably, one tape has sticky or adhesive zones and the other tape has not. This helps in trapping the debris 541, and in forming the sandwich 531. In addition, when using a single tape and/or second tape in some embodiments of the invention, to protect the fiber when using a heater, a tape comprising no sticky or adhesive zones can be used. The heat produced by the heater preferably generates the sticky behavior of the tape which helps the trapping of the debris. In an alternative embodiment, the tape can comprise zones with adhesives, whereby said adhesives become sticky after heat activation, thus the heat activated tape remains usually tack-free until it is activated by a heat source.

In one embodiment of a device as shown in FIG. 39, station 90 is a stripping station 40 for removing at least one coating from the optical fiber. Station 40 comprises a first heater 551 and a second heater 552. Both heaters 551, 552 are used to heat the coating of the optical fiber 100 so that it can be removed more easily from the optical fiber. Tape 511 protects heater 551 from contacting the heated optical fiber 100, so that contamination of the heater 551 by residues of the heated coating is avoided. Tape 512 protects heater 552 from contacting the heated optical fiber 100, to avoid contamination of heater 552.

Another embodiment of the stripping operation is illustrated more in detail in FIGS. 40a and 40b. FIGS. 40a and 40b show a schematic side view of the stripping station 40 of FIG. 39. The optical fiber 100 is inserted into the device 540 in the direction of arrow 562, and the transport direction of the tapes 511 and 521 is perpendicular to the plane of the drawing. In FIG. 40a, the optical fiber 100 is shown inserted between the heaters 551 and 552. Tapes 511 and 521 protect the heaters 551 and 552 from contacting the optical fiber 100. Then, heaters 551 and 552 are moved towards each other so that they clamp optical fiber 100, and subsequently the heaters 551, 552 are moved in the direction of arrow 555, as shown in FIG. 40b. The end of optical fiber 100 is thus stripped of at least one coating, which remains as debris 541 between the first tape 511 and the second tape 512. Heaters 551 and 552 are moved away from each other, and then movement of the tapes 511, 512 evacuates the debris as discussed above, with reference to FIG. 39. Tapes 511 and 512 are driven over a certain distance and then the tape transport is stopped, so that new tape is available at station 40, for another stripping operation.

Instead of two heaters, more heaters, or just a single heater, may be provided. The guiding element or guiding elements is/are preferably adapted for guiding the tape, or tapes, to protect the heater, or heaters, from contacting the optical fiber. As discussed above, this prevents the heater(s) from being soiled by heated coating. The tape may thus have two functions: in evacuating the debris on the one hand, and protecting the heater(s) from contacting the optical fiber on the other hand.

If a separate tape cartridge 70 is used, device 540 is preferably adapted to receive such a tape cartridge 70. According to another aspect of the invention, the device 540 itself includes driving elements and/or guiding elements for the tapes. The guiding elements may then be adapted to trap the debris between the first and the second tape, thus forming a sandwich, as discussed above. No tape cartridge then needs to be provided; all driving and guiding elements are then provided in the device 540. Alternatively, some guiding elements for the tapes may be provided in a tape cartridge, and other guiding elements in the device. In general, guiding elements for the tapes may be provided in the device, or they may be provided in the tape cartridge, or some guiding elements may be provided in the device and others in the tape cartridge.

Driving the first and the second tape may be performed indirectly, e.g. by driving the sandwich. In such an embodiment the one tape or the first or second tape are driven by driving the finished sandwich.

In FIG. 39, station 40 is equipped to perform a stripping operation. The same station may also be equipped to perform any other process involved with preparing optical fibers. Hence, the same station may also be equipped to perform a cleaning operation on the optical fiber. Alternatively, another station may be provided in the device that performs a cleaning operation. An additional station may be provided that performs a cleaving operation. In subsequent steps, these stations may be positioned at the location of the optical fiber (or, in another embodiment, the optical fiber may subsequently be positioned at the locations of the stations) so that the tapes may be used for evacuating debris from different operations, e.g. from a stripping operation and/or a cleaning operation and/or a cleaving operation.

In one embodiment, a cleaning operation is performed to clean the stripped optical fiber from possibly remaining coating residues and/or processing fluids such as oils used during the production process of the fiber. The cleaning operation may be performed in the stripping unit: an additional amount of tape can be used to clean the fiber between the heaters 551, 552, e.g. by moving the heaters again along the fiber, as in the stripping process. This is dry cleaning. In case the tape is used for cleaning, the adhesive tape may contain zones, e.g. of 10 mm, that are non-adhesive; these zones may then be used for cleaning. In another embodiment, additionally a small amount of isopropyl alcohol is used; for each cleaning action, such an amount can be dispensed on the tape. This is called wet cleaning. In any embodiment including cleaning a tape sandwich may be used to trap any waste materials recovered from the cleaning operation.

FIG. 43 and FIGS. 44*a* and 44*b* illustrate embodiments wherein the tapes 511, 512 are guided in a direction perpendicular to the direction of the longitudinal axis of the optical fiber.

FIGS. 46*a* to 46*e* schematically show an embodiment of a stripping operation in a direction parallel to the axis of the optical fiber, and the subsequent debris evacuation. In FIG. 46*a*, optical fiber 100 is inserted, in the direction of arrow 556, between the heaters 551 and 552 that are protected by tapes 511 and 512 (or by a single folded tape). The heaters 551 and 552 are moved towards each other, in the direction of arrows 558, as shown in FIG. 46*b*, and the coating of the optical fiber is heated (FIG. 46*c*). Subsequently, the optical fiber is pulled out by suitable pulling means, in the direction of arrow 557 (FIGS. 46*c* and 46*d*), leaving the stripped-off coating as debris 541 between the tapes (or tape). Instead of pulling the optical fiber out, the heaters 551, 552 may be moved in the direction opposite to the direction of arrow 557; only a relative movement is required. Then, heaters 551 and 552 are moved away from each other, in the direction of arrows 559 (FIG. 46*d*), and finally the tapes 511 and 512 (or single folded tape) are moved in the direction of arrow 563, thus evacuating the debris 541.

Figure 48:
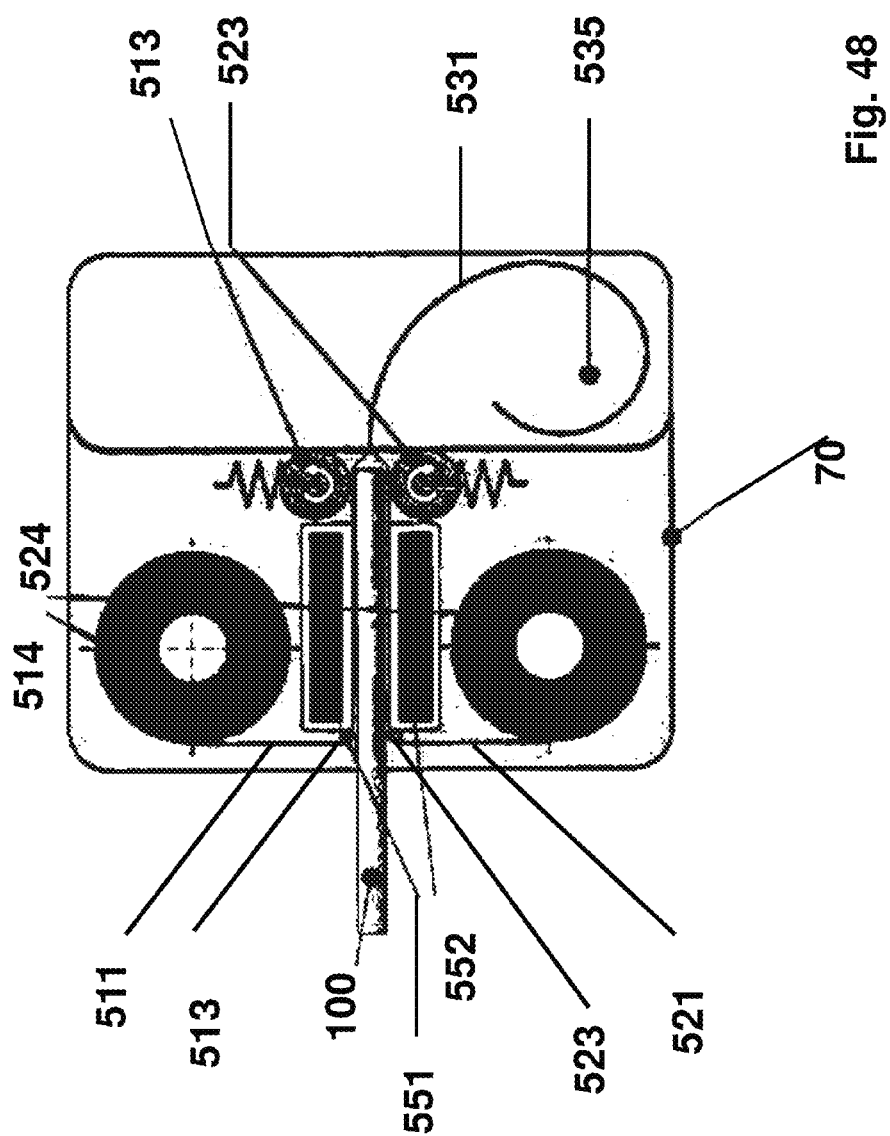
FIG. 48 shows an embodiment of a tape cartridge according to principles of the invention.

FIG. 48 schematically shows an embodiment of a tape cartridge 70 wherein the tapes 511, 512 (or tape (not shown)) are guided in a direction parallel to the axis of the optical fiber 100. The first tape is supplied on a first tape roller 514, and the second tape 521 is supplied on a second tape roller 524. Tape 511 is guided by a small guide roller 513 along the first heater 551 and then by driven guide roller 513, while tape 512 is guided by small guide roller 523 along second heater 552 and by driven guide roller 523. Heaters 551 and 552 preferably do not form part of the tape cartridge, but are part of the device wherein the tape cartridge 70 is inserted (inserting the tape cartridge 70 into the device may e.g. be done in the direction perpendicular to the plane of the drawing). The coating is now stripped as discussed with reference to FIGS. 46*a* to 46*e*, and sandwich 531 is evacuated by pushing it (by the driven guide rollers) into compartment 535, that is preferably designed so as to allow efficient stacking of the evacuated sandwich 531. In another embodiment, there is no evacuation compartment 535, but sandwich 531 is evacuated through an evacuation opening in the tape cartridge, and cut into strips having e.g. a length of 10 cm, so that these strips fall on the ground when the device is operated. Afterwards, the operator of the device collects the strips as waste.

In all embodiments described above, the first and the second tape can also be identical. The single tape may be guided around the optical fiber so that it forms a wrap, like illustrated in FIG. 38*b*, and that the debris is caught between two portions of the single tape facing each other and forming a sandwich. The single tape which is guided around the optical fiber then can be used as protective means when use a heater.

FIGS. 49*a*, 49*b* and 49*c* illustrate a first tape arrangement for use with a station where the optical fiber comprises or generates debris, e.g. with or after a debris forming station in accordance with an embodiment of the present invention. For example, one tape 511 can be used so that the optical fiber is inserted between two folded portions of the one tape 511. The station is adapted to form a tape sandwich, whereby the sandwich is formed by folding two portions of one tape 511 around the tape's longitudinal axis. To achieve this, the tape resides between two clamps 551, 552 so that it folds over on itself longitudinally to thereby form a sandwich. The folding is initiated just as the tape enters between the two clamps, at the same position where the fiber is being engaged and drawn into the tape sandwich and between the two pads. Preferably, the optical fiber is guided in a direction 561 by a drawing motion, between the tape, in a form of a tape sandwich, whereby the drawing motion is provided by a difference between the movement velocity of the tape and an insertion velocity of the fiber. The movement speed of the tape is higher than the insertion speed of the fiber which typically is between 5 to 20 mm/s more specifically 10 mm/s. In preferred embodiments the movement speed of the tape is 5-10% higher than the insertion speed of the optical fiber. As a result of the difference in velocity the optical fiber is drawn in the center of tape, i.e. the fiber is aligned such that eccentricity is prevented of the optical fiber with respect to both horizontal and vertical axis.

In all embodiments described above, the first and the second tape can also be identical. The single tape may be guided around the optical fiber which is inserted such that it forms a wrap, like illustrated in FIG. 49*b*, and that the debris is caught between two portions of the single tape facing each other and forming a sandwich. The single tape which is guided around the optical fiber then can be used a protective means as protective means when use a heater. In embodiments of the portable device, the revolver head is rotated to bring, e.g. under control of a control unit and software, a next station to the optical fiber, for performing a next operation on the optical fiber.

In one embodiment, the next operation can be a cleaning operation to clean the stripped optical fiber from possibly remaining coating residues or processing fluids such as oils used during the production process of the fiber. In some embodiments of the invention, the cleaning operation can be performed in the stripping unit: an additional amount of tape can be used to clean the fiber between the heated stripping clamps, e.g. by moving the heated clamps again along the fiber, as in the stripping process. This is dry cleaning. In case the tape is used for cleaning, the adhesive tape may contain zones, e.g. of 10 mm, that are non-adhesive; these zones may then be used for cleaning. In another embodiment, additionally a small amount of isopropyl alcohol is used; for each cleaning action, such an amount can be dispensed on the tape (wet cleaning).

Subsequently, a tensile test may be performed. The object of the tensile test is to check that the fiber can withstand a specific force. If e.g. the fiber surface was damaged, the pulling force will cause a stress concentration at the location of the damage, and the fiber will break. In a particular embodiment, pre-tensioning of the fiber at the tensile test and cleaving is performed in the same station; by the same actuator and using the same clamp (preferably a flat clamp).

In one embodiment, the tensile force for the tensile test is about 5 N, while the tensile force during cleaving is in the range from 1.2 to 1.5 N. Further, in one embodiment the cleaving angle is 8° (this is the angle between the cleaving plane and a plane perpendicular to the optical fiber axis). The fiber may be cleaved at a length of 21 mm, so that 21 mm of bare fiber (fiber without coating, only the core and the cladding) remains.

The cleaving principle may be the same as in the RCAT-tool, mentioned above.

Another operation in another station may be a heat treatment, such as an arc treatment, performed on an end face of the bare end of the optical fiber. This is illustrated in FIG. 53. After stripping the optical fiber 100, a bare end 104 of the optical fiber (without any coating, only the core and the cladding) remains. In heat treatment station 50, the end face 105 of the bare end of the optical fiber is subjected to a heat treatment, e.g. an arc treatment. An advantage of such a heat treatment is that for connectors with an optical fiber treated this way a large number of connections and disconnections is possible without significant deterioration of the quality of the optical connection, when compared to non-heat treated fiber connectors. Another advantage of the heat treatment is that the connection has low insertion losses.

In FIG. 53 the end face 105 of a cleaved bare end 104 of an optical fiber 100 is shown when inserted in an electric arc device 50, between the cathode 51 and the anode 52. In a preferred embodiment, the anode and the cathode have a separation distance in the range from 1.5 mm to 4 mm, for optimal arc stability. After the fiber end is inserted in the electric arc device, an arc 53 is generated of sufficient temperature to essentially melt or soften the fiber end slightly. Typically, the temperature of such an electric arc is in the range from 1200 to 1800° C. In an embodiment, the electric arc duration is in the range from 120 ms to 280 ms, preferably in the range from 150 ms to 250 ms. Other settings for the electric arc may be a voltage of typically 6 kV, and a current e.g. in the range from 0.35 to 0.45 A rms with a frequency of 125 kHz.

Instead of an electric arc, another type of low power heat treatment can be applied to the end face 105 of the bare end of the optical fiber. The heat treatment can also be laser heating as a result of laser irradiation or another heat treatment as known in the art. Power consumption is preferably low enough, i.e. comparable to that of an electric arc, so that the heat treatment can be incorporated in the portable tool. The irradiation can be applied under different angles and positions as well, for instance frontally illuminating the fiber end face or illuminating the fiber end from the side. The laser can be operated in pulsed mode or in continuous mode; a laser can be classified as operating in either continuous or pulsed mode depending on whether the power output is essentially continuous over time or whether its output takes the form of pulses of light on an appropriate time scale.

In FIG. 53 the end face 105 of a cleaved bare end 104 of an optical fiber 100 is shown when inserted in an electric arc device 50, between the cathode 51 and the anode 52. In one embodiment, the anode and the cathode have a separation distance in the range from 1.5 mm to 4 mm, for optimal arc stability. The separation distance may be 2 mm. After the fiber end is inserted in the electric arc device, an arc 53 is generated of sufficient temperature to essentially melt or soften the fiber end slightly. Typically, the temperature of such an electric arc is in the range from 1200 to 1800° C. Preferably, both the core and the cladding are brought at least to the softening point, which is normally above 1500° C. In an embodiment, the electric arc duration is in the range from 120 ms to 280 ms, preferably in the range from 150 ms to 250 ms. Other settings for the electric arc may be a voltage of typically 6 kV, and a current e.g. in the range from 0.35 to 0.45 A rms with a frequency of 125 kHz. Instead of applying a single arc discharge, a plurality of consecutive arc discharges may be applied; this is interpreted in this document as being equivalent of a single arc discharge having a total duration equal to the sum of the durations of the individual consecutive arc discharges.

The bare optical fiber end 104 may be cleaved perpendicularly. In a preferred embodiment, the fiber end 104 is cleaved by an angled cleaving. In one embodiment, the angle is in the range from 5° to 50°. In another embodiment, the angle is in the range from 5° to 15°, and preferably in the range from 6° to 10°, e.g. at 8°.

Figure 54B:
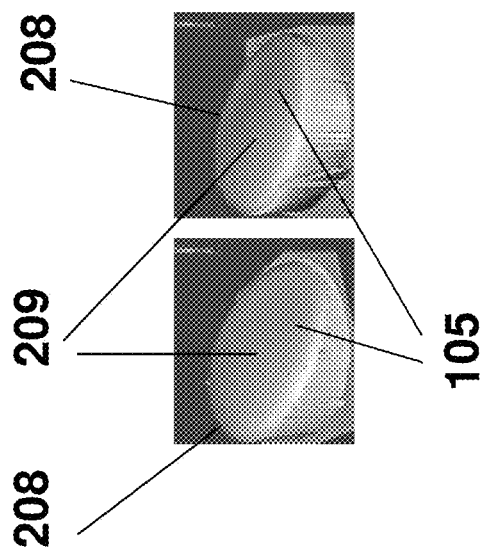
FIG. 54b is a picture of optical fiber ends after applying an electric arc treatment according to an embodiment of the invention.
Figure 54A:
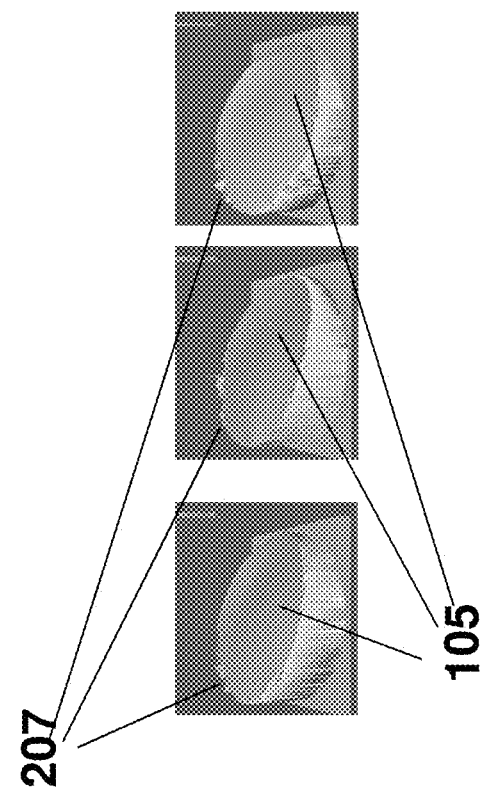
FIG. 54a is a picture of mechanically cleaved optical fiber ends, before applying an electric arc treatment.

FIG. 54a qualitatively shows end faces 105 of mechanically cleaved optical fiber ends before applying a heat treatment. The edges 207 of the end faces 105 are sharp. These sharp edges can damage the alignment structure, such as a V-groove, wherein the cleaved optical fiber is inserted. On the other hand, it is noted that a ferrule offers protection to the fiber from mechanical forces to which it may be subjected; without a ferrule, the forces acting directly on the fiber can be very high. In this case, the fiber is not protected by a ferrule, and the forces acting on the sharp edges 207 may be very high and may damage the fiber.

FIG. 54b shows optical fiber end faces 105 after the application of an electric arc treatment according to an embodiment of the invention. The edges 208 of the end faces are now rounded by the heat treatment. When inserting the fiber with rounded edges in an alignment structure, damage to the alignment structure is avoided, and the forces acting on the fiber are much smaller. Besides the rounding of the edges 208, in some embodiments a raising of the central zone 209 of the end face around the axis of the optical fiber may be noted.

Of course the method of the invention, which includes heat treatment of an end face of an optical fiber, is not limited to single fiber connectors. The invention also includes optical multi-fiber connectors having a plurality of optical fibers, that may e.g. be arranged in an array, e.g. in one dimension (linear arrangement) or in two dimensions. An example of a multi-fiber connector is an MPO connector; an MPO connector may have e.g. twelve optical fibers.

Embodiments of the present invention further include an optical fiber connector combination of two such optical fiber connectors (single fiber or multi-fiber) and an adapter for connecting them.

Embodiments of the present invention also include an optical fiber connector combination of two such optical fiber connectors, wherein the first optical fiber connector is a male connector and the second one is a female connector.

Figure 55:
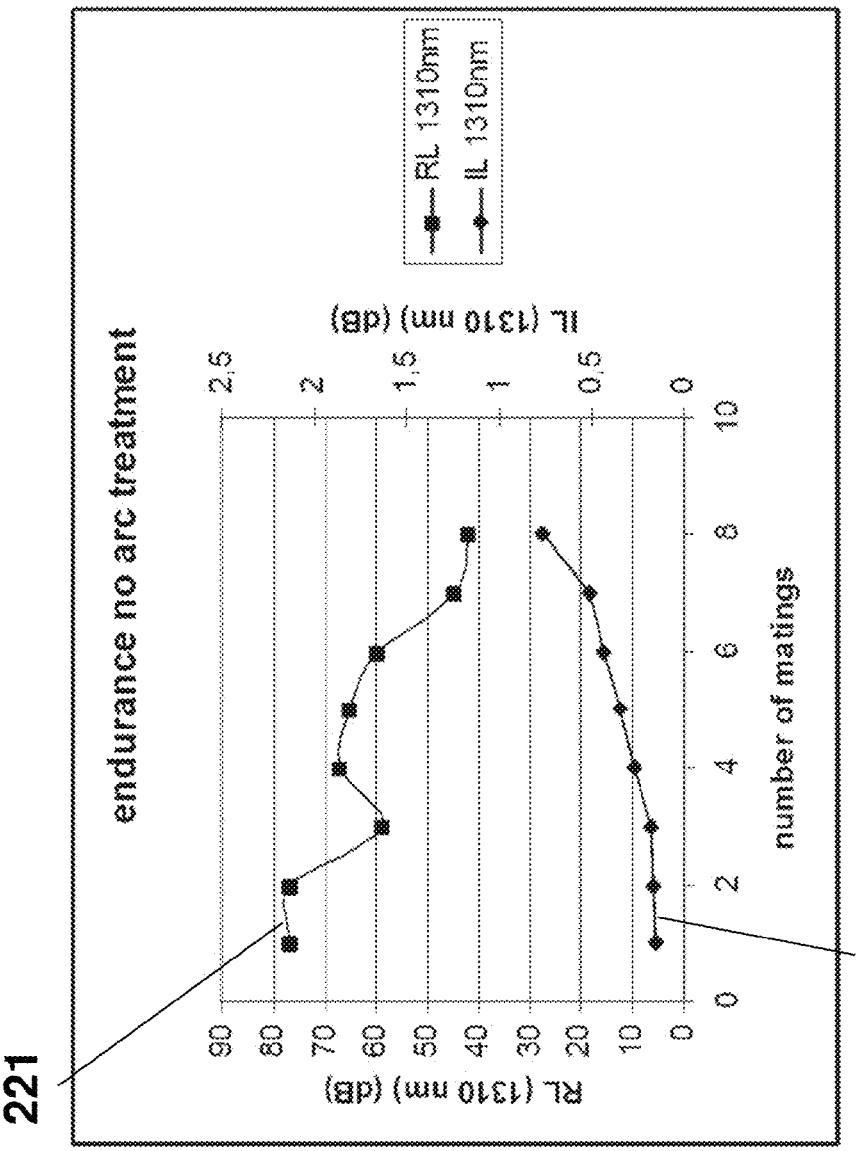
FIG. 55 is a graph illustrating the number of times two untreated optical fibers can be connected and disconnected before failure.
Figure 56:
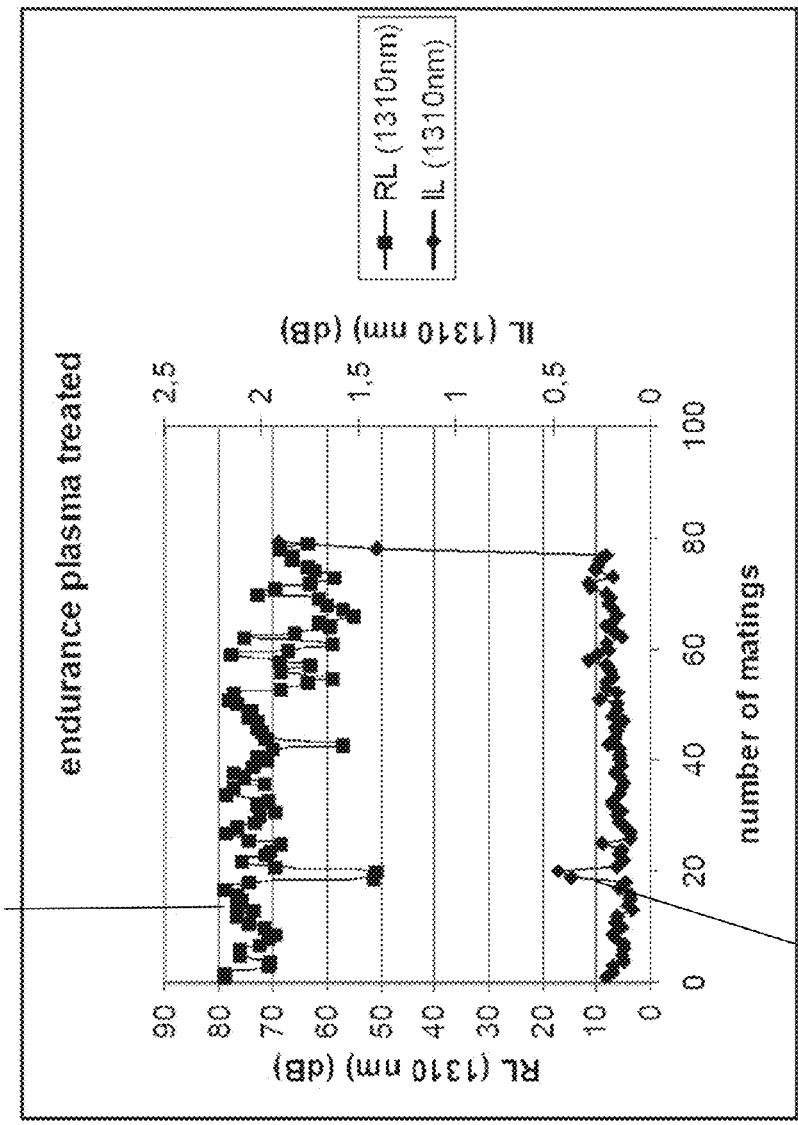
FIG. 56 is a graph illustrating the number of times electric arc treated optical fibers according to a preferred embodiment of the invention can be connected and disconnected before failure.

After applying a specific electric arc end treatment to a bare optical fiber, its connecting/disconnecting characteristics improve drastically when compared to untreated bare optical fiber ends, as is illustrated in FIGS. 55 and 56 for respectively untreated and treated fibers. In FIGS. 55 and 56, curves 221 show the return loss (RL) and curves 222 show the insertion loss (IL) of an optical fiber connection as a function of the number of consecutive connections/disconnections, or matings/dematings. The data in FIG. 55 were obtained in the following endurance test. Two bare optical fibers were mechanically cleaved. The optical fibers were single mode fibers and had a core diameter of 9 µm and a cladding diameter of 125 µm. Unless noted otherwise, such single mode fibers were used for the tests and measurements discussed below. For the mechanical cleaving, an RCAT device (RECORDsplice Cleaver and Assembly Tool), as disclosed above, was used. The optical fibers were cleaved at an angle of 8°. The fibers were then installed and aligned in a RECORDsplice (as also discussed above). The first fiber was kept fixed, protruding with its end face halfway in the V-groove of the RECORDsplice, and the V-groove was filled with an index matching gel. The second fiber was reinstalled over and over again, against the first fiber, i.e. connected and disconnected. During the process, optical performance of the connection was measured. As optical transmission signal, infrared having a wavelength of 1310 nm was used. This endurance test was done for several sets of two optical fibers. The results for one set are shown in FIG. 55. After several connections, as shown by curve 222 in FIG. 55, IL increased above 0.5 dB while RL, see curve 221, decreased to around 40 dB, indicating a failure in connectivity. Typically, for untreated fibers IL increases above 0.5 dB and RL decreases below 40 dB. After failure, a visual inspection of the fiber was performed using an optical microscope, and damage of the end face was observed. The experiment was repeated for sets of two fibers that were heat treated, by means of an arc discharge, in accordance with the invention, after the cleaving operation. With treated fibers, the mating/demating could be repeated tens of times, e.g. fifty times and more, even more than seventy times as shown in FIG. 56, without significant influence on the quality of the optical fiber connection.

In another test, the fracture strength of an untreated fiber was compared to that of a heat treated fiber in accordance with the invention. Samples were prepared and the fibers were mated to a sapphire optical flat, while the compression force was monitored. Samples that were cleaved and untreated had a failure load of generally less than 1N, while samples that were heat treated in accordance with the invention supported loads of 10N without damage.

To assess the failure mode of the optical fibers after the endurance tests described in connection to FIGS. 55 and 56, the end face damages were investigated using Scanning Electron Miscroscope (SEM). Two batches of 15 samples each were prepared. The first batch comprised untreated optical fibers that had failed at the endurance test, whereas the second batch comprised fibers that had been heat treated for 220 ms. Before the SEM observations, the samples were coated with a 40 nm gold cover in order to avoid charging processes during the measurements. Air spray and ethanol wiping were used to clean the fibers prior to metallization. No dust or contaminants were observed on the coated fibers.

Figure 57:
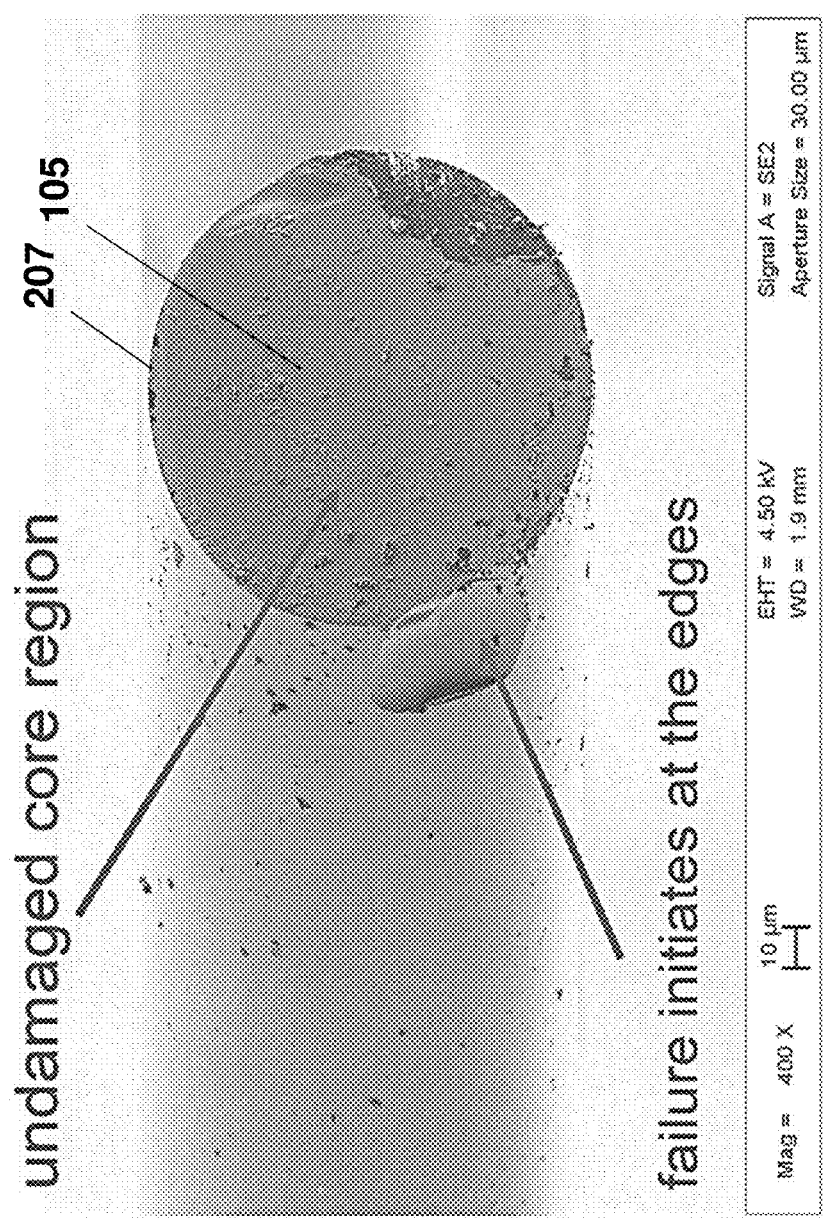
FIGS. 57 and 58 show SEM images of untreated optical fibers.
Figure 58:
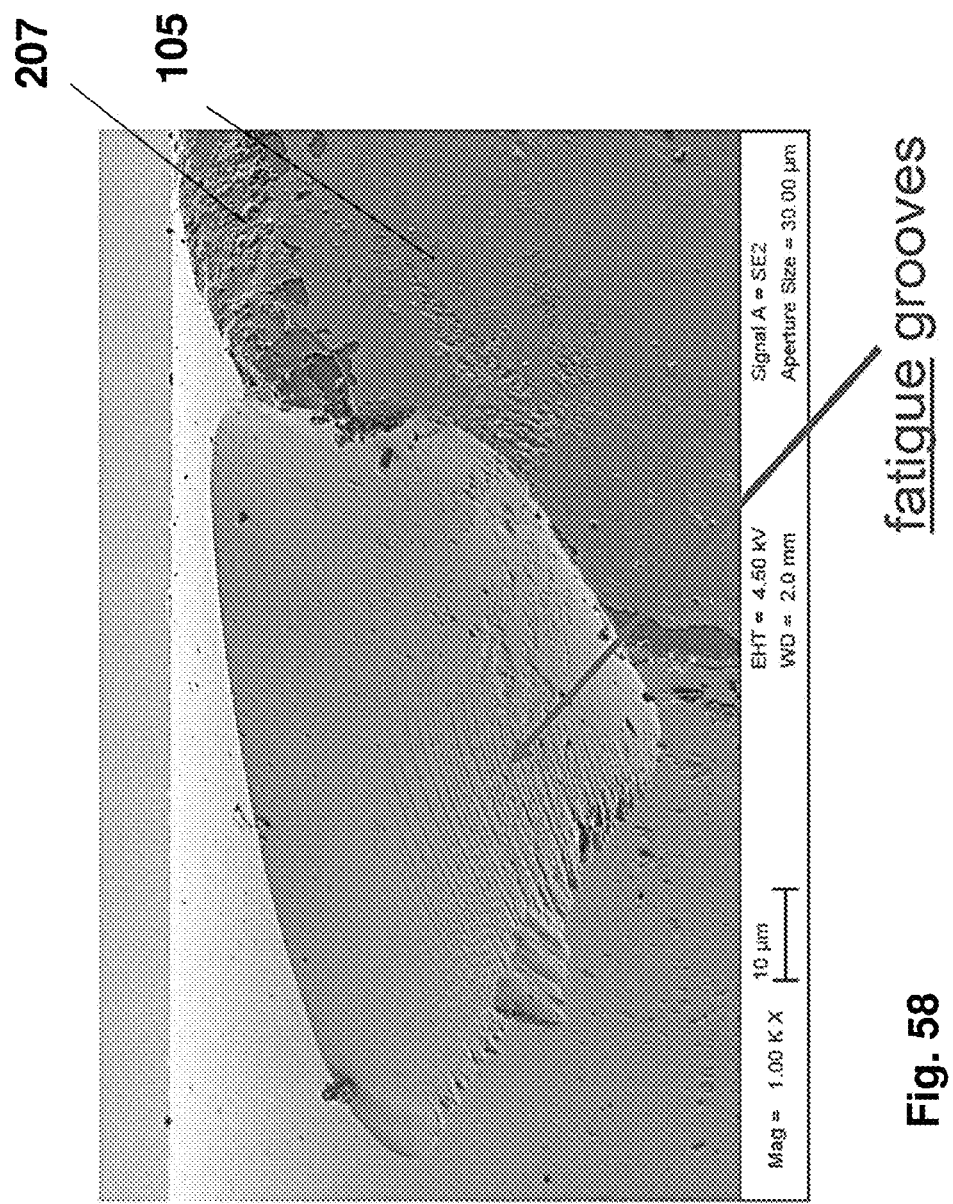

FIGS. 57 and 58 show SEM images of damaged, untreated optical fibers. The core region of the end face 10 is undamaged, while failure initiates at the cleaved edge 207. Failure in untreated fibers initiates at the edge 207 of the end face 105, where a portion of the cladding is chipped off. As is shown in FIG. 57, the damaged area has sharp edges, indicating fast propagation of micro-cracks. On the other hand, the central region of the end face 105 containing the core appears undamaged. Further investigation of the cracks reveals the presence of fatigue grooves under the torn portion at the edge 207 of the end face 105, as shown in FIG. 58. Moreover, cleaving planes are visible on the damaged glass. All these features are typical of a brittle failure mode induced by the presence of shear stress in the cladding of the optical fiber.

When optical fibers are manufactured, they are drawn nowadays at speeds around 1 km/min and cooled from over 2000° C. to room temperature in about one second. This allows for high yield production. However, a fast drawing process results in residual tensile stresses of the order of 10 MPa being frozen in the fiber. Typically, the residual stresses in the core and the residual stresses in the cladding have opposite signs: tensile stresses in the cladding and compressive stresses in the core.

It has been found that the brittle fracture mode of the untreated optical fibers is caused by the presence of these frozen-in stresses.

Figure 60:
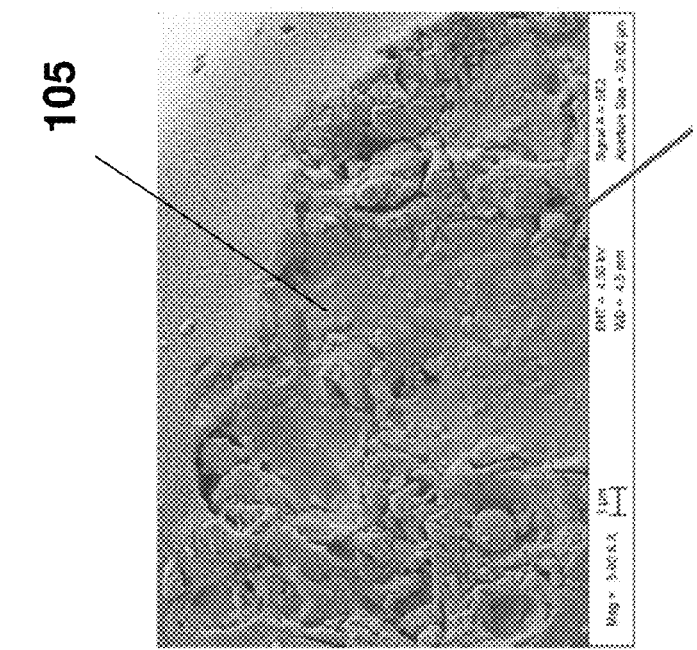
FIGS. 59 and 60 show SEM images of heat treated optical fibers.
Figure 59:
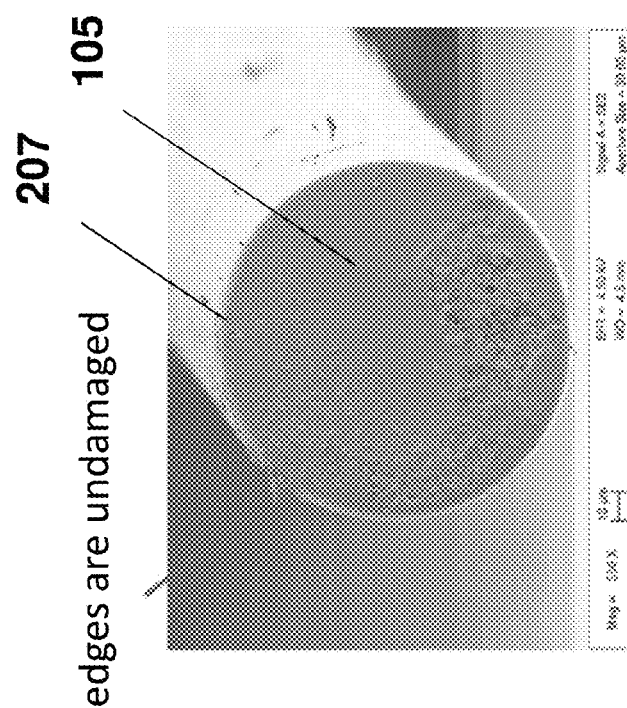

FIGS. 59 and 60 show SEM images of heat treated optical fibers after the connectivity test. Rupture appears to initiate in the internal part of the end face 105, whereas the edges 207 of the end face 105 are undamaged. No evidence of cleaving planes or micro-grooves was observed in the treated fibers, leading to the conclusion that the failure mode in treated fibers is not brittle.

From the SEM measurements we conclude that there are two independent effects of the heat treatment of the fiber's end face 105. On the one hand, the heat treatment, such as an arc discharge, acts on the edges 207 of the end face 105 by removing failure initiators. On the other hand, the treatment affects the glass itself by making it more resistant to fatigue.

In order to rule out possible structural changes in the glass by the heat treatment, micro-Raman spectroscopy was performed. No difference was observed between treated and untreated fibers.

We therefore conclude that the improved endurance of the fiber can be explained by the effect of removing failure initiators on the one hand and substantially decreasing frozen-in viscoelastic stress in the fiber by the heat treatment in accordance with the invention on the other hand.

Figure 61A:
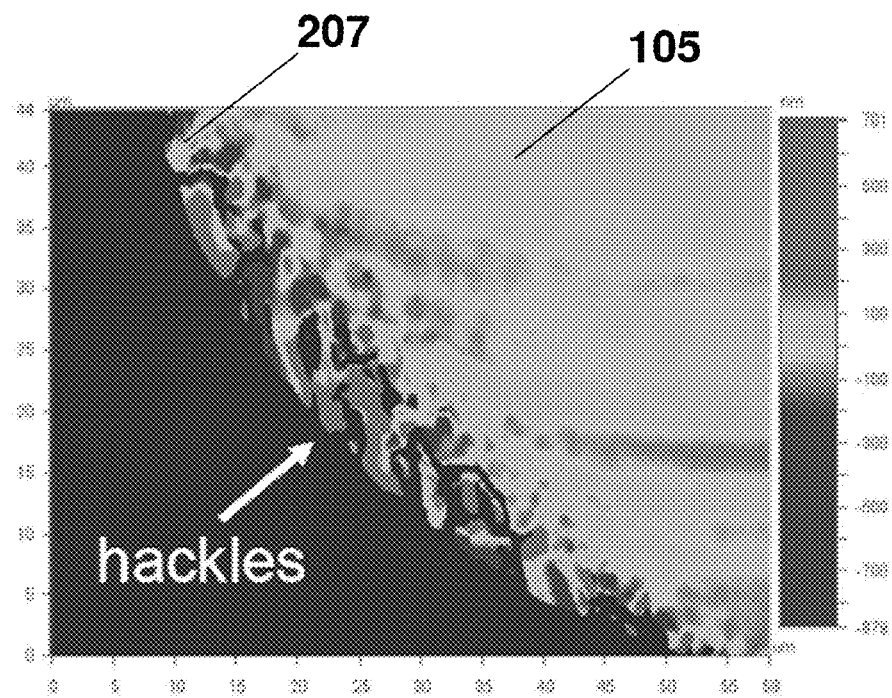
FIG. 61a shows interferometric measurements of the end face of an untreated fiber.
Figure 61B:
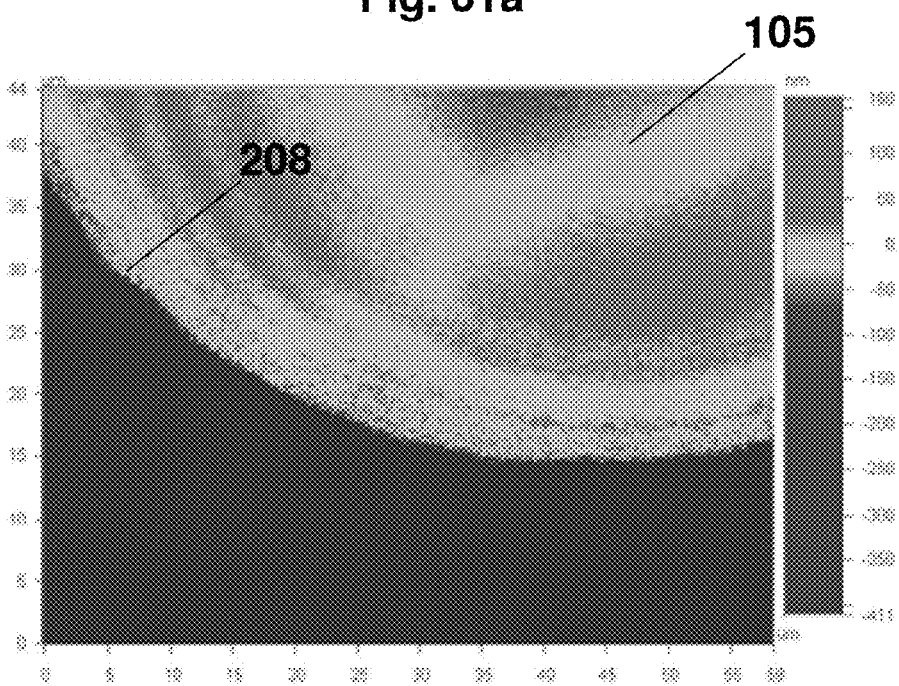
FIG. 61b shows interferometric measurements of the end face of a treated fiber.

The removal of failure initiators by the heat treatment were further investigated by interferometric measurements of the end faces of untreated and treated fibers, on which no endurance test was performed. A white-light Mirau interferometer was used, coupled to high resolution microscope objectives. Two microscope objectives were used: a 20× objective allowing for a spatial resolution of 318 nm/pixel and a 100× objective allowing for a resolution of 75 nm/pixel. In both cases the vertical resolution was 3 nm. A second set of measurements was performed using a Michelson interferometer coupled to a microscope allowing for a spatial resolution of 378 nm/pixel. Interferometric measurements are non-destructive, therefore allowing for the end face's assessment before and after the heat treatment. Both angled (8°) and flat (0°) cleaves were measured. Typical results are shown in FIGS. 61a and 61b.

On an untreated cleaved fiber we observed that, although the central region of the fiber is very smooth—leading to good optical performance—the edges of the end face are highly irregular. FIG. 61a shows details of an untreated cleaved fiber. Hackles are apparent at the cleaved edge 207 of the end face 105. These hackles can act as a crack-initiator, limiting the endurance of the fiber. The same fiber was heat treated with an arc discharge for 220 ms. The detail of the treated surface is shown in FIG. 61b. The arc discharge was performed between two tungsten electrodes that were 2 mm apart. The fiber end was positioned symmetrically between the two electrodes, i.e. at a distance of 1 mm from each electrode. The current was I=0.42 A rms, at a frequency of 125 kHz (the current was measured using a current transformer). As shown in FIG. 61b, after electric arc treatment, the fiber's end face 10 appears smoother as hackles and other defects are annealed. Edge 208 of end face 105 is now rounded. The resolution of the images in FIGS. 61a and 61b is 75 nm/pixel. The vertical resolution is 3 nm. The surface roughness in the hackle zone decreased from Rq=56.9 nm in FIG. 61a to Rq=21.5 nm in FIG. 61b, after the treatment. The surface roughness of the whole outside surface was assessed, and the treatment led to an improvement in roughness from Rq=246 nm for untreated fibers to 210 nm after the treatment.

Figure 62:
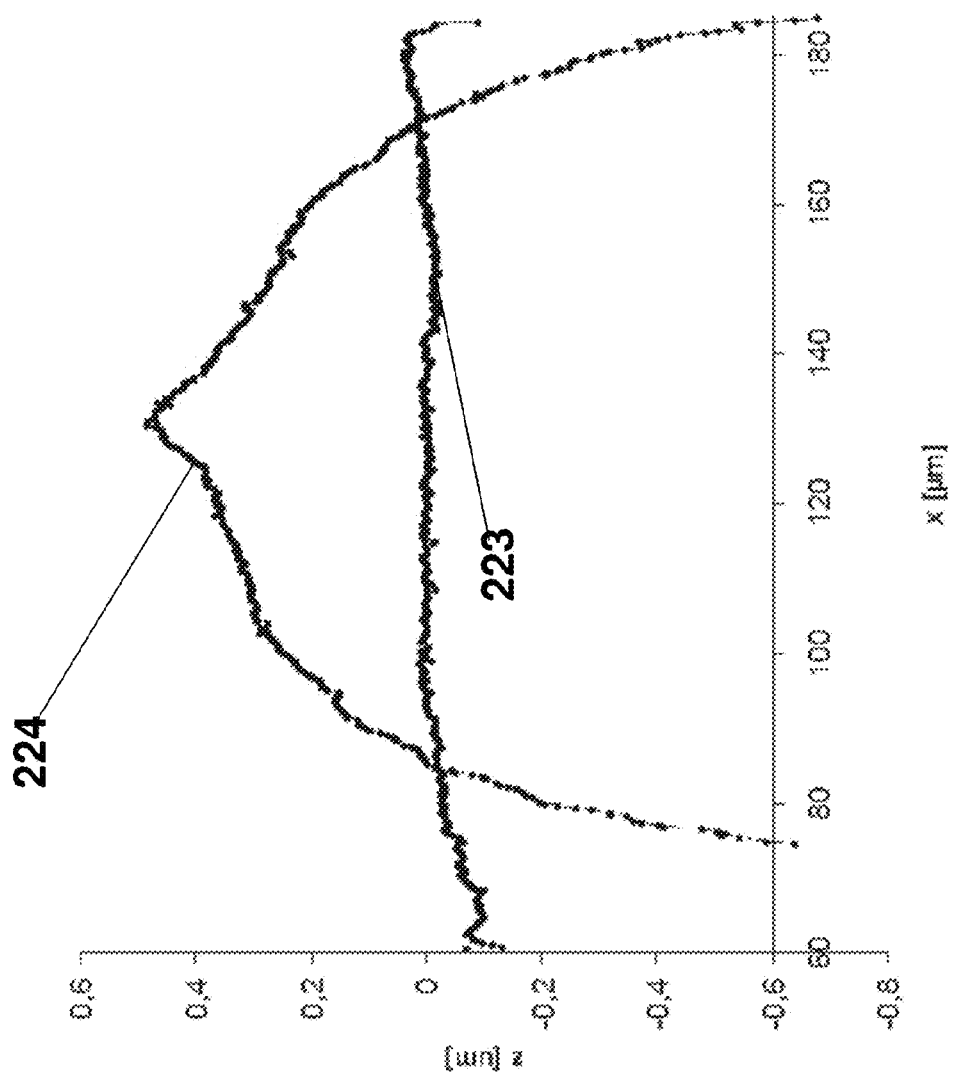
FIG. 62 shows a cross section of an untreated and of a treated optical fiber.

The treatment affects the global shape of the end face. FIG. 62 shows a cross section 223 of an untreated, 0° cleaved fiber and the cross section 224 of the same fiber after electric arc treatment. The cross sections were obtained by the same interferometric measurements as discussed above in connection with FIGS. 61a and 61b. The treatment clearly modifies the shape of the end face by introducing a curvature. The curved surface is caused by relaxation, because of the heat treatment, of the stress frozen in during the drawing process.

Figure 63A:
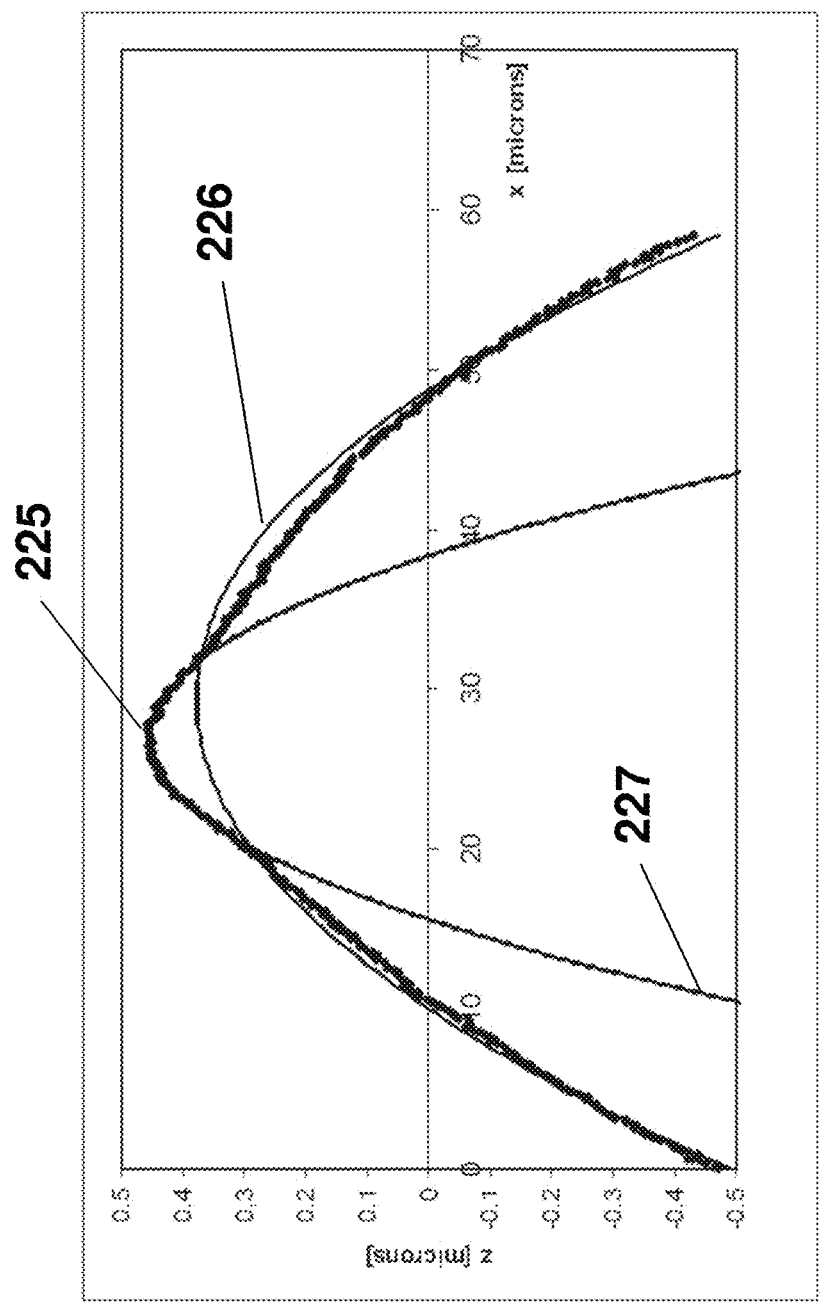
FIG. 63a shows a cross section of a treated optical fiber.

Using a 100× magnification objective, we investigated the central area of the cleaved end faces. A typical cross section of a Corning SMF-28 fiber, arc treated for 220 ms (at I=0.42 A) is shown in FIG. 11a. From the measurement data 225 it is clear that the cladding and the core have a different curvature. To determine the curvature of the cladding and the curvature of the core, we found that a quadratic fit gives very good results, as shown in FIG. 63a. Curve 226 represents the quadratic fit of the cladding and curve 227 is the quadratic fit of the core. In this document, the curvature of the cladding and the curvature of the core are defined as the values determined from a quadratic fit, and the radiuses are the reciprocal of these curvatures. For the treated fiber in FIG. 63a, this yields a curvature of the cladding of 0.6 mm$^{-1}$ (and a corresponding radius of 1.67 mm), and a curvature of 2.55 mm$^{-1}$ of the core. Further, we note that the core slightly protrudes from the cladding; the protrusion is about 60 nm.

Figure 63B:
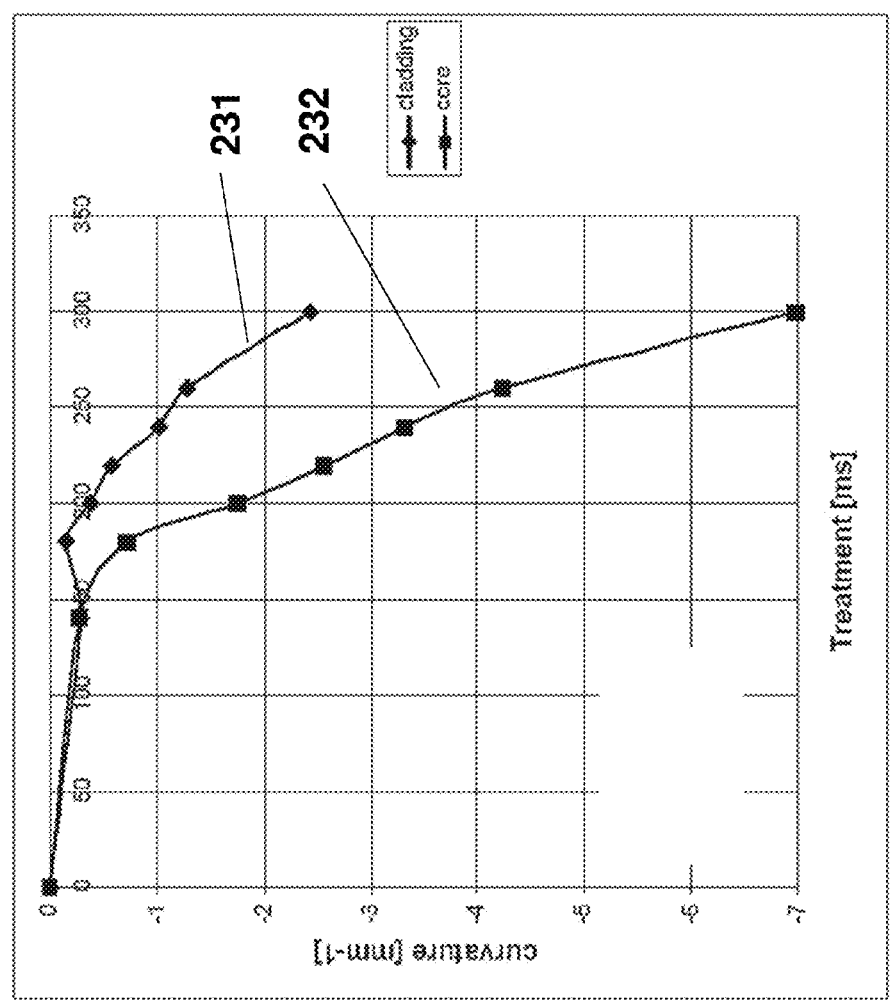
FIG. 63b shows the curvature of the cladding and of the core as a function of arc treatment duration for a treated optical fiber.

The dependence of the curvatures of the core and of the cladding has been investigated as a function of the duration of the treatment (at constant arc current I=0.42 A rms at a frequency of 125 kHz). FIG. 63b shows the curvature 231 of the cladding and the curvature 232 of the core as a function of the duration of the arc treatment. We observe a threshold-like behavior of the curvature as the duration of the treatment is increased. Samples that are treated for less than about 150 ms do not show curvature. This means that not enough energy was input into the fiber to initiate the effect. Since only the treatment duration was varied, the energy input into the fiber is proportional to the duration of the treatment. There is a threshold value of the amount of energy, input by the heat treatment, below which the fiber does not become viscous enough. As soon as the amount of energy is high enough, the fiber end becomes viscous and relaxation occurs of the stress frozen in during the fiber drawing process; this stress relaxation results in curvature of the end face. From FIG. 63b it can be seen that the cladding curvature 231 and also the core curvature 232 are representative for the duration of the treatment, and hence for the amount of energy transferred to the fiber. FIG. 63b shows that above 150 ms, the cladding curvature 231 and the core curvature 232 increase nearly linearly with increasing treatment duration. For all treatment durations, the core curvature is consistently larger than the curvature of the cladding (remark: the minus sign for the curvature values in FIG. 63b is of no importance; it is simply a matter of convex/concave curvature in this particular case).

Figure 63C:
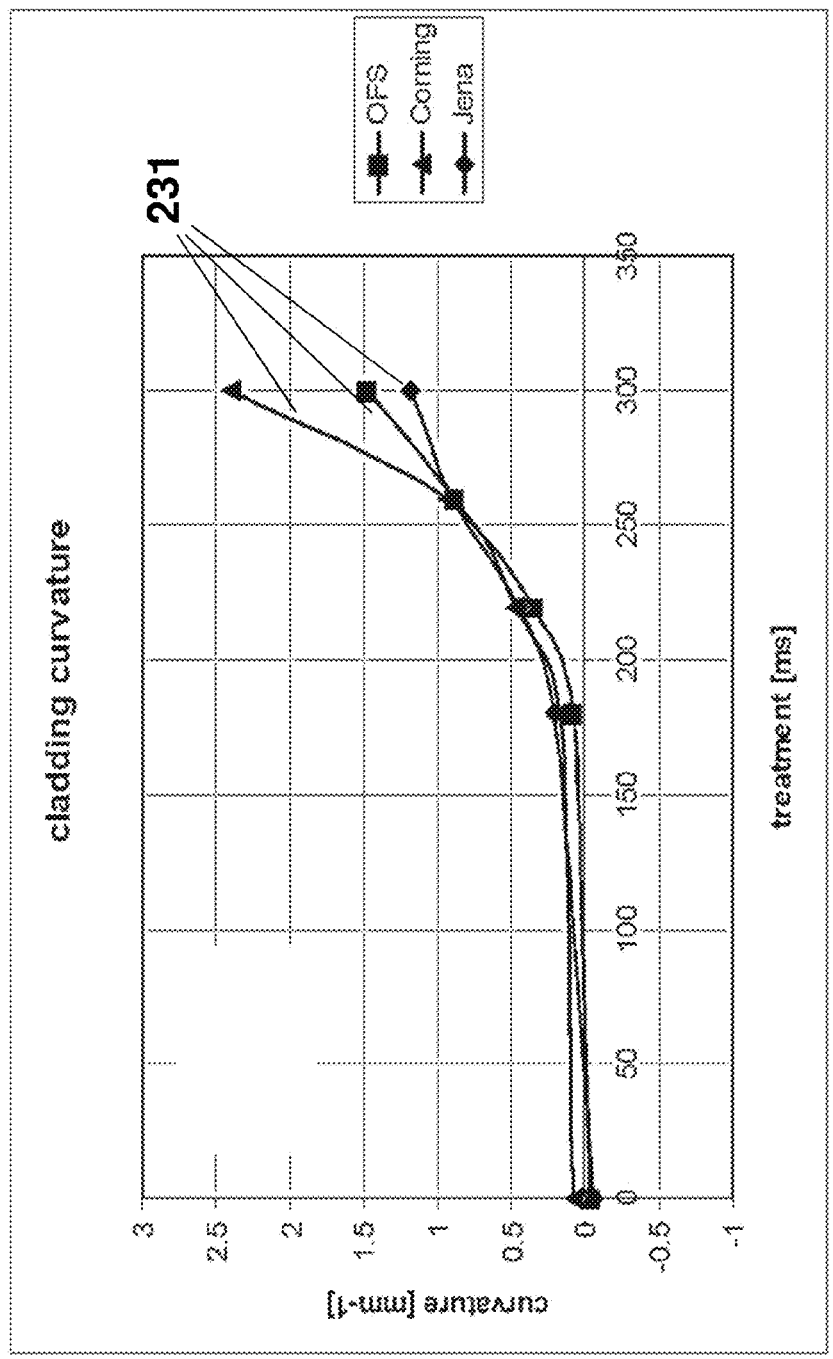
FIG. 63c shows the cladding curvature as a function of arc treatment duration for fibers from different suppliers.

In order to assess the effect of the treatment on optical fibers from different manufacturers, we performed the treatment on fibers from Corning, Jena and OFS which are well established suppliers of optical fibers for the telecom market. FIG. 63c shows the measured curvature 231 of the cladding of these fibers as a function of the duration of the treatment. The measurement results reveal that the effect of the treatment is consistent among manufacturers.

In a similar way to the curvature, the protrusion of the optical fiber core exhibits a threshold-like behavior. For treatment durations below 180 ms, core protrusion is not observed, whereas it increases linearly up to about 100 nm for fibers treated at 260 ms. We conclude that the protrusion is a result of the relaxation of the viscoelastic compressive stress frozen in the core. As measured in "Residual stress profiles in optical fibers determined by the two-waveplate-compensator method," Opt. Commun. Vol. 265, pp. 29-32, 2006, C. C. Montarou, T. K. Gaylord, and A. I. Dachevski, a compressive stress of approximately 10 MPa is present in the core after the drawing process. We have found that a length of approximately L=0.5 mm of the fiber's core is heated above the stress annealing point in the heat treatment. The protrusion can therefore be quantified as:

$$\Delta L = L^* \text{stress}/E = 68 \text{ nm}$$

wherein "stress"=10 MPa and with E=73 GPa the modulus of elasticity of $SiO_2$. This value of the protrusion is consistent with our interferometric measurements, thus confirming that stress relaxation is the cause of the protrusion. The increase of the protrusion with the duration of the treatment is explained by the fact that a larger portion of the fiber reaches the stress annealing point with increased treatment duration.

That the core protrudes slightly from the cladding is an advantage, since it enhances contact of the two fibers in a connection between two connectors in accordance with the invention. In laser cutting and polishing of the fiber end face as disclosed in U.S. Pat. No. 6,963,687, mentioned already above, no protrusion of the core occurs. We showed that the core sinks in the cladding, on the contrary.

From our experiments, we conclude that, in order to obtain a high number of matings and dematings, the radius of curvature of the cladding at the end face of the fiber is preferably in the range from 0.4 mm to 4 mm, more preferably in the range from 0.6 mm to 3 mm. The radius of curvature of the core at the end face of the fiber is preferably in the range from 0.14 mm to 4 mm, more preferably in the range from 0.2 mm to 3 mm.

Thus, we have found that the number of matings and dematings, while still allowing for a very good connection quality, increases very substantially by a heat treatment in accordance with the invention. We investigated by which specific heat treatment this desired result can be obtained. Therefore, we investigated the causes of failure after mating/demating. We found that an important cause of failure of the fiber is frozen-in stress. To decrease the frozen-in stress within acceptable limits, a specific amount of energy has to be transferred to the fiber. We found a.o. that the cladding curvature (or cladding radius) of the treated fiber is representative for the transferred amount of energy, and that a connector having a cladding radius within a particular range can thus endure a high number of matings and dematings.

Hereinbefore, a method in accordance with the invention was disclosed for connecting a first optical fiber connector having a bare end, the bare end being mechanically cleaved and having a heat treated end face in accordance with the invention, to a ferruled optical fiber via a converter. It was disclosed that the converter may comprise a special transition element.

In general, a converter as illustrated e.g. in FIG. 64 may be used to connect a ferrule-less fiber connector to a ferruled fiber connector, wherein the converter may comprise a special transition element or not. The ferrule-less optical fiber connector may be a connector in accordance with the invention, or in general just a ferrule-less optical fiber connector. FIG. 64 shows a ferrule based SC-connector 213 that is connected via a standard SC-connector 214 to a ferrule-less connector 212 via a converter module 211.

Figure 65:
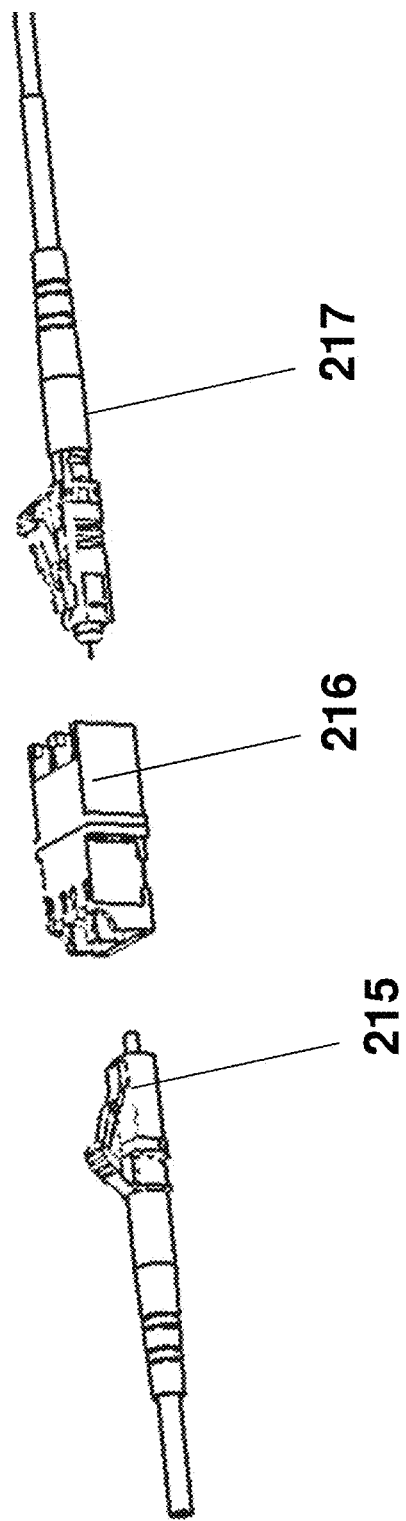
FIG. 65 shows an adapter with integrated converter for connecting a ferrule-less optical fiber connector to a ferruled connector.

A similar but different solution to connect a ferruled connector to a ferrule-less connector is illustrated in FIG. 65. FIG. 65 shows an adapter with integrated converter 216, which is used to connect a ferrule based LC connector 215 with a ferrule-less connector 217. The adapter with integrated converter 216 shown in FIG. 213 can be used to connect two sets of optical fiber connectors.

Figure 66:
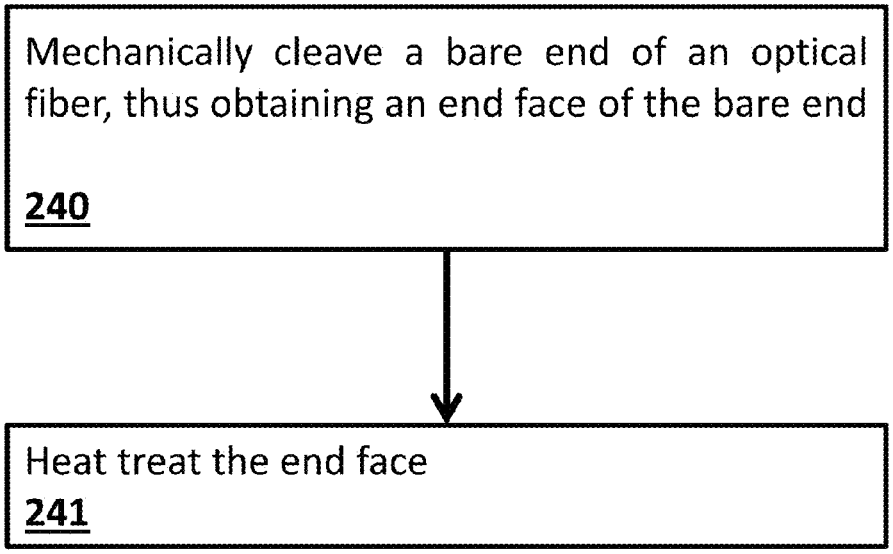
FIG. 66 illustrates steps of a method in accordance with the invention.

FIG. 66 is a flowchart of an embodiment of a method in accordance with the invention, wherein a bare end of an optical fiber is mechanically cleaved 240, thus obtaining an end face of the bare end, and heat treated 241.

Preferably before attaching a connector to the fiber, the fiber end may be inspected by means of an inspection station, e.g. actuated in the revolver head. The inspection station can detect various types of fiber defects that would impair the performance when attaching to a connector. In addition, verification of the fiber cleave angle may be performed in the inspection station. In the fiber inspection station the quality of the fiber can be verified using either non-imaging based detection concepts, e.g. by means of a photo-detector, or imaging based detection concepts, such as cameras.

If inspection reveals that the quality of the optical fiber was unsatisfactory, a redo, i.e. repeating the operations performed on the optical fiber, is possible. This may require an additional 25 mm of fiber. A redo may also be performed if the tensile test failed.

In an embodiment, the tool gives feedback of the result of the inspection to the operator. The tool may have a touch screen as a user interface. The tool may have a read-out port to read control information. Further, the tool may have a specialist mode in which more detailed information concerning the tool is given to the user. Placing a connector and attaching it to the optical fiber may be done as follows, in connector attachment station 30. In one embodiment, the connector comprises two parts: an inner part, or "engine", and an outer housing.

FIG. 26 illustrates an embodiment of a method in accordance with the invention, wherein the fiber attachment element 303 is located in the attachment position 372 with respect to the connector body 302 of connector 110. A heat shrink tube 205 is already in place.

Further, in a another embodiment a receiving end of the optical fiber connector 110 can have a pre-alignment element 400, which is illustrated in FIG. 27 a conical opening for receiving the bare end 104 of the optical fiber. At the other end of the device 110, a ferrule may be provided with a V-groove in a channel, to receive a fiber stub in the V-groove.

Figure 28:
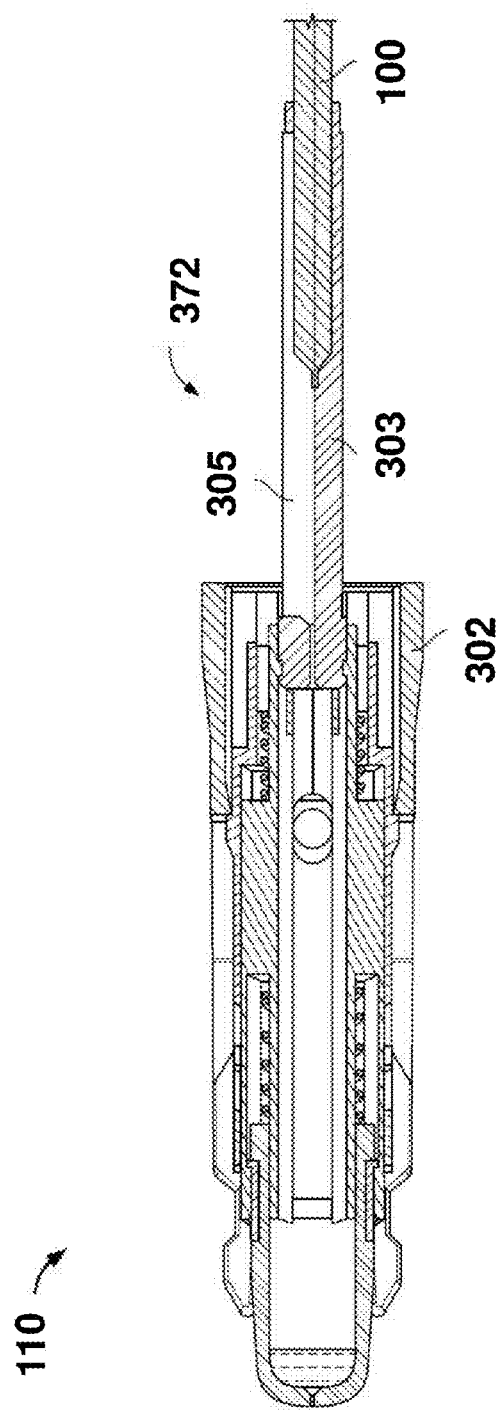
FIGS. 28 to 30 illustrate embodiments of a fiber attachment element in accordance with principles of the present invention.
Figure 29:
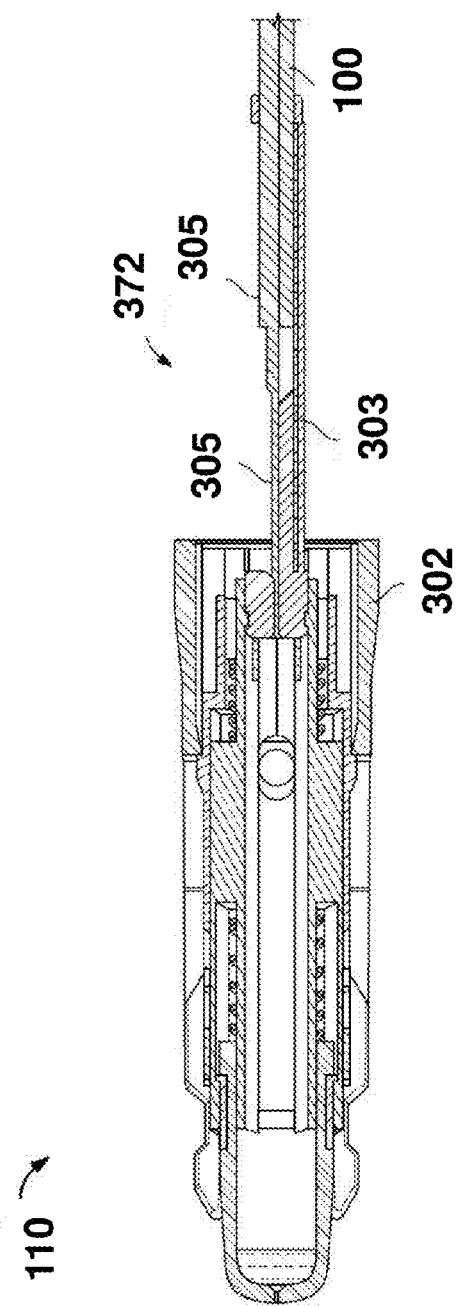

In FIG. 28, optical fiber 100 is inserted in the fiber attachment element 303, and in FIG. 29 heat shrink tube 305 is shrunk over optical fiber 100 and fiber attachment element 303, in the attachment position 372.

Figure 30:
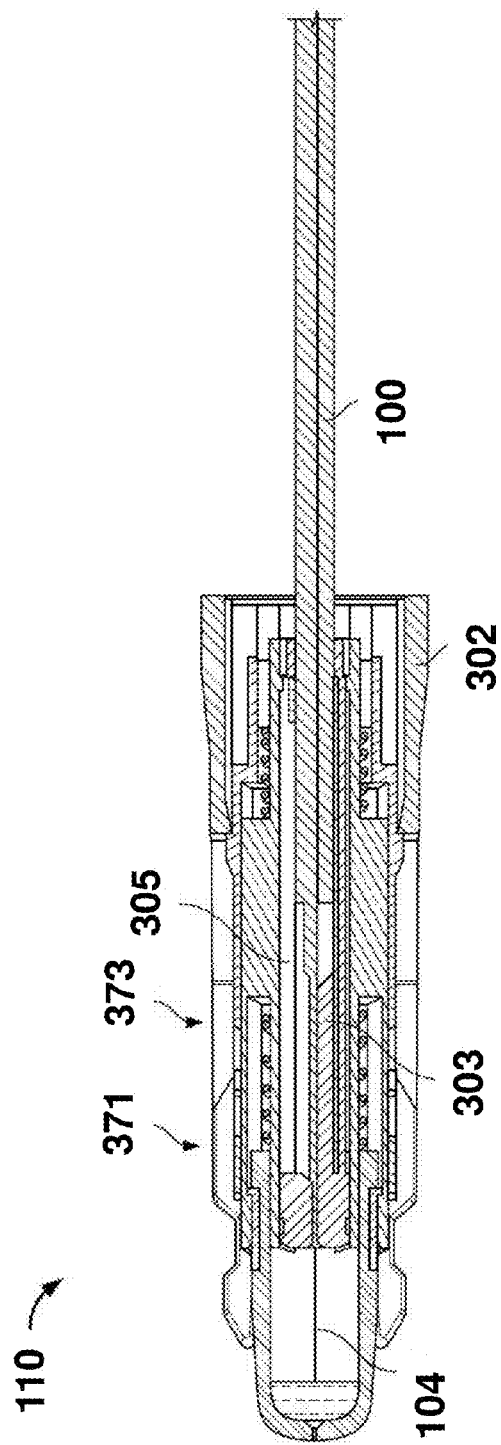

In FIG. 30, the fiber attachment element is shown after moving it to the functional position 373, which may, as discussed above, coincide with the preliminary position 371. FIGS. 27 to 31 show embodiments of the invention when applied to a connector for a ferrule-less system. The bare end 104 of the optical fiber 100 is protected by connector 1 and may now be connected to another optical device, e.g. to another optical connector.

Figure 31:
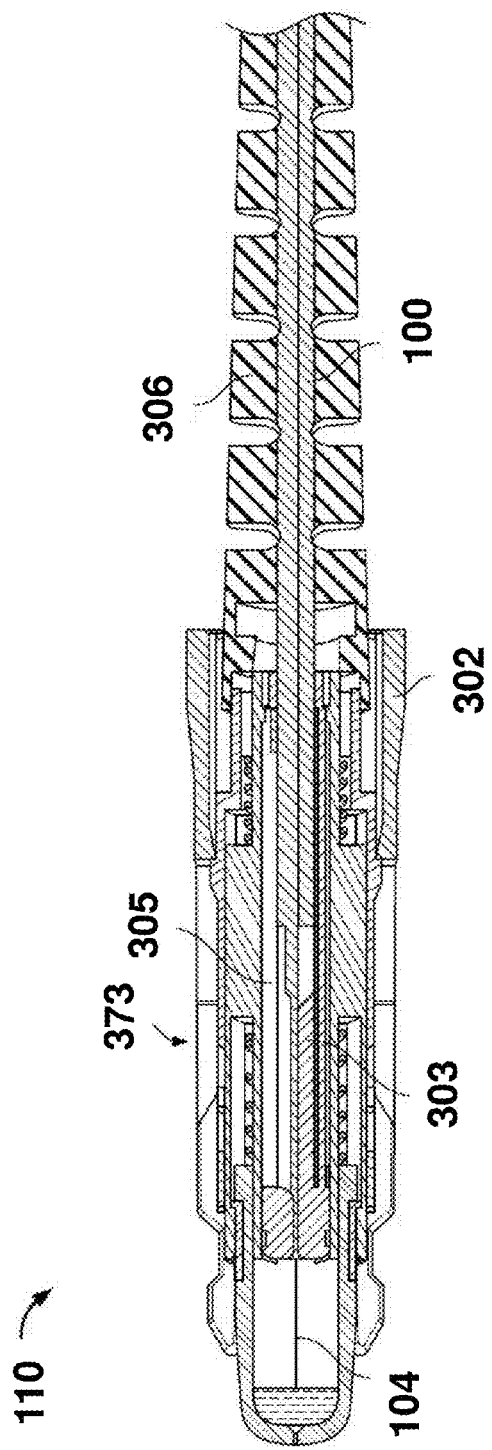
FIG. 31 illustrates an embodiment of an optical fiber connector attached to an optical fiber, in accordance with the invention.

In FIG. 31, a boot 306 was attached to the connector over the coated optical fiber, to provide strain and bend relief.

An advantage of applying a thermoformable material 305 in the attachment position 372, wherein the fiber attachment element 303 is outside of the connector body 302, is that one or more materials 325, as illustrated in FIG. 27, may be used for the connector body 302, e.g. thermoplastic materials, that have a weakening temperature that is lower than the processing temperature, e.g. 120° C., at which the thermoformable material is applied.

According to a further aspect of the invention, a device is provided for attaching the optical fiber 100 to the optical fiber connector 110. The device may comprise means for receiving the optical fiber connector 110 and the optical fiber 100, means for attaching the optical fiber to the fiber attachment element, and moving means for moving the fiber attachment element between different positions. These moving means, which may comprise a gripper and e.g. an electric motor, are adapted for moving the fiber attachment element 303 from the attachment position, wherein the optical fiber is attached to the fiber attachment element and wherein the fiber attachment element is outside of the connector body, to the functional position wherein the fiber attachment element is inside the connector body. In an embodiment, the moving means are also adapted for moving the fiber attachment element from its preliminary position inside the connector body to the attachment position. In a preferred embodiment the attachment includes application of a thermoformable material, as discussed above. The means for attaching may then include one or more means for heating the thermoformable material.

Figure 32A:
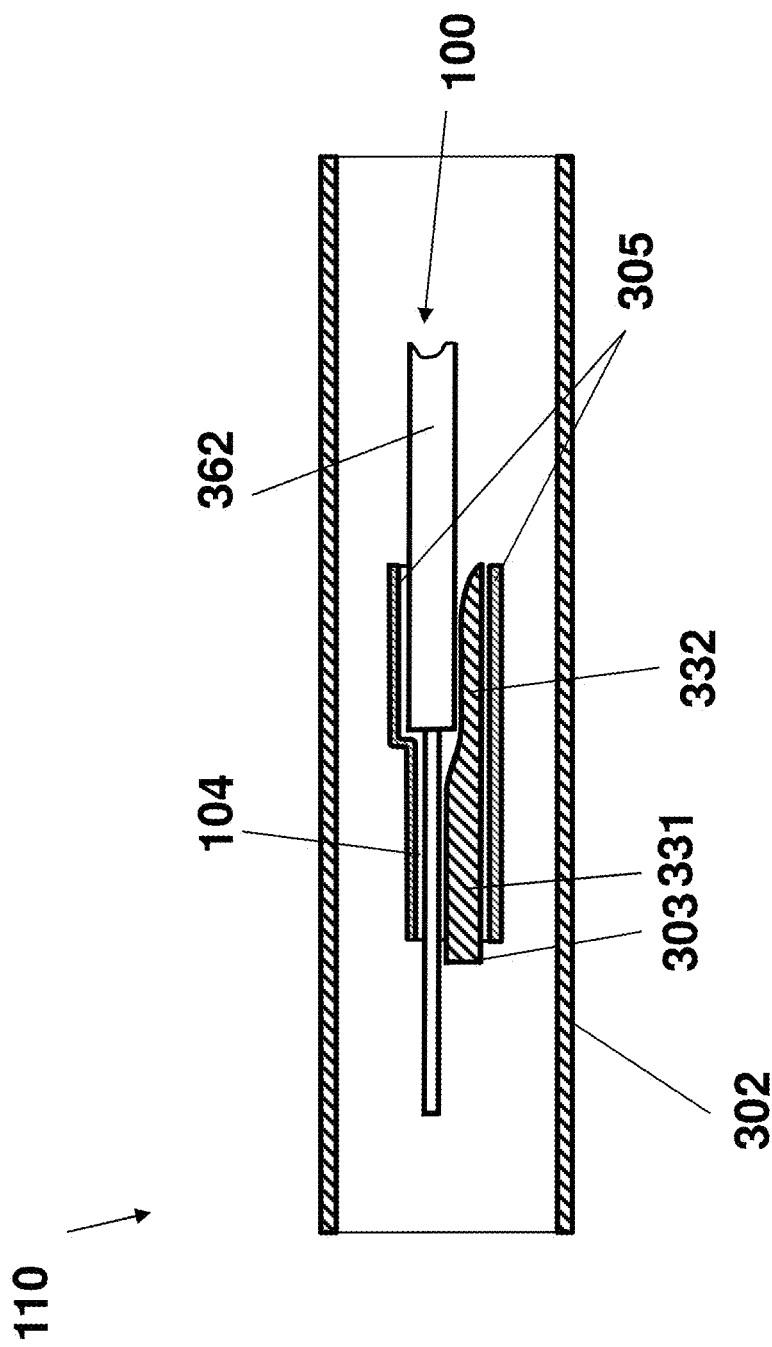
FIGS. 32a-32c schematically illustrate a connector body comprising a fiber attachment element according to an embodiment of the invention, used with a whole range of coatings for different types of optical fibers.
Figure 32B:
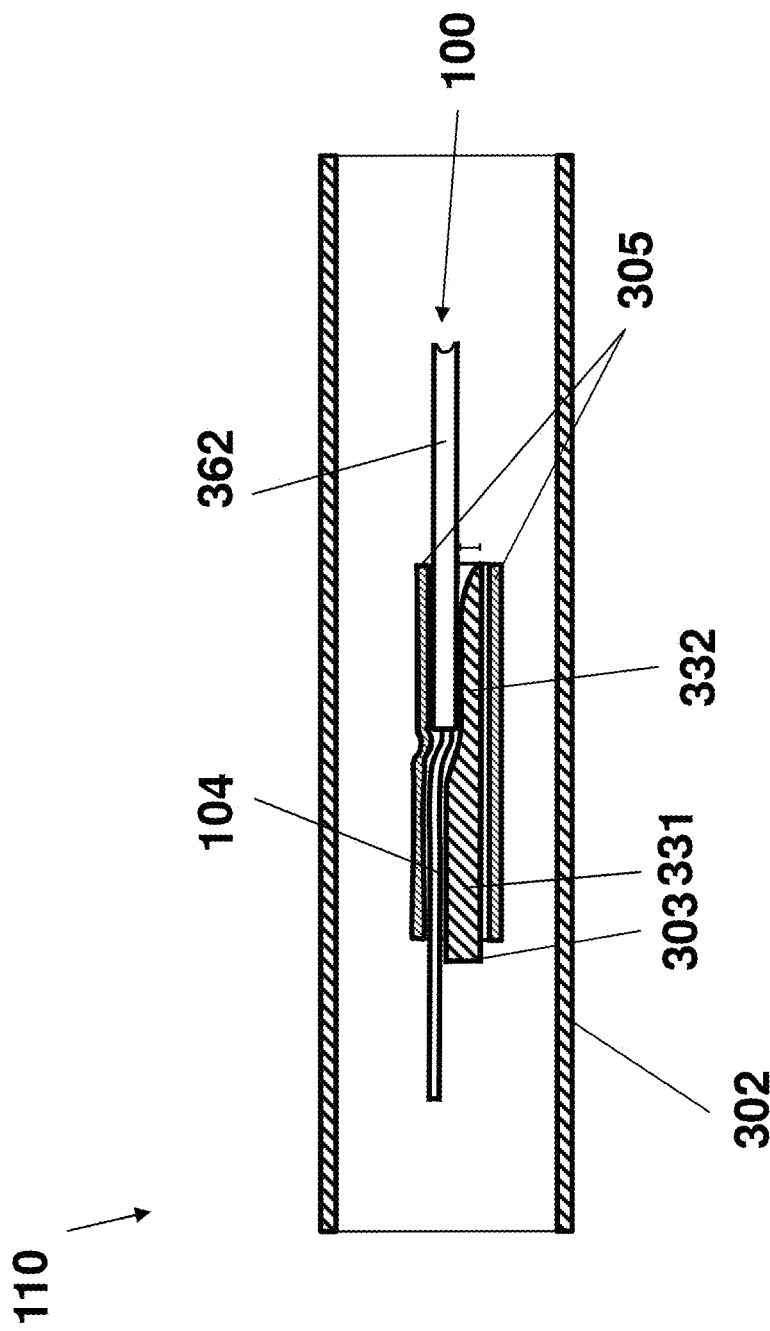
Figure 32C:
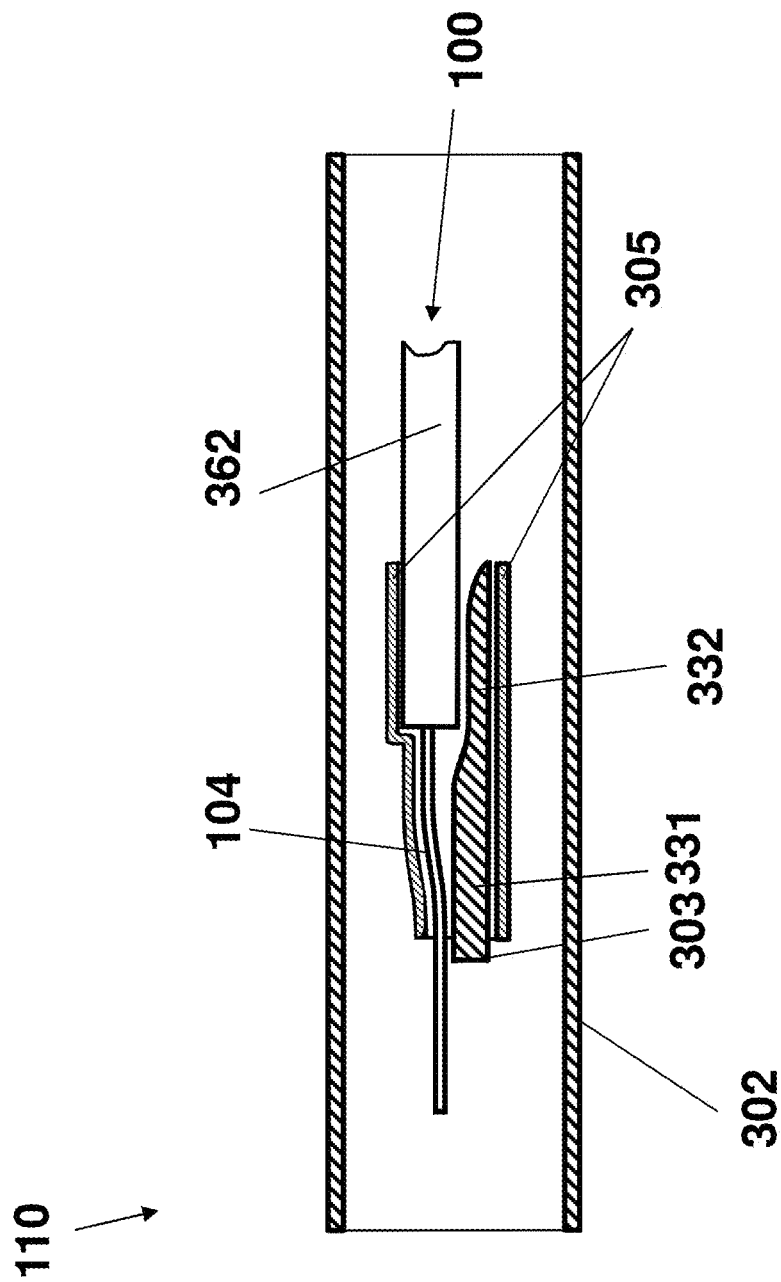

FIGS. 32a-32c schematically show a cross-section, along the direction of the longitudinal axis of an optical fiber, of an embodiment in accordance with the invention. An optical connector 110 comprises a connector body 302 and a fiber attachment element 303 that is surrounded by the connector body 302. The connector body 302 has an interface end 105.

An optical fiber 60 is inserted in the connector 110. A heat-recoverable element, which is in the shown embodiment a heat shrink tube 305, surrounds the optical fiber 100 and the fiber attachment element 303. The heat shrink tube 305, when recovered, holds or presses the optical fiber against the fiber attachment element 303, and thus retains the optical fiber 100 to the fiber attachment element 303. The optical fiber 100 has a bare portion 104 and a coating, or coated, i.e. non-stripped portion, 362.

The fiber attachment element 303 preferably has a stepped configuration with a first platform that is offset in height from a second platform by a distance generally equal to a thickness of the secondary coating of the optical fiber. The coated portion of the optical fiber is bonded to the first platform and the bare glass portion of the optical fiber is bonded to the second platform. The first platform can include a channel sized for receiving the coated portion of the optical fiber and the second platform can include a channel sized for receiving the bare fiber portion of the optical fiber.

In the embodiment shown in FIG. 32a and FIG. 35a, the fiber is attached to the fiber attachment element 303 by using a heat shrink tube 305, and the fiber attachment element has a first portion 331 for contact with a bare portion of an optical fiber and a second portion 332 for contact with a coated portion of an optical fiber. The fiber attachment element 303 can be pressed, snapped, welded, glued or co-injected with an intermediate element e.g. a shielding. In addition, the fiber attachment element 303 and the so called intermediate element can even be one single element. This intermediate element is preferably mounted into a connector body 110.

The first portion 331 has a first cross-sectional area CS1, as illustrated in FIG. 4a, which shows a cross-sectional view perpendicular to the longitudinal direction of the optical fiber. The second portion 332 has a second cross-sectional area CS2 as illustrated in FIG. 35b. In the shown embodiment, the first cross-sectional area (CS1) is larger than the second cross-sectional area (CS2). On the other hand in the first portion 31 the combined cross-sectional area (CS3) of the fiber attachment element together with the cross-sectional area of the bare optical fiber 61 (see FIG. 35c) is smaller than the combined cross-sectional area (CS4) of the fiber attachment element in the second portion 332 and a coated portion of the optical fiber 362 see FIG. 35d). The dimensional properties of the fiber attachment element for an unattached optical fiber remain similar as illustrated in FIG. 3a-3d.

Additionally, a hot melt material may be applied to the optical fiber and to the fiber attachment element, before the application of the thermoformable material such as heat-recoverable element. In one embodiment, the thermoformable material such as heat-recoverable element, e.g. a heat shrink tube, comprises a hot melt material within or on its inner surface so that the hot melt material melts when the heat shrink tube is heated, or "activated".

In the embodiment discussed with reference to FIG. 32a, after activation of the thermoformable material such as heat-recoverable element is completed, the bare portion 104 of the optical fiber is fixed with respect to the coating 362. Moreover, the bare portion 104 is fixed with respect to the fiber attachment element 303. The fiber attachment element itself is fixed with respect to the connector (in a way not shown but as known in the art). Preferably, heat shrink tube 305 has a hot melt material on its inner surface which improves the fiber fixation.

In this embodiment, fiber grow out is prevented, by the fixation of the bare portion 61 of the optical fiber with respect to the coating 362.

The use of fiber attachment element 303 improves fiber fixation appreciably, for fixation of the bare portion with respect to the coating, and for fixation of the bare portion with respect to the connector.

The end of the fiber attachment element at the side where the optical fiber is to be inserted may be rounded, to improve insertion.

We have found that fiber grow out cannot be prevented by using only a heat shrink tube and hot melt material.

Further, it has been found that a single kit of a heat shrink tube (preferably provided with hot melt) and a fiber attachment element is sufficient to provide fiber fixation for optical fibers that have a cladding diameter of 125 µm and a coating diameter, i.e. the diameter of the buffer or secondary coating, in the range of 250 to 1100 µm. The whole range of coatings for different types of optical fibers, from 250 µm to 1100 µm, can thus be covered by a single kit. No different kits have to be prepared for optical fibers with small coatings and optical fibers with large coatings. FIG. 32b schematically shows a cross section, along the direction of the longitudinal axis of an optical fiber, of a connector body according to an embodiment in accordance with the invention, whereby an optical fiber 100 having a coating diameter smaller than 900 µm, more specifically 250 µm, is attached to a fiber attachment element 303 that is surrounded by the connector body 302. As illustrated, the bare portion of the optical fiber is given a very slight bend after attaching the optical fiber to the fiber attachment element, however practical testing showed that the bend in the 250 µm fiber does not cause any optical losses, and aging does not cause the fiber to break. FIG. 36c schematically shows a cross section, along the direction of the longitudinal axis of an optical fiber, of a connector body according to an embodiment in accordance with the invention, whereby an optical fiber 100 having a coating bigger than 900 µm, more specifically 1100 µm, is attached to a fiber attachment element 303 that is surrounded by the connector body 302. Again by applying a method according to embodiments of the present invention, bending of the bare portion of the optical fiber occurs, but tests showed that the bend in the 1100 µm does not cause any optical losses as well.

An example of such a kit is as follows:
  a fiber attachment element preferably made from a metal, more specifically Aluminum 6061-T6 clear anodized, Aluminum 2024-T4 clear anodized or Xyloy M950 or it can be made from a thermoplastic material, for instance Polyphenylsulfone, more specifically Radel RS100 or Valox 420SEO. The fiber attachment element preferably has an outside diameter between 0.9 and 1.2 mm resulting in a cross-sectional area between 0.6 and 1.2 mm$^2$.
  a heat shrink tube preferably made from or comprising two materials, whereby one material is used for the outer surface of the heat shrink tube and preferably another material for its inner surface, an first example can be a 513-X (MT-LWA) compound on the outer surface together with a DWR 9763 (Lucalen A2920) compound as inner surface, a second example can be a 521-X (RNF100A) compound on the outer surface together with a 463-N (TAT-125 Adhesive) compound as inner surface, a third example can be a 521-X (RNF100A) compound on the outer surface together with a DWR 9763 (Lucalen A2920) compound as inner surface, a fourth example can be a polyethylene compound jacket type 513 on the outer surface together with a tackified ethylene-butyl acrylate adhesive as inner surface, for instance DWR9940, can also be used,
  the dimensions of a heat shrink tube are preferably a length between 10 and 15 mm, an outside diameter 2.6 mm, a wall thickness of 0.25 mm, and a 4/1 shrink ratio (i.e. the heat shrink tube would shrink to 2.6/4 mm=0.525 mm if it could shrink freely).

Another advantage of some embodiments of the invention is that contamination is avoided or at least appreciably reduced. All parts, such as the fiber attachment element and the thermoformable material e.g. heat-recoverable element, may already be present in the connector body, e.g. by pre-assembly under factory conditions, so that in the field only the optical fiber has to be inserted in the connector.

Another advantage of some embodiments of the invention is that no tension, or only very little tension, is exerted on the fiber, as opposed to e.g. mechanical attachment methods that use e.g. a wedge; this absence of substantial tension level results in good optical properties of light transmission through the fiber, such as low insertion loss and low modal noise.

Further, the attachment method is easily automated; all that has to be done in the field is to activate, e.g. by heating, the heat-recoverable element.

Figure 33:
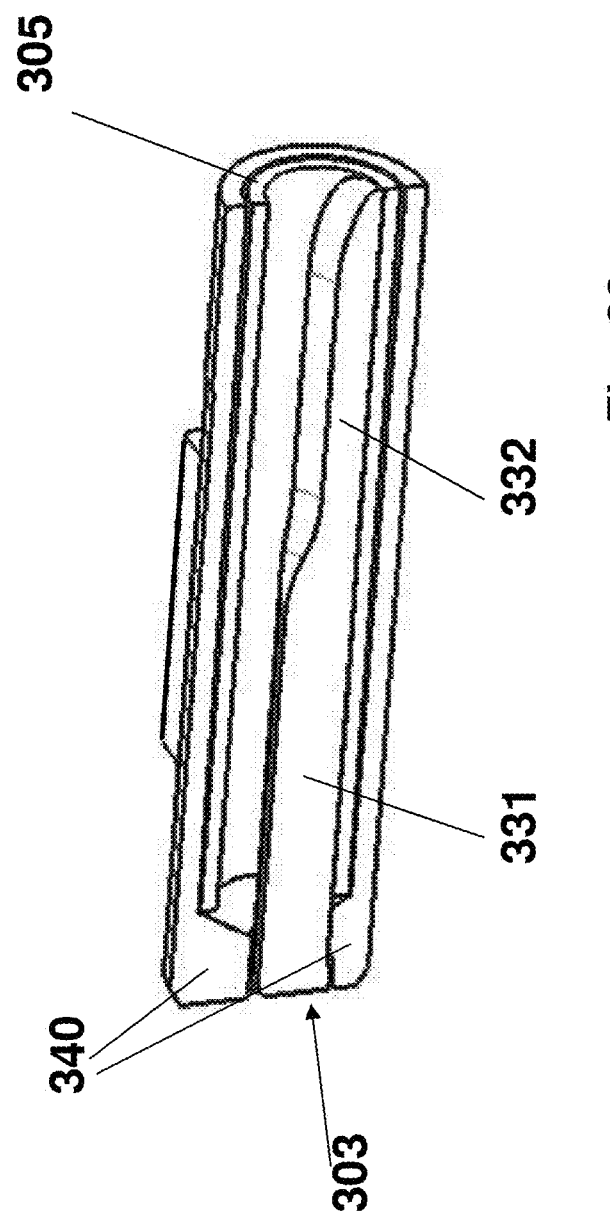
FIG. 33 illustrates an embodiment of a connector body comprising a fiber attachment element according to embodiments of the invention.

FIG. 33 shows a 3D view, cut in half, of an embodiment of a fiber attachment element 303. The first portion 331 and the second portion 332 of the fiber attachment element are shown. A heat shrink tube 305 surrounds the fiber attachment element 303. The connector body 302 comprises stopping elements 340, whereby the stopping elements 340 preferably abut the first portion 331 heat shrink tube 305. Advantageously when attaching the heat shrink tube to the optical fiber, the stopping elements prevent any shift of the heat shrink tube along the longitudinal direction of the optical fiber.

FIG. 31 shows an embodiment of an optical fiber connector 110 wherein an optical fiber 100 is attached. The connector body 302 and the fiber attachment element 303 are also shown. The connector is preferably a "ferrule-less" connector where an end portion of the optical fiber is not supported by a ferrule (i.e., the end portion of the optical fiber is unsupported). In certain embodiments, the unsupported end portion of the optical fiber is bare glass and includes only a glass core surrounded by glass cladding. In certain embodiments, the optical fiber is secured within a connector body (i.e., a connector housing) having an interface end. The connector can have a first configuration where the unsupported end portion is enclosed and protected within the connector body. The connector also can have a second configuration where an endface of the unsupported end portion can be accessed at the interface end of the connector body for optical connection to another optical fiber. In certain embodiments, the connector can include a protective cover that is movable relative to the connector body between a first position where the unsupported end portion of the optical fiber is enclosed within the connector body and protected from contamination, and a second position where the end face of the unsupported end portion of the optical fiber can be accessed for optical connection to another optical fiber. An adhesive can be used to adhesively affix/bond both the bare glass and a secondary coating of the optical fiber to an attachment structure within the connector body. In this way, the optical fiber is axially anchored at a desired position within the connector body and the bare glass of the optical fiber is axially anchored relative to the secondary coating. The adhesive can be a heat activated adhesive.

In some embodiments the minimum length of the unsupported end portion of the optical fiber if preferably between 10-15 mm.

FIGS. 36a to 36e schematically show subsequent stages wherein heat is transferred by a device 410 to a heat recoverable material 305. The device 410 illustrated in FIG. 36a comprises a heat distributor 411 and a heat shrink tube 305. The heat distributor 411 includes a heat conducting portion 412 that has an outer surface 413, and that has two localized heating portions 414 on this outer surface 413. At least one of the localized heating portion 414 is heated by a heat source 430, which is represented in FIGS. 36a-36e by the symbol for an electrical resistance. Heat is transferred from the heated localized heating portion 414 through the heat conducting portion 412 in the direction of arrow 61 in FIG. 36b. Heat recoverable material 305 is surrounded by heat conducting portion 412. In FIG. 36a, it is in cavity 415 of the heat distributor 411. The heat recoverable material, which is a heat shrink tube 420 in the embodiment of FIG. 36a, is gradually heated by heat distributor 411. Heat shrink tube 420 first shrinks where the heat is applied, i.e. at the location of the heated localized heating portion 414. The shrink front then propagates, as shown in FIGS. 36b to 36e, in the direction of arrow 461, as heat is transferred through the heat conducting portion 412. FIG. 36e shows the completely shrunk heat shrink tube. The heat shrink tube 420 is adapted for receiving at least one element 100, the heat shrink tube is then shrunk around these element(s) and a pre-installed or pre-assembled element such as a fiber attachment element 303 (see FIG. 37).

The location where shrinking will start is known. In the embodiment of FIGS. 36a-36e, the dimensions, especially the thickness, and the thermal properties, such as the thermal conductivity and the thermal capacity, of the heat conducting portion 412 are such, and the dimensions and the physical properties of the heat shrink tube 305 are such that the heat front propagates through the heat conducting portion 412 and is followed by the shrink front which propagates through the heat shrink tube 305. In this way, no air is entrapped between the heat shrink tube 305 and the element or elements that are received in the heat shrink tube 305 to be assembled by it.

Moreover, no expensive oven is required, and certainly not an oven with dedicated heating zones, with a dedicated heater and control unit for each zone.

As a heating source 430, infrared radiation or another source of radiation heating may be used. Convection heating may be used as well, or another heating means as known in the art. Preferably, heat is transferred by conduction from heat source 430 to localized heating portion 414. Preferably, localized heating portion 414 is adapted for physically contacting heat source 430. Heat source 430 may comprise an electrical resistor. A combination of these heating means may also be used.

The device shown in FIGS. 36a to 36e has two localized heating portions 414, of which a single one is heated. Both localized heating portions may be heated. The device may have a single localized heating portion. The device may have more than two localized heating portions.

The heat distributor may have a cylindrical shape. In a preferred embodiment, the heat distributor 412 has a tubular shape, as shown in FIGS. 36a-36e. The heat distributor may substantially be made of metal.

The heat recoverable material may be a heat shrink tube. The heat recoverable material may be a heat shrink tape.

Figure 37:
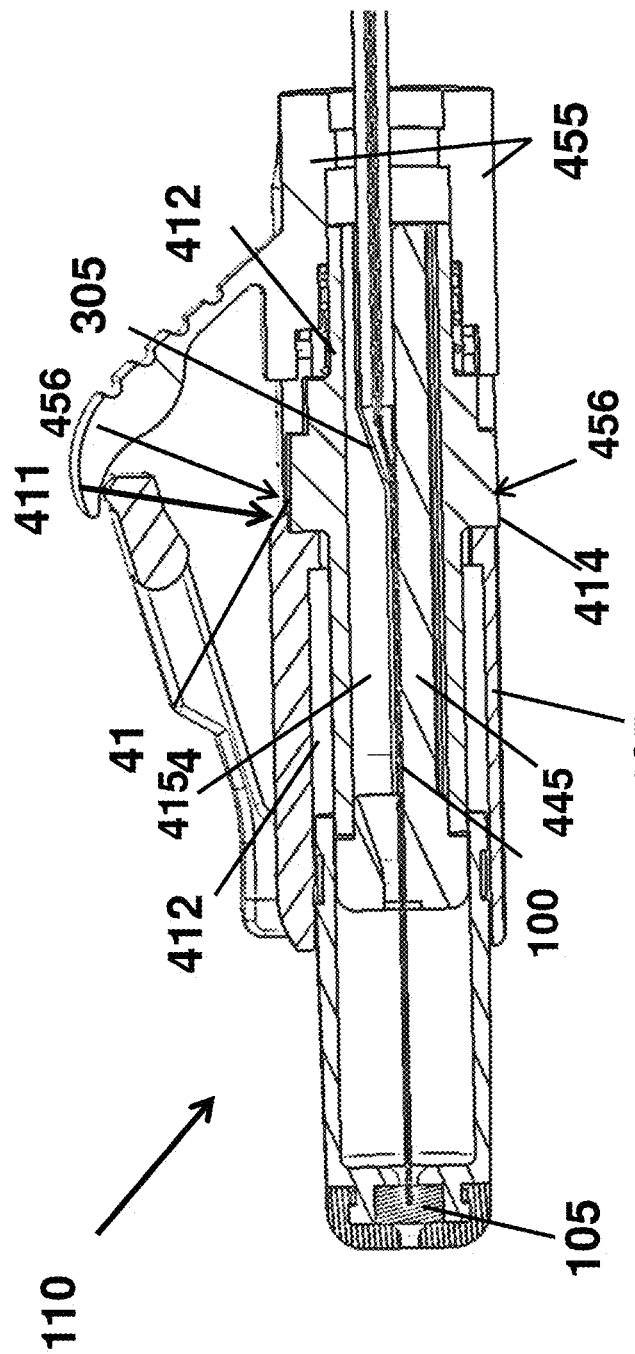
FIG. 37 illustrates an embodiment of a connector in accordance with principles of the present invention.

FIG. 37 schematically shows an optical fiber connector 110, e.g. a field installable connector, that includes a device for assembly of parts. The connector in FIG. 37 is a ferrule-less connector that comprises an optical fiber 100 and a fiber attachment element 303, e.g. a pre-installed or pre-assembled fiber attachment element 303, surrounded by a heat shrink tube 305, in a cavity 415 of the heat conducting portion 412 of heat distributor 411. The heat conduction portion can be cylindrical. The connector body 302 has an interface end 105 at which the end of the optical fiber can be exposed. The heat distributor 411 surrounds heat shrink tube 305 and has two localized heating portions 414 on the outer surface of the heat conducting portion 412. Each localized heating portion is accessible at a location 456 in connector body 302 of optical fiber connector 110, which is in the shown embodiment an opening 456 in the connector body 302. Connector body 302 protects the inside of the optical fiber connector 110 from the environment. When one or both localized heating portions 414 are heated, preferably by making physical contact with a heater through opening 456, heat shrink tube 305 will start to shrink, as explained above with reference to FIGS. 36a-36e. When the shrinking process is completed, optical fiber 100 is assembled to fiber attachment element 303 by heat shrink tube 305.

The finished connector is preferably a "ferrule-less" connector where an end portion of the optical fiber is not supported by a ferrule (i.e., the end portion of the optical fiber is unsupported). In certain embodiments, the unsupported end portion of the optical fiber is bare glass and includes only a glass core surrounded by glass cladding. In certain embodiments, the optical fiber is secured within a connector body (i.e., a connector housing) having an interface end. The connector can have a first configuration where the unsupported end portion is enclosed and protected within the connector body. The connector also can have a second configuration where an endface of the unsupported end portion can be accessed at the interface end of the connector body for optical connection to another optical fiber. In certain embodiments, the connector can include a protective cover that is movable relative to the connector body between a first position where the unsupported end portion of the optical fiber is enclosed within the connector body and protected from contamination, and a second position where the end face of the unsupported end portion of the optical fiber can be accessed for optical connection to another optical fiber. An adhesive can be used to adhesively affix/bond both the bare glass and a secondary coating of the optical fiber to an attachment structure within the connector body. In this way, the optical fiber is axially anchored at a desired position within the connector body and the bare glass of the optical fiber is axially anchored relative to the secondary coating. The adhesive can be a heat activated adhesive.

The fiber attachment element preferably has a stepped configuration with a first platform that is offset in height from a second platform by a distance generally equal to a thickness of the secondary coating of the optical fiber. The coated portion of the optical fiber is bonded to the first platform and the bare glass portion of the optical fiber is bonded to the second platform, e.g. by the heat shrink tube when recovered. The first platform can include a channel sized for receiving the coated portion of the optical fiber and the second platform can include a channel sized for receiving the bare fiber portion of the optical fiber. The fiber attachment element can be pressed, snapped, welded, glued or co-injected with an intermediate element e.g. a shielding. In addition, the fiber attachment element and the so called intermediate element can even be one single element. This intermediate element is preferably mounted into a connector body.

In some embodiments the minimum length of the unsupported end portion of the optical fiber if preferably between 10-15 mm.

In one example, a connector 110 as shown in FIG. 37 may have the following dimensions and material choices:
  a heat distributing means having a tubular form comprising an outer diameter between 3 and 5 mm and an inner diameter between 2 and 4 mm, which can be made from a metal, more specifically Aluminum 6061-T6 clear anodized, Aluminum 2024-T4 clear anodized or Xyloy M950.
  each localized heating portion preferably has a surface area between 1 and 5 mm$^2$,
  a heat shrink tube preferably made from or comprising two materials, whereby one material is used for the outer surface of the heat shrink tube and preferably another material for its inner surface, a first example can be a 513-X (MT-LWA) compound on the outer surface together with a DWR 9763 (Lucalen A2920) compound as inner surface, a second example can be a 521-X (RNF100A) compound on the outer surface together with a 463-N (TAT-125 Adhesive) compound as inner surface, a third example can be a 521-X (RNF100A) compound on the outer surface together with a DWR 9763 (Lucalen A2920) compound as inner surface, a forth example can be a polyethylene compound jacket type 513 on the outer surface together with a tackified ethylene-butyl acrylate adhesive as inner surface, for instance DWR9940, can also be used,
  the heat shrink tube preferably has a length between 10 and 15 mm, an outside diameter 2.6 mm, a wall thickness of 0.25 mm, and a 4/1 shrink ratio (i.e. the heat shrink tube would shrink to 2.6/4 mm=0.525 mm if it could shrink freely). optical fiber: cladding diameter 125 µm and coating diameter between 200 µm and 1100 µm.

A temperature range between 120° C. and 220° C. is preferably applied when activating the heat shrink tube.

This heat shrink tube is heated at a temperature in the range of 120 to 220° C. An advantage of the present invention is that materials that do not resist to such temperatures may be used in the optical fiber connector 110, as the heat from the heat source is directly guided by the heat distributor 411 to the inside of the optical fiber connector 110 and to the heat recoverable material 305. For example, the outer housing 465 or rear body on FIG. 37, may be made from a thermoplastic material such as PP or LDPE.

Another advantage is that the connector may be pre-assembled in the factory, including e.g. the heat shrink tube, so that there are no loose small parts when attaching the connector to an optical fiber in the field.

In an embodiment of the tool in accordance with the invention, a connector 110 (which may comprise more than one part) is loaded from a connector cartridge 80. In case the connector comprises an engine and an outer housing, first the engine is attached to the optical fiber. This may be done via a heat shrink system, or, preferably a combination of a heat shrink and hot melt system. In one embodiment, the attachment is done as follows. Heat shrink and hot melt are heated to about 120° C. Heat transfer from the heater to the heat shrink and the hot melt may be a combination of radiation and air conduction. Especially, the gap between the heater and heat shrink is kept as small as possible. The heater may consist of two halves wherein each half is separately heated. The heaters can be opened and heated to the right temperature before the connector engine is placed at the heating position. Then the heater is closed and the heat shrink and hot melt are heated to the correct temperature. The heat shrink provides strain relief to the fiber; this strain relief system can bridge the gap between a 1000 µm coating diameter and a 125 µm cladding diameter. After fixation of the engine to the optical fiber, the outer housing is attached to the engine. The resulting length of the bare end of the optical fiber is preferably 8 mm.

The connectors 110 may be supplied automatically by means of a connector cartridge 80 which may comprise a carrier and small cartridges, each containing one connector. In one embodiment, the connector cartridge may contain 8 to 12 connectors. The cartridges may be sealed with a thin foil, for example aluminum. The connectors are thus protected from dust, moisture and mechanical load. The connector parts may have a well defined orientation. It may be possible to exchange the connector cartridge before it is empty. In one embodiment, the revolver head is provided with a knife which can cut and bend the foil of the cartridge in order for the connector feeder to pull in the connector from the cartridge into the revolver head without the risk of sticking.

It is to be understood that the invention is not limited to the particular features of the means and/or the process steps of the methods described as such means and methods may vary. It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

The particular combinations of elements and features in the above detailed embodiments are exemplary only. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A portable device for attaching a connector to an optical fiber, said optical fiber having an end, said end having an end face, the device comprising:
   means for receiving said optical fiber at said end of said optical fiber;
   a connector station for autonomously attaching said connector to said optical fiber;
   at least one station for autonomously performing at least one operation on said optical fiber, said at least one station having means for performing a first operation on said optical fiber;
   means for coupling said at least one station to said end of said optical fiber for performing said first operation;
   means for coupling said connector station to said end of said optical fiber for said attaching said connector;
   wherein said first operation is selected from the group consisting of a stripping operation, a cleaning operation, a tensile test, a cleaving operation, and a heat treatment of said end face;
   wherein said at least one station is a plurality of stations for performing a plurality of operations on said optical fiber; each particular station out of said plurality of stations being adapted for autonomously performing at least one operation out of said plurality of operations; wherein said plurality of operations comprises a stripping operation, a cleaning operation, a tensile test, a cleaving operation and a heat treatment of said end face; and
   wherein said optical fiber has a fiber axis, the device further comprising means for coupling each said particular station out of said plurality of stations to said end of said optical fiber, wherein said means for coupling include means selected from the group consisting of means for rotating each said particular station around an axis parallel to said fiber axis and means for translating each said particular station in a direction perpendicular to said fiber axis.

2. The portable device according to claim 1 wherein said device is hand-held.

3. The portable device according to claim 1 wherein said at least one station comprises a station for performing a combination of operations selected from the group consisting of a first combination and a second combination, wherein said first combination is a combination of a stripping operation and a cleaning operation and wherein said second combination is a combination of a tensile test and a cleaving operation.

4. The portable device according to claim 1 further comprising means for pulling said optical fiber into said device.

5. The portable device according to claim 1 further comprising, for each said particular station out of said plurality of stations, means for aligning said optical fiber with respect to said particular station.

6. The portable device according to claim 1 wherein said optical fiber is in a position that is fixed with respect to said portable device during said at least one operation.

7. The portable device according to claim 1 further comprising control means for automatically controlling said at least one operation.

8. The portable device according to claim 1 further comprising means for detecting a failure of said first operation and means for repeating said first operation.

9. A portable device for processing an optical fiber, the portable device comprising:
   a portable housing defining a fiber insertion opening for allowing an optical fiber to be inserted into the housing along a fiber insertion axis;
   a fiber stripping station within the housing for autonomously stripping the optical fiber;
   a fiber cleaving station within the housing for autonomously cleaving the optical fiber; and
   a continuous reel waste collection device that captures debris generated from stripping and cleaving operations and encloses the debris in the form of a tape sandwich.

10. The portable device of claim 9, further comprising a mechanism for capturing debris generated during stripping and cleaving.

11. The portable device of claim 9, further comprising an inspection station within the housing for inspecting the optical fiber.

12. The portable device of claim 9, further comprising an arc treatment station within the housing for arc treating an end face of the optical fiber.

13. The portable device of claim 9, further comprising a connector installation station within the housing for autonomously installing a connector on the optical fiber.

14. The portable device of claim 9, further comprising a cleaning device within the housing for cleaning the optical fiber.

15. The portable device of claim 9, wherein the portable housing includes a handle and the portable device has an overall weight less than 5 kilograms.

16. The portable device of claim 9, further comprising a carriage within the portable housing, the carriage being mounted on linear bearings, the carriage being movable on the linear bearings along a carriage slide axis that is parallel to the fiber insertion axis, the portable device also including a drive mechanism for sliding the carriage back and forth along the linear bearings.

17. The portable device of claim 16, further comprising a pivot mechanism for pivoting the carriage to move different operational stations carried by the carriage into alignment with the fiber insertion axis.

18. The portable device of claim 17, further comprising an arrangement of clamps including an axially movable clamp carried by the carriage, an axially fixed clamp positioned adjacent to the fiber insertion opening, and an intermediate clamp positioned between the axially movable clamp and the axially fixed clamp.

19. The portable device of claim 9, further comprising a drive mechanism for extending and retracting the cleaving station relative to the fiber insertion axis.

20. A portable device for processing an optical fiber, the portable device comprising:
- a portable housing defining a fiber insertion opening for allowing an optical fiber to be inserted into the housing along a fiber insertion axis;
- a fiber stripping station within the housing for autonomously stripping the optical fiber; and
- a fiber cleaving station within the housing for autonomously cleaving the optical fiber;
- wherein the fiber stripping station includes heated clamping members that are moveable between an open position and a closed position, and wherein the portable device includes a continuous reel waste collection device including tapes dispensed from dispensing reels and routed between the heated clamping members, the tapes being adapted to capture debris generated from stripping and cleaving operations and enclose the debris between the tapes in the form of a tape sandwich.

21. The portable device of claim 20, wherein the tape transfers a cleaning liquid to a stripped portion of the optical fiber.

22. The portable device of claim 21, wherein the cleaning liquid includes benzyl alcohol.

23. The portable device of claim 20, further comprising a stripping knife for scoring a coating of the optical fiber through the tapes.

24. The portable device of claim 23, wherein the stripping knife has a profiled edge.

25. The portable device of claim 20, wherein the continuous reel waste collection device and the heated clamping members are mounted to a carriage that is movable along the fiber insertion axis to cause stripping of the optical fiber.

26. A portable device for processing an optical fiber, the portable device comprising:
- a portable housing defining a fiber insertion opening for allowing an optical fiber to be inserted into the housing along a fiber insertion axis;
- a fiber stripping station within the housing for autonomously stripping the optical fiber;
- a fiber cleaving station within the housing for autonomously cleaving the optical fiber; and
- a connector installation station within the housing for autonomously affixing connector bodies to optical fibers, the connector installation station including a plurality of the connector bodies including heat recoverable members for affixing the connector bodies to optical fibers, and wherein the connector installation station includes a heat distribution means for transferring heat to the heat recoverable members.

27. The portable device of claim 26, wherein the heat distribution means generates a moving heat front for transferring heat to the heat recoverable members.

28. The portable device of claim 26, wherein the heat recoverable members include heat recoverable sleeves, and wherein adhesive and the heat recoverable sleeves affix the optical fibers to attachment members that are axially fixed relative to the connector bodies when heated by the heat distribution means.

29. A portable device for processing an optical fiber, the portable device comprising:
- a portable housing defining a fiber insertion opening for allowing an optical fiber to be inserted into the housing along a fiber insertion axis;
- a fiber stripping station within the housing for autonomously stripping the optical fiber;
- a fiber cleaving station within the housing for autonomously cleaving the optical fiber; and
- guide means adapted to draw tape to feed the optical fiber with the tape and to sandwich the optical fiber in the tape with the movement of the tape, wherein the movement speed of the tape is higher than an insertion speed of the optical fiber.

30. The portable device of claim 12, wherein the arc treatment station provides the end face of the optical fiber with a radius of curvature in the range from 0.14 mm to 4 mm.

31. A device for processing an optical fiber, the device comprising:
- a fiber stripping station for stripping the optical fiber, the fiber stripping station including heated clamping members between which the optical fiber is clamped during stripping, the heated clamping members being moveable between an open position and a closed position, the device also including a continuous reel waste collection device including tapes dispensed from dispensing reels and routed between the heated clamping members such that the tapes are positioned between the optical fiber and the heated clamping members when the optical fiber is clamped during stripping such that the tapes protect the optical fiber, the tapes also being adapted to capture debris generated from stripping operations and enclose the debris between the tapes in the form of a tape sandwich.

32. The device of claim 31, wherein the tapes are adapted to draw the optical fiber into the fiber stripping station along an axis.

* * * * *